(12) United States Patent
Cazemier et al.

(10) Patent No.: US 6,609,123 B1
(45) Date of Patent: Aug. 19, 2003

(54) QUERY ENGINE AND METHOD FOR QUERYING DATA USING METADATA MODEL

(75) Inventors: Henk Cazemier, Nepean (CA); Glenn D. Rasmussen, Nepean (CA)

(73) Assignee: Cognos Incorporated, Ottawa (CA)

( * ) Notice: Subject to any disclaimer, the term of this patent is extended or adjusted under 35 U.S.C. 154(b) by 297 days.

(21) Appl. No.: 09/654,744

(22) Filed: Sep. 1, 2000

(51) Int. Cl.[7] .............................................. G06F 17/30
(52) U.S. Cl. ...................................................... 707/4
(58) Field of Search ............................ 707/2, 3, 4, 10, 707/100, 102, 103 R, 104.1; 705/1; 709/201, 203, 217, 316; 717/104, 108

(56) References Cited

U.S. PATENT DOCUMENTS

| 5,555,403 | A | | 9/1996 | Cambot et al. .............. 395/600 |
| 5,915,257 | A | | 6/1999 | Gartung et al. ............. 707/503 |
| 5,983,237 | A | * | 11/1999 | Jain et al. .................. 707/104.1 |
| 6,263,313 | B1 | * | 7/2001 | Milsted et al. ................. 705/1 |
| 6,418,448 | B1 | * | 7/2002 | Sarkar et al. ............. 707/104.1 |

OTHER PUBLICATIONS

Article in the Electrical Engineering Handbook, CRC Press LLC 1999, entitled "Knowledge Engineering", by M. Abdelguerfi and R. Eskicioglu.
Cognos Impromptu, Administrator's Guide, entitled Cognos Enterprise Business Intelligence, published in 1998.

* cited by examiner

*Primary Examiner*—Diane D. Mizrahi
*Assistant Examiner*—Apu M Mofiz
(74) *Attorney, Agent, or Firm*—Gardner Groff, P.C.

(57) ABSTRACT

A query engine formulates a data source query to obtain data from one or more data sources. The query engine uses a metadata model containing model objects that represent the data sources. The metadata model has a data access layer, business layer and package layer. The model objects of the business layer are constructed based on the model objects contained in the data access layer. The query engine interacts to the metadata model at the business layer, and formulates a data source query based on a query specification provided by a client application. Thus, the query engine allows use of different type of client applications to obtain reports from one or more data sources.

54 Claims, 38 Drawing Sheets

Data Access Model Transformations 112

| 112a | Data Access Join Constructing Transformation |
|---|---|
| 112b | Data Access Key Constructing Transformation |
| 112c | Table Extract Constructing Transformation |
| 112d | Data Access Cube Constructing Transformation |

Business Model Transformations 114

| 114a | Basic Business Model Constructing Transformation |
|---|---|
| 114b | Many to Many Join Relationship Fixing Transformation |
| 114c | Entity Coalescing Transformation |
| 114d | Redundant Join Relationship Eliminating Transformation |
| 114e | Subclass Relationship Introducing Transformation |
| 114f | Entity Referencing Transformation |
| 114g | Attribute Usage Determining Transformation |
| 114h | Date Usage Identifying Transformation |

Multidimensional Model Transformations 115

| 115a | Measure Identifying and Measure Dimension Constructing Transformation |
|---|---|
| 115b | Category Dimension and Level Constructing Transformation |
| 115c | Logic Cube Constructing Transformation |

Package Model Transformations 116

| 116a | Basic Package Model Constructing Transformation |
|---|---|
| 116b | Package Constructing Transformation for Cognos Query |

General Transformations 117

| 117a | Name Mutation Transformation |
|---|---|

Fig. 4B

| Prohibit | Object Processed | Parent Relationship Processed | Parent Action | Child Relationship Processed | Child Action |
|---|---|---|---|---|---|
| Yes | Don't Care | Don't Care | Nothing | Don't Care | Nothing |
| No | No | Doesn't Exist | Create new target object and relationship. Mark object and relationship as processed after processing children. | | |
| | | No | Mark object and relationship as processed after processing children. | Doesn't Exist | Create new target object and relationship. Mark object and relationship as processed. |
| | | | | No | Mark relationship as processed |
| | | | | Yes | Nothing |
| | | Yes | Process children. | Doesn't Exist | Create new target object and relationship. Mark object and relationship as processed. |
| | | | | No | Mark relationship as processed |
| | | | | Yes | Nothing |
| | Yes | Doesn't Exist | Nothing | | |
| | | No | Mark object and relationship as processed after processing children. | Doesn't Exist | Create new target object and relationship. Mark object and relationship as processed. |
| | | | | No | Mark relationship as processed |
| | | | | Yes | Nothing |
| | | Yes | Process children. | Doesn't Exist | Nothing |
| | | | | No | Mark relationship as processed |
| | | | | Yes | Nothing |

Fig. 7

| Table Name | Segment Name | Brand # | City # | Country # | Customer # | Date | Item # | Line # | Office # | Order # | Order Line # | Received Date | Region # | Sales Region # | Sales Rep # | Site # | SKU # | State # | Warehouse # |
|---|---|---|---|---|---|---|---|---|---|---|---|---|---|---|---|---|---|---|---|
|  | | 5 | 4 | 8 | 6 | 4 | 7 | 5 | 4 | 2 | 1 | 5 | 7 | 4 | 4 | 3 | 5 | 5 | 4 |
| Brands | 1 | 1 | | | | | | | | | | | | | | | | | |
| Cities | 4 | | 1 | 1 | | | | | | | | | 1 | | | | | 1 | |
| Countries | 1 | | | 1 | | | | | | | | | | | | | | | |
| Customers | 1 | | | | 1 | | | | | | | | | | | | | | |
| Customer Sites | 2 | | | | 1 | | | | | | | | | | | 1 | | | |
| Inventory | 3 | | | | | | 1 | | | | | | | | | | 1 | | 1 |
| Inventory by Date, Item, Region | 4 | | | 1 | | | 1 | 1 | | | | | 1 | | | | | | |
| Items | 1 | | | | | | 1 | | | | | | | | | | | | |
| Lines | 1 | | | | | | | 1 | | | | | | | | | | | |
| Offices | 1 | | | | | | | | 1 | | | | | | | | | | |
| Orders | 1 | | | | | | | | | 1 | | | | | | | | | |
| Orders by Received Date, Brand, Line and Item | 4 | 1 | | | | | 1 | 1 | | | | 1 | | | | | | | |
| Orders by Received Date, Item, Customer | 3 | | | | 1 | | 1 | | | | | 1 | | | | | | | |
| Orders by Received Date, Office | 2 | | | | | | | | 1 | | | 1 | | | | | | | |
| Orders by Received Date, Sales Region, Customer | 3 | | | | 1 | | | | | | | 1 | | 1 | | | | | |
| Order Details | 2 | | | | | | | | | | 1 | 1 | | | | | | | |
| Regions | 2 | | | 1 | | | | | | | | | 1 | | | | | | |
| Sales Regions | 1 | | | | | | | | | | | | | 1 | | | | | |
| Sales Rep Pictures | 1 | | | | | | | | | | | | | | 1 | | | | |
| Sales Reps | 1 | | | | | | | | | | | | | | 1 | | | | |
| SKU Items | 1 | | | | | | | | | | | | | | | | 1 | | |
| States | 3 | | | 1 | | | | | | | | | 1 | | | | | 1 | |
| Warehouses | 1 | | | | | | | | | | | | | | | | | | 1 |
| Dim-Locations | 7 | | 1 | 1 | | | | | 1 | | | | 1 | 1 | | | | 1 | 1 |
| Dim-Products | 4 | 1 | | | | | 1 | 1 | | | | | | | | | 1 | | |
| Dim-Customers | 2 | | | | 1 | | | | | | | | | | | 1 | | | |
| Dim-Sales Reps | 1 | | | | | | | | | | | | | | 1 | | | | |
| Dim-Date | 1 | | | | | 1 | | | | | | | | | | | | | |
| Fact-Orders | 14 | 1 | 1 | 1 | 1 | | 1 | 1 | 1 | | | 1 | 1 | 1 | 1 | 1 | 1 | 1 | |
| Fact-Inventory | 10 | 1 | 1 | 1 | | 1 | 1 | 1 | | | | | 1 | | | | 1 | 1 | 1 |

Fig. 10

| Table Name | Segment Name | Brand # | City # | Country # | Customer # | Date | Item # | Line # | Office # | Order # | Order Line # | Received Date | Region # | Sales Region # | Sales Rep # | Site # | SKU # | State # | Warehouse # |
|---|---|---|---|---|---|---|---|---|---|---|---|---|---|---|---|---|---|---|---|
|  | | 11 | 10 | 14 | 8 | 4 | 10 | 11 | 6 | 2 | 1 | 5 | 13 | 8 | 6 | 5 | 6 | 11 | 4 |
| Brands | 1 | 1 | | | | | | | | | | | | | | | | | |
| Cities | 4 | | 1 | 1 | | | | | | | | | | | | | | 1 | |
| Countries | 1 | | | 1 | | | | | | | | | | | | | | | |
| Customers | 1 | | | | 1 | | | | | | | | | | | | | | |
| Customer Sites | 2 | | | | 1 | | | | | | | | | | | 1 | | | |
| Inventory | 10 | 1 | 1 | 1 | | 1 | 1 | 1 | | | | | 1 | | | | 1 | 1 | 1 |
| Inventory by Date, Item, Region | 6 | 1 | | 1 | | 1 | 1 | 1 | | | | | 1 | | | | | | |
| Items | 3 | 1 | | | | | 1 | 1 | | | | | | | | | | | |
| Lines | 1 | | | | | | | 1 | | | | | | | | | | | |
| Offices | 6 | | 1 | 1 | | | | | 1 | | | | 1 | 1 | 1 | | | 1 | |
| Orders | 10 | | 1 | 1 | 1 | | | | 1 | 1 | | | 1 | 1 | 1 | | | 1 | |
| Orders by Received Date, Brand, Line and Item | 4 | 1 | | | | | 1 | 1 | | | | 1 | | | | | | | |
| Orders by Received Date, Item, Customer | 5 | 1 | | | 1 | | 1 | 1 | | | | 1 | | | | | | | |
| Orders by Received Date, Office | 7 | | 1 | 1 | | | | | 1 | | | 1 | 1 | 1 | | | | 1 | |
| Orders by Received Date, Sales Region, Customer | 3 | | | | 1 | | | | | | | 1 | | 1 | | | | | |
| Order Details | 15 | 1 | 1 | 1 | 1 | | 1 | 1 | 1 | 1 | 1 | | 1 | 1 | 1 | 1 | | 1 | |
| Regions | 2 | | | 1 | | | | | | | | | 1 | | | | | | |
| Sales Regions | 1 | | | | | | | | | | | | | 1 | | | | | |
| Sales Rep Pictures | 1 | | | | | | | | | | | | | | 1 | | | | |
| Sales Reps | 1 | | | | | | | | | | | | | | 1 | | | | |
| SKU Items | 4 | 1 | | | | | 1 | 1 | | | | | | | | | 1 | | |
| States | 3 | | | 1 | | | | | | | | | 1 | | | | | 1 | |
| Warehouses | 5 | | 1 | 1 | | | | | | | | | 1 | | | | | 1 | 1 |
| Dim-Locations | 7 | | 1 | 1 | | | | | 1 | | | | 1 | 1 | | | | 1 | 1 |
| Dim-Products | 4 | 1 | | | | | 1 | 1 | | | | | | | | | 1 | | |
| Dim-Customers | 2 | | | | 1 | | | | | | | | | | | 1 | | | |
| Dim-Sales Reps | 1 | | | | | | | | | | | | | | 1 | | | | |
| Dim-Date | 1 | | | | | 1 | | | | | | | | | | | | | |
| Fact-Orders | 14 | 1 | 1 | 1 | 1 | | 1 | 1 | 1 | | | 1 | 1 | 1 | 1 | 1 | 1 | 1 | |
| Fact-Inventory | 10 | 1 | 1 | 1 | | 1 | 1 | 1 | | | | | 1 | | | | 1 | 1 | 1 |

Fig. 11

| Table Name | Segment Name | Brand # | City # | Country # | Customer # | Date | Item # | Line # | Office # | Order # | Order Line # | Received Date | Region # | Sales Region # | Sales Rep # | Site # | SKU # | State # | Warehouse # |
|---|---|---|---|---|---|---|---|---|---|---|---|---|---|---|---|---|---|---|---|
|  |  | 11 | 10 | 14 | 8 | 4 | 10 | 11 | 6 | 2 | 1 | 5 | 13 | 8 | 6 | 5 | 6 | 11 | 4 |
| Order Details | 15 | 1 | 1 | 1 | 1 |  | 1 | 1 | 1 | 1 | 1 |  | 1 | 1 | 1 | 1 | 1 | 1 |  |
| Fact-Orders | 14 | 1 | 1 | 1 | 1 |  | 1 | 1 | 1 |  |  | 1 | 1 | 1 | 1 | 1 | 1 | 1 |  |
| Inventory | 10 | 1 | 1 | 1 | 1 |  | 1 |  |  |  |  |  | 1 | 1 |  |  | 1 | 1 | 1 |
| Orders | 10 |  | 1 | 1 | 1 |  |  |  |  | 1 |  |  | 1 | 1 | 1 | 1 | 1 | 1 |  |
| Fact-Inventory | 10 | 1 | 1 | 1 |  |  | 1 | 1 | 1 |  |  |  | 1 |  |  |  | 1 | 1 | 1 |
| Orders by Received Date, Office | 7 |  | 1 | 1 |  |  |  |  | 1 |  |  | 1 | 1 | 1 |  |  |  | 1 |  |
| Dim-Locations | 7 |  | 1 | 1 |  |  |  |  | 1 |  |  |  | 1 | 1 |  |  |  | 1 | 1 |
| Inventory by Date, Item, Region | 6 | 1 |  | 1 |  | 1 | 1 | 1 |  |  |  |  | 1 |  |  |  |  |  |  |
| Offices | 6 |  | 1 | 1 |  |  |  |  | 1 |  |  |  | 1 | 1 |  |  |  | 1 |  |
| Orders by Received Date, Item, Customer | 5 | 1 |  |  | 1 |  | 1 |  | 1 |  |  | 1 |  |  |  |  |  |  |  |
| Warehouses | 5 |  | 1 | 1 |  |  |  |  |  |  |  |  | 1 |  |  |  |  | 1 | 1 |
| Cities | 4 |  | 1 | 1 |  |  |  |  |  |  |  |  | 1 |  |  |  |  | 1 |  |
| Orders by Received Date, Brand, Line and Item | 4 | 1 |  |  |  |  | 1 | 1 |  |  |  | 1 |  |  |  |  |  |  |  |
| SKU Items | 4 | 1 |  |  |  |  | 1 | 1 |  |  |  |  |  |  |  |  | 1 |  |  |
| Dim-Products | 4 | 1 |  |  |  |  | 1 | 1 |  |  |  |  |  |  |  |  | 1 |  |  |
| Items | 3 | 1 |  |  |  |  | 1 | 1 |  |  |  |  |  |  |  |  |  |  |  |
| Orders by Received Date, Sales Region, Customer | 3 |  |  |  | 1 |  |  |  |  |  |  | 1 |  | 1 |  |  |  |  |  |
| States | 3 |  |  | 1 |  |  |  |  |  |  |  |  | 1 |  |  |  |  | 1 |  |
| Customer Sites | 2 |  |  |  | 1 |  |  |  |  |  |  |  |  |  |  | 1 |  |  |  |
| Regions | 2 |  |  | 1 |  |  |  |  |  |  |  |  | 1 |  |  |  |  |  |  |
| Dim-Customers | 2 |  |  |  | 1 |  |  |  |  |  |  |  |  |  |  | 1 |  |  |  |
| Brands | 1 | 1 |  |  |  |  |  |  |  |  |  |  |  |  |  |  |  |  |  |
| Countries | 1 |  |  | 1 |  |  |  |  |  |  |  |  |  |  |  |  |  |  |  |
| Customers | 1 |  |  |  | 1 |  |  |  |  |  |  |  |  |  |  |  |  |  |  |
| Lines | 1 |  |  |  |  |  |  | 1 |  |  |  |  |  |  |  |  |  |  |  |
| Sales Regions | 1 |  |  |  |  |  |  |  |  |  |  |  |  | 1 |  |  |  |  |  |
| Sales Rep Pictures | 1 |  |  |  |  |  |  |  |  |  |  |  |  |  | 1 |  |  |  |  |
| Sales Reps | 1 |  |  |  |  |  |  |  |  |  |  |  |  |  | 1 |  |  |  |  |
| Dim-Sales Reps | 1 |  |  |  |  |  |  |  |  |  |  |  |  |  | 1 |  |  |  |  |
| Dim-Date | 1 |  |  |  |  | 1 |  |  |  |  |  |  |  |  |  |  |  |  |  |

Fig. 12

| | Segment Name | Brand # | City # | Country # | Customer # | Date | Item # | Line # | Office # | Order # | Order Line # | Received Date | Region # | Sales Region # | Sales Rep # | Site # | SKU # | State # | Warehouse # |
|---|---|---|---|---|---|---|---|---|---|---|---|---|---|---|---|---|---|---|---|
| Order Details | 15 | 1 | 1 | 1 | 1 | | 1 | 1 | 1 | | 1 | 1 | 1 | 1 | 1 | 1 | 1 | 1 | |
| Fact-Orders | 14 | 1 | 1 | 1 | 1 | | 1 | 1 | 1 | | 1 | | 1 | 1 | 1 | 1 | 1 | 1 | 1 |

Fig. 13

| | Segment Name | Brand # | City # | Country # | Customer # | Date | Item # | Line # | Office # | Order # | Order Line # | Received Date | Region # | Sales Region # | Sales Rep # | Site # | SKU # | State # | Warehouse # |
|---|---|---|---|---|---|---|---|---|---|---|---|---|---|---|---|---|---|---|---|
| Order Details | 15 | 1 | 1 | 1 | 1 | | 1 | 1 | 1 | | 1 | 1 | 1 | 1 | 1 | 1 | 1 | 1 | |
| Inventory | 10 | 1 | 1 | 1 | | 1 | 1 | 1 | | | | | 1 | | | | 1 | 1 | 1 |

Fig. 14

| Table Name | Segment Name | Brand # | City # | Country # | Customer # | Date | Item # | Line # | Office # | Order # | Order Line # | Received Date | Region # | Sales Region # | Sales Rep # | Site # | SKU # | State # | Warehouse # |
|---|---|---|---|---|---|---|---|---|---|---|---|---|---|---|---|---|---|---|---|
|  |  | 5 | 4 |  | 6 |  | 7 | 5 | 4 | 2 | 1 | 5 |  | 4 | 4 | 3 | 5 | 5 | 4 |
| Brands | 1 | 1 |  |  |  |  |  |  |  |  |  |  |  |  |  |  |  |  |  |
| Cities | 4 |  | 1 | 1 |  |  |  |  |  |  |  |  |  | 1 |  |  |  |  | 1 |
| Countries | 1 |  |  | 1 |  |  |  |  |  |  |  |  |  |  |  |  |  |  |  |
| Customers | 1 |  |  |  | 1 |  |  |  |  |  |  |  |  |  |  |  |  |  |  |
| Customer Sites | 2 |  |  |  | 1 |  |  |  |  |  |  |  |  |  |  | 1 |  |  |  |
| Inventory | 3 |  |  |  |  |  | 1 |  |  |  |  |  |  |  |  |  |  | 1 | 1 |
| Inventory by Date, Item, Region | 4 |  |  |  |  | 1 | 1 |  |  |  |  |  | 1 |  |  |  |  |  |  |
| Items | 1 |  |  |  |  |  | 1 |  |  |  |  |  |  |  |  |  |  |  |  |
| Lines | 1 |  |  |  |  |  |  | 1 |  |  |  |  |  |  |  |  |  |  |  |
| Offices | 1 |  |  |  |  |  |  |  | 1 |  |  |  |  |  |  |  |  |  |  |
| Orders | 1 |  |  |  |  |  |  |  |  | 1 |  |  |  |  |  |  |  |  |  |
| Orders by Received Date, Brand, Line and Item | 4 | 1 |  |  |  |  | 1 | 1 |  |  |  | 1 |  |  |  |  |  |  |  |
| Orders by Received Date, Item, Customer | 3 |  |  |  | 1 |  | 1 |  |  |  |  | 1 |  |  |  |  |  |  |  |
| Orders by Received Date, Office | 2 |  |  |  |  |  |  |  | 1 |  |  | 1 |  |  |  |  |  |  |  |
| Orders by Received Date, Sales Region, Customer | 3 |  |  |  | 1 |  |  |  |  |  |  | 1 |  | 1 |  |  |  |  |  |
| Order Details | 2 |  |  |  |  |  |  |  |  |  | 1 | 1 |  |  |  |  |  |  |  |
| Regions | 2 |  |  | 1 |  |  |  |  |  |  |  |  | 1 |  |  |  |  |  |  |
| Sales Regions | 1 |  |  |  |  |  |  |  |  |  |  |  |  | 1 |  |  |  |  |  |
| Sales Rep Pictures | 1 |  |  |  |  |  |  |  |  |  |  |  |  |  | 1 |  |  |  |  |
| Sales Reps | 1 |  |  |  |  |  |  |  |  |  |  |  |  |  | 1 |  |  |  |  |
| SKU Items | 1 |  |  |  |  |  |  |  |  |  |  |  |  |  |  |  | 1 |  |  |
| States | 3 |  | 1 |  |  |  |  |  |  |  |  |  |  |  |  |  |  | 1 |  |
| Warehouses | 1 |  |  |  |  |  |  |  |  |  |  |  |  |  |  |  |  |  | 1 |
| Dim-Locations | 7 |  | 1 | 1 |  |  |  |  |  |  |  |  |  | 1 | 1 |  |  | 1 | 1 |
| Dim-Products | 4 | 1 |  |  |  |  | 1 | 1 |  |  |  |  |  |  |  |  | 1 |  |  |
| Dim-Customers | 2 |  |  |  | 1 |  |  |  |  |  |  |  |  |  |  | 1 |  |  |  |
| Dim-Sales Reps | 1 |  |  |  |  |  |  |  |  |  |  |  |  |  | 1 |  |  |  |  |
| Dim-Date | 1 |  |  |  |  | 1 |  |  |  |  |  |  |  |  |  |  |  |  |  |
| Fact-Orders | 14 | 1 | 1 | 1 | 1 | 1 | 1 | 1 | 1 | 1 |  | 1 | 1 | 1 | 1 | 1 | 1 | 1 |  |
| Fact-Inventory | 10 | 1 | 1 | 1 |  | 1 | 1 | 1 |  |  |  |  | 1 |  |  |  |  | 1 | 1 | 1 |

Fig. 15

| Table | Attributes |
|---|---|
| Brands | Brand # |
| Cities | Country #, Region #, State #, City # |
| Countries | Country # |
| Customers | Customer # |
| Customer Sites | Customer #, Site # |
| Dim-Customers | Customer #, Site # |
| Dim-Date | Date, Day-of-Month, Day-of-Week, Holiday, Quarter #, Week # |
| Dim-Locations | Country #, Region #, State #, City #, Warehouse #, Office #, Sales Region # |
| Dim-Products | Brand #, Line #, Item #, SKU # |
| Dim-Sales Reps | Sales Rep # |
| Fact-Inventory | Date, Country #, Region #, State #, City #, Warehouse #, Brand #, Line #, Item #, SKU #, Quantity on Hand |
| Fact-Orders | Customer #, Site #, Date, Country #, Region #, State #, City #, Office #, Sales Region #, Brand #, Line #, Item #, SKU #, Sales Rep #, Units, Cost |
| Inventory | Warehouse #, SKU #, Date, Quantity on Hand |
| Inventory by Date, Item and Region | Country #, Region #, Item #, Date, Quantity on Hand |
| Items | Brand #, Line #, Item # |
| Lines | Line # |
| Offices | Country #, Region #, State #, City #, Office #, Sales Region # |
| Orders | Order #, Sales Rep #, Customer #, Site #, Office #, Received Date |
| Orders by Received Date, Brand, Line, and Item | Received Date, Brand #, Line #, Item #, Units, Cost |
| Orders by Received Date, Item and Customer | Received Date, Item #, Customer #, Units, Cost |
| Orders by Received Date, Offices | Received Date, Office #, Cost |
| Orders by Received Date, Sales Regions and Customers | Received Date, Sales Region #, Customer #, Cost |
| Order Details | Order #, Order Line #, SKU #, Units, Cost |
| Regions | Country #, Region # |
| Sales Regions | Sales Region # |
| Sales Rep Pictures | Sales Rep # |
| Sales Reps | Sales Rep # |
| SKU Items | Item #, SKU #, Colour, Size |
| States | Country #, Region #, State # |
| Warehouses | Country #, Region #, State #, City #, Warehouse # |

Fig. 16

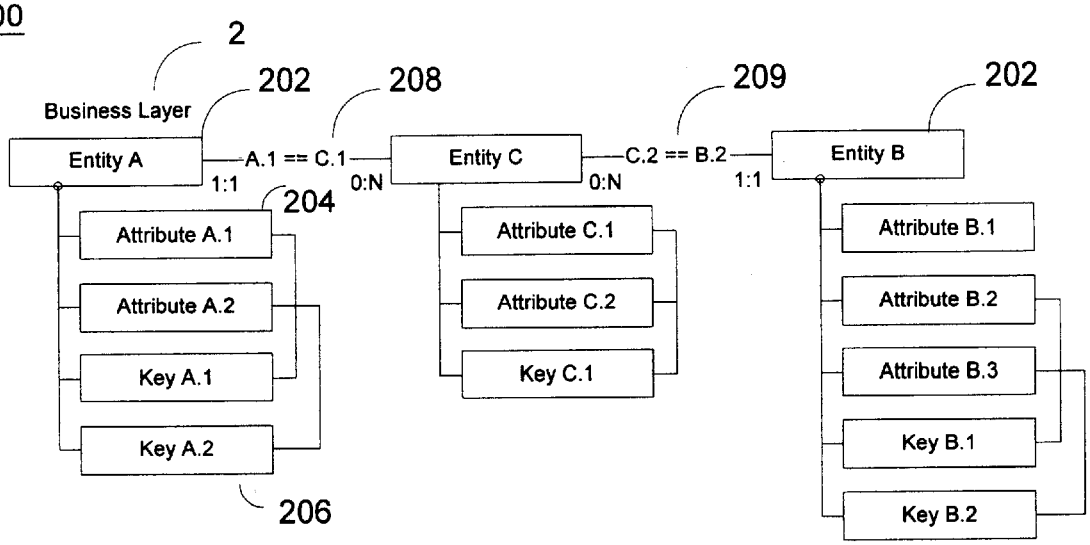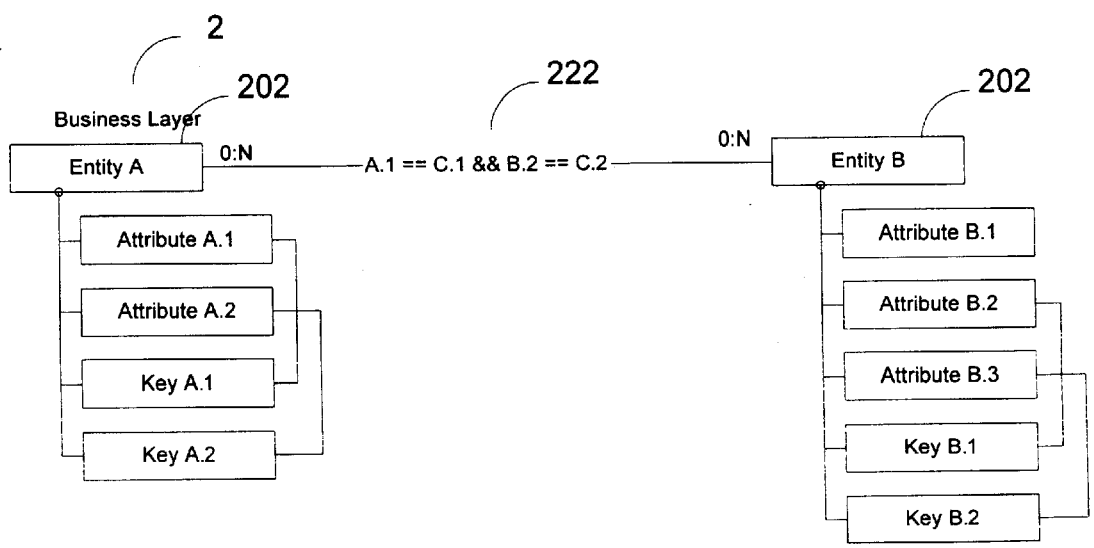
Fig. 18

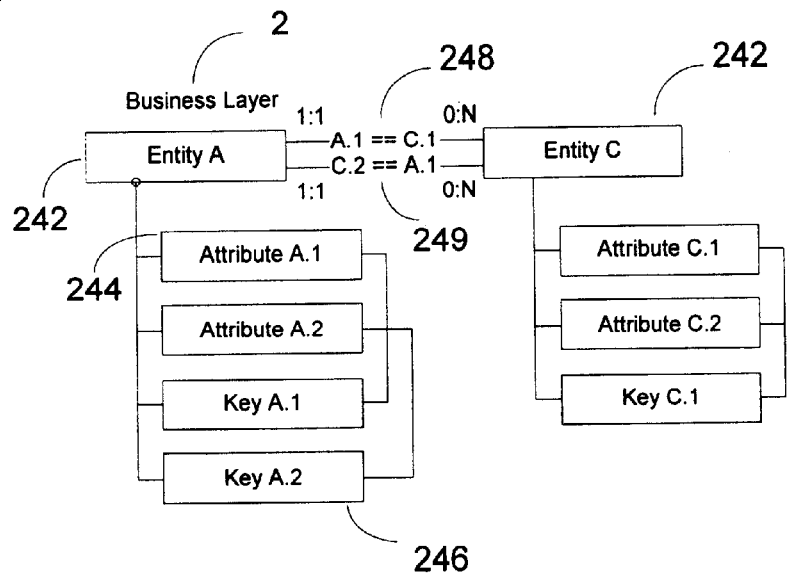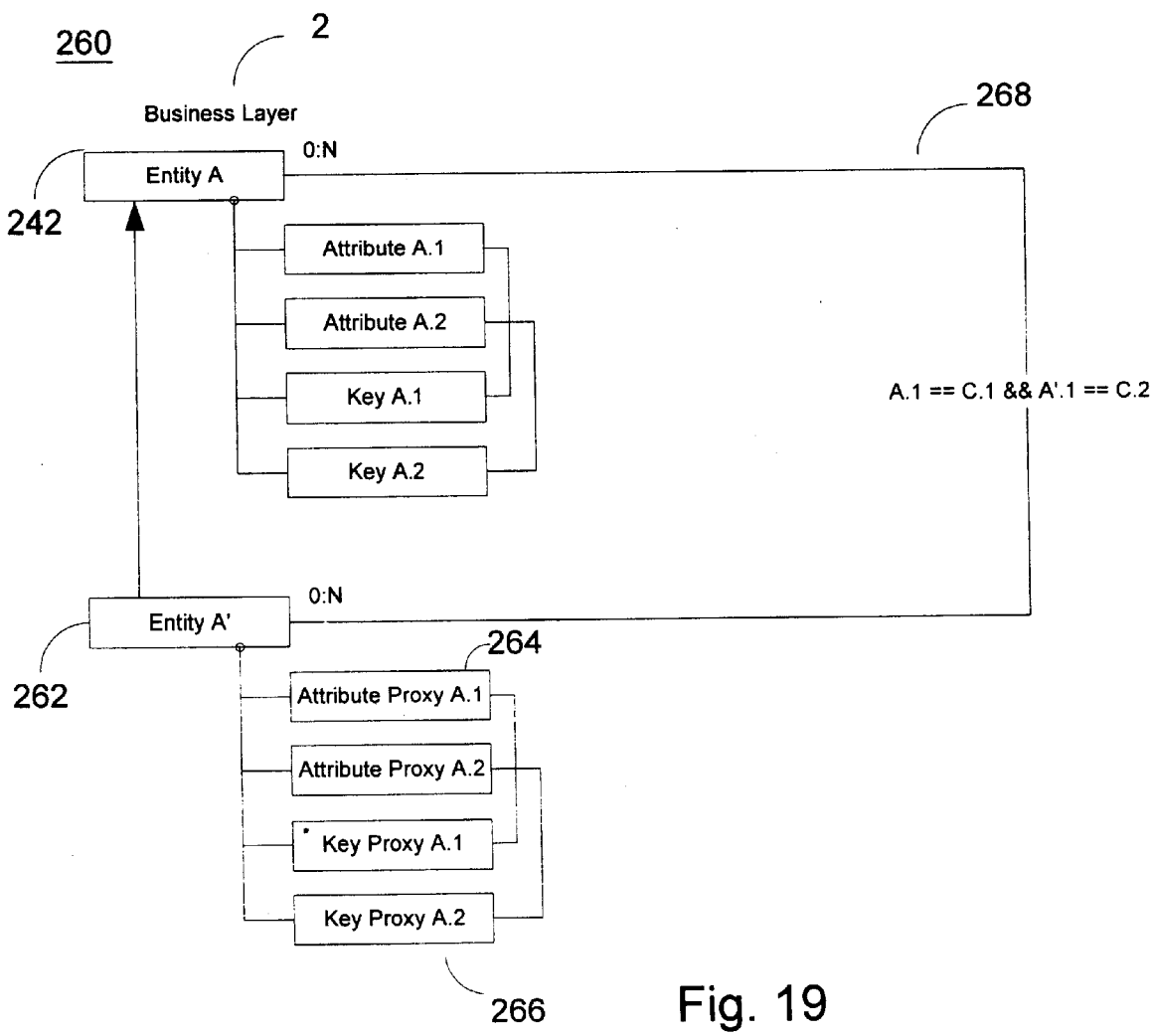
Fig. 19

Query Specification Data Layout 1004a

```
query specification 1004
    · edge 1031
        · level 1032
            · data area   (dimension data area) 1033
                · query item 1034
                · key 1035
                · sort item 1036
            · data area (measure data area) 1037
                · query item 1038
                · sort item1039
```

Query Specification Data Access 1004b

```
query specification 1004
    · query unit 1041
        · query unit item 1042
    · joins (model) 1043
    · joins (dynamic) 1044
    · filters 1045
```

Entity: Customer
    Attributes
        Customer Number
        Name
        Address
    Key
        Customer Number Entity: Order
    Attributes
        Order Number
        Customer Number
        Customer PO number
        Order Date
    Key
        Order Number
    Key
        Customer Number
        Customer PO Number Entity: Order Detail
    Attributes
        Order Number
        Order Line Number
        Product Number
        Quantity
    Key
        Order Number
        Order Line Number Join: Customer-Order
    From: Customer (1:1) To: Order (1:n) By: association
    Using: [Customer.Customer Number] = [Order.Customer Number]

Join: Order-OrderDetail
    From: Order (1:1) To: Order Detail (1:n) By: containment
    Using: [Order.Order Number] = [Order Detail.Order Number]

Fig. 48

QUERY ENGINE AND METHOD FOR QUERYING DATA USING METADATA MODEL

FIELD OF THE INVENTION

The present invention relates generally to a query engine and method for querying data, and more particularly, to a query engine and method for querying data using a metadata model which models underlying data sources.

BACKGROUND OF THE INVENTION

It is known to use data processing techniques to design information systems for storing and retrieving data. Data is any information, generally represented in binary, that a computer receives, processes, or outputs. A database or data warehouse is a shared pool of interrelated data. Information systems are used to store, manipulate and retrieve data from databases.

Traditionally, file processing systems were often used as information systems. File processing systems usually consist of a set of files and a collection of application programs. Permanent records are stored in the files, and application programs are used to update and query the files. Such application programs are generally developed individually to meet the needs of different groups of users. Information systems using file processing techniques have a number of disadvantages. Data is often duplicated among the files of different users. The lack of coordination between files belonging to different users often leads to a lack of data consistency. Changes to the underlying data requirements usually necessitate major changes to existing application programs. There is a lack of data sharing, reduced programming productivity, and increased program maintenance. File processing techniques, due to their inherent difficulties and lack of flexibility, have lost a great deal of their popularity and are being replaced by database management systems (DBMSs).

A DBMS is a software system for assisting users to create reports from data stores by allowing for the definition, construction, and manipulation of a database. The main purpose of a DBMS system is to provide data independence, i.e., user requests are made at a logical level without any need for knowledge as to how the data is stored in actual files in the database. Data independence implies that the internal file structure could be modified without any change to the users' perception of the database. However, existing DBMSs are not successful in providing data independence, and requires users to have knowledge of physical data structures, such as tables, in the database.

To achieve better data independence, it is proposed to use three levels of database abstraction. With respect to the three levels of database abstraction, reference is made to FIG. 1.

The lowest level in the database abstraction is the internal level 1. In the internal level 1, the database is viewed as a collection of files organized according to an internal data organization. The internal data organization may be any one of several possible internal data organizations, such as $B^+$-tree data organization and relational data organization.

The middle level in the database abstraction is the conceptual level 2. In the conceptual level 2, the database is viewed at an abstract level. The user of the conceptual level 2 is thus shielded from the internal storage details of the database viewed at the internal level 1.

The highest level in the database abstraction is the external level 3. In the external level 3, each group of users has their own perception or view of the database. Each view is derived from the conceptual level 2 and is designed to meet the needs of a particular group of users. To ensure privacy and security of data, each group of users only has access to the data specified by its particular view for the group.

The mapping between the three levels of database abstraction is the task of the DBMS. When the data structure or file organization of the database is changed, the internal level 1 is also changed. When changes to the internal level 1 do not affect the conceptual level 2 and external level 3, the DBMS is said to provide for physical data independence. When changes to the conceptual level 2 do not affect the external level 3, the DBMS is said to provide for logical data independence.

Typical DBMSs use a data model to describe the data and its structure, data relationships, and data constraints in the database. Some data models provide a set of operators that are used to update and query the database. DBMSs may be classified as either record based systems or object based systems. Both types of DBMSs use a data model to describe databases at the conceptual level 2 and external level 3.

Data models may also be called metadata models as they store metadata, i.e., data about data in databases.

Three main existing data models used in record based systems are the relational model, the network model and the hierarchical model.

In the relational model, data is represented as a collection of relations. To a large extent, each relation can be thought of as a table. A typical relational database contains catalogues, each catalogue contains schemas, and each schema contain tables, views, stored procedures and synonyms. Each table has columns, keys and indexes. A key is a set of columns whose composite value is distinct for all rows. No proper subset of the key is allowed to have this property. A table may have several possible keys. Data at the conceptual level 2 is represented as a collection of interrelated tables. The tables are normalized so as to minimize data redundancy and update anomalies. The relational model is a logical data structure based on a set of tables having common keys that allow the relationships between data items to be defined without considering the physical database organization.

A known high level conceptual data model is the Entity-Relationship (ER) model. In an ER model, data is described as entities, attributes and relationships. An entity is anything about which data can be stored. Each entity has a set of properties, called attributes, that describe the entity. A relationship is an association between entities. For example, a professor entity may be described by its name, age, and salary and can be associated with a department entity by the relationship "works for".

Existing information systems use business intelligence tools or client applications that provide data warehousing and business decision making and data analysis support services using a data model. In a typical information system, a business intelligence tool is conceptually provided on the top of a data model, and underneath of the data model is a database. The data model of existing information systems typically has layers corresponding to the external level 3 and the internal level 1. Some data models may use a layer corresponding to both the external level 3 and the conceptual level 2.

Existing data models are used for the conceptual design of databases. When a system designer constructs an information system, the designer starts from a higher abstraction level 3 and moves down to a lower abstraction level 1, as symbolised in FIG. 1 by arrows.

That is, the system designer first performs logical design. At the logical design stage, the designer considers entities of interest to the system users and identifies at an abstract level information to be recorded about entities. The designer then determines conceptual scheme, i.e., the external level 3 and/or conceptual level 2 of a data model. After the logical design is completed, the designer next performs physical design. At the physical design stage, the designer decides how the data is to be represented in a database. The designer then creates the corresponding storage scheme, i.e., the structure of a database, and provides mapping between the internal level 1 of the data model and the database.

Existing business intelligence tools thus each provides a different paradigm for retrieving and delivering information from a database. Accordingly, it is difficult to share information in the database among different business intelligence tools.

It is common that in a single organization, each group of users has its own established information system that uses its corresponding database. Thus, the single organization often has multiple databases. Those databases often contain certain types of information which are useful for multiple groups of users. Such types of information may include information about business concepts, data retrieval, and user limits and privileges. However, each information system was designed and constructed in accordance with specific needs of the group, and may use a different business intelligence tool from others. These differences in the information systems and business intelligence tools used do not allow sharing the information already existing in the databases among multiple groups of users.

In addition, these existing business intelligence tools use different ways of retrieving data from the underlying database. Thus, it is not possible, without major modifications, to use an existing business intelligence tool to retrieve data from a database which is built for a different business intelligence tool.

Accordingly, it is desirable to provide a query engine which allows use of different business intelligence tools or client applications to retrieve data from shared data sources.

SUMMARY OF THE INVENTION

The present invention is directed to a query engine which formulates a data source query by interacting to model objects having business intelligence contained in a metadata model representing underlying one or more data sources.

According to one aspect of the present invention, there is provided a query engine for formulating a query to obtain data from one or more data sources using a client application receiving user inputs and a metadata model containing model objects that represent the data sources. The query engine comprises a query specification interface for allowing the client application to generate a query specification based on a user input, and receiving the generated query specification. The query engine also comprises a query engine component for translating the query specification into a data source query which is applicable to the data sources, based on model objects in the metadata model having business intelligence.

According to another aspect of the present invention, there is provided a method for formulating a query to obtain data from one or more data sources using a client application receiving user inputs and a metadata model containing model objects that represent the data sources. The method comprises generating a query specification based on a user input using the client application; receiving the generated query specification; and translating the query specification into a data source query which is applicable to the data sources, based on model objects in the metadata model having business intelligence.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Embodiments of the invention will now be described with reference to the accompanying drawings, in which:

FIG. 4B is tables showing an example of a set of transformations;

FIG. 7 is a chart showing flags used in the metadata model;

FIG. 10 is a table representing the process state

FIG. 11 is a table showing an example of results of a step of a transformation;

FIG. 12 is a table showing an example of results of a step of the transformation;

FIG. 13 is a part of the table of FIG. 12;

FIG. 14 is a part of the table of FIG. 12;

FIG. 15 is a table showing an example of results of a step of the transformation;

FIG. 16 is an example of tables;

FIG. 18 is a diagram showing examples of source and target of a transformation;.

FIG. 19 is a diagram showing examples of source and target of a transformation;

FIG. 48 is a diagram showing the model definitions to illustrate the removal of redundant break clauses.

DETAILED DESCRIPTION OF EMBODIMENTS OF THE INVENTION

Figure 2:
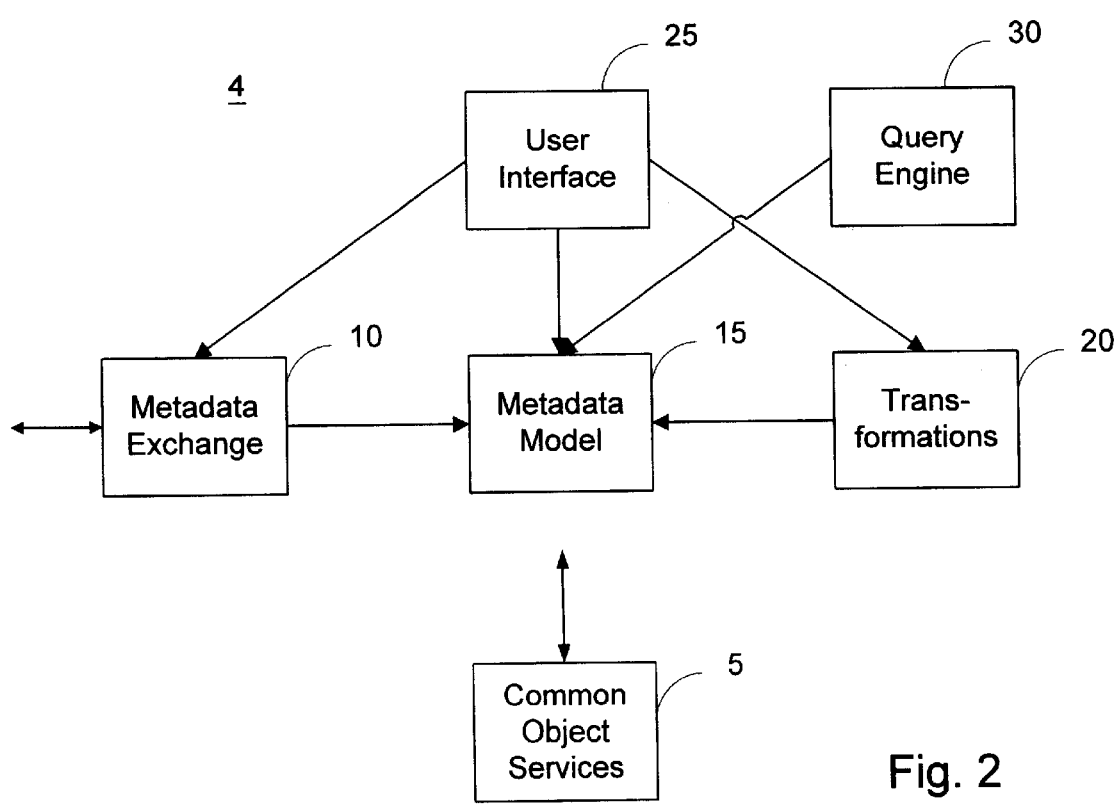
FIG. 2 is a diagram showing a reporting system in accordance with an embodiment of the present invention.

FIG. 2 illustrates a reporting system 4 to which an embodiment of the present invention is suitably applied. The reporting system 4 provides a single administration point for metadata that supports different business intelligence tools or client applications. Thus, it enables different business intelligence tools to extract and interpret data from various data sources in the same way.

The reporting system 4 includes common object services (COS) 5, a metadata exchange 10, a metadata model 15, a metadata model transformer or transformations 20, a user interface 25 and a query engine 30. The fundamental objective of the reporting system 4 is to provide a rich business-oriented metadata model 15 that allows the query engine 30 to generate the best queries of which it is capable, and allows users to build queries, reports and cubes with the aid of the query engine 30 to obtain desired reports from underlying data sources. To this end, COS 5, metadata exchange 10 and transformations 20 are provided.

Prior to describing the metadata model 15 and the transformations 20 in detail, each element of the reporting system 4 is briefly described.

COS 5 defines the framework for object persistence. Object persistence is the storage, administration and management of objects on a physical device and transfer of those objects to and from memory as well as the management of those objects on the physical device. The double head arrow from COS 5 in FIG. 2 represents that COS 5 communicates with all other elements shown in FIG. 2. COS 5 performs functions such as creating new objects, storing them on disk, deleting them, copying them, moving them, handling change isolation (check-in, check-out) and object modelling. COS 5 uses a modelling language, such as Comet Modelling Language (CML) that generates C++ code.

Figure 2A:
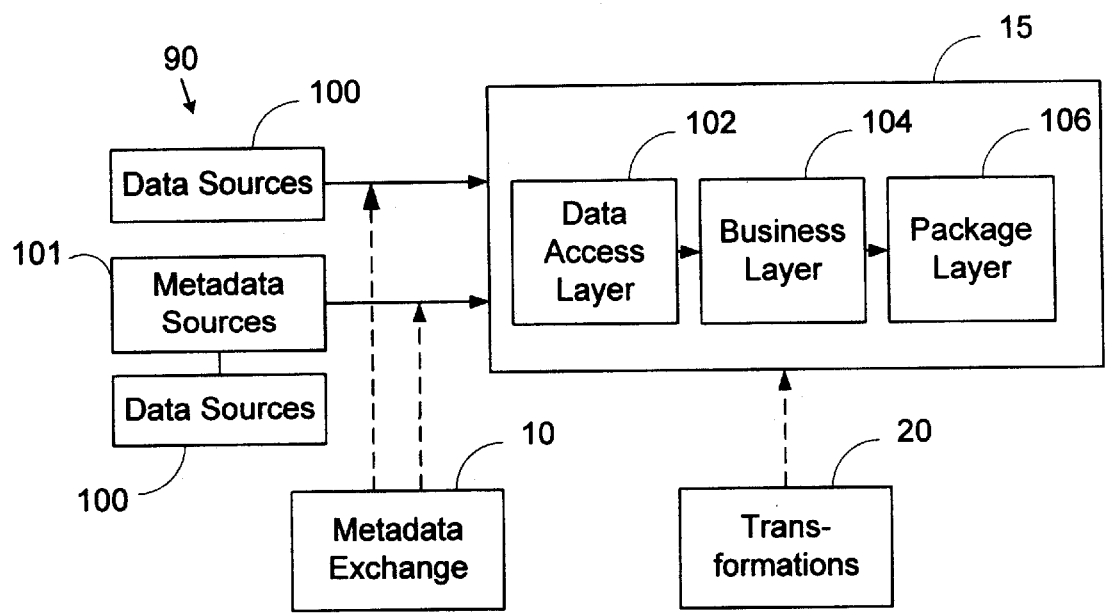
FIG. 2A is a diagram showing functions of the metadata exchange and transformations shown in FIG. 2.

The metadata exchange 10 is used to obtain metadata from external physical sources. Metadata is obtained from one or more external sources of metadata. As shown in FIG. 2A, external sources of metadata may be one or more data sources 100 and/or one or more metadata sources 101. Data sources 100 contain physical data. Examples of data sources 100 include databases and files. Metadata sources 101 contain descriptive information about data sources. Metadata sources 101 are also known as metadata repositories. Metadata repositories may be third party repositories. Metadata sources 101 generally have underlying data sources 100 containing physical data. The metadata exchange 10 facilitates importation of metadata from external sources 100 and 101 into the metadata model 15. Also, the metadata exchange 10 may facilitates exportation of metadata from the metadata model 15 to external metadata repositories.

Figure 1:
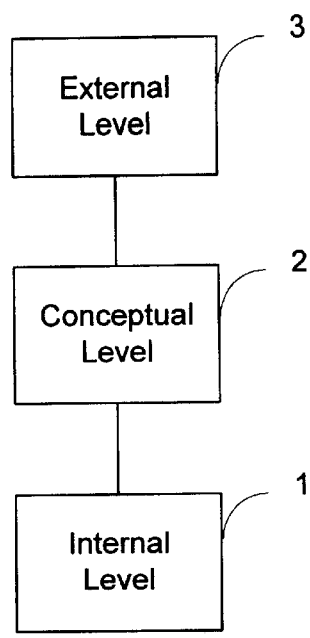
FIG. 1 is a diagram showing a structure of metadata model.

The metadata model 15 stores metadata about its underlying one or more data sources 100. It is used to provide a common set of business-oriented abstractions of the underlying data sources 100. The metadata model 15 defines the objects that are needed to define client applications that users build. The metadata model 15 provides three layers to realize three levels of abstractions of data sources 100 as described above referring to FIG. 1. The three layers are a physical layer or data access layer 102, a business layer 104 and a presentation layer or package layer 106.

Transformations 20 are used to complete the metadata model 15. For example, when a database is introduced to the reporting system 4, metadata is imported from the database into the metadata model 15. Metadata may also be imported from one or more metadata repositories or other data sources. Sufficient metadata may be imported from a database that would build only a small number of the objects that would actually be needed to execute queries. However, if such metadata does not have good mapping to the metadata model 15, then the transformations 20 can be used to provide the missing pieces to complete the metadata model 15.

The user interface 25 is layered on top of the metadata model 15 as a basic maintenance facility. The user interface 25 provides users with the ability to browse through the metadata model 15 and manipulate the objects defined thereby. The user interface 25 is also a point of control for the metadata exchange 10, for executing transformations 20, and for handling check-in, check-out of model objects, i.e., changed information, as well as a variety of other administrative operation. The user interface 25 allows users for the performance of basic maintenance tasks on the objects in the metadata model 15, e.g., changing a name, descriptive text, or data type. The user interface 25 is a mechanism that involves the capabilities of the metadata exchange 10 and the transformations 20. The user interface 25 has the ability to diagram the metadata model 15, so that the user can see how objects are related.

The query engine 30 is responsible for taking the metadata model 15 and a user's request for information, and generating a query that can be executed against the underlining data sources, e.g., a relational database. The query engine 30 is basically the reason for the existence of the rest of the blocks. The objective of the query engine is to function as efficiently as possible and to preserve the semantics of the original question. A user may ask a question that is not precise. The request may be for something from "customers" and something from "products". But these may be related in multiple ways. The query engine 30 needs to figure out which relationship is used to relate "customers" and "products" to provide the user with information requested.

Figure 3:
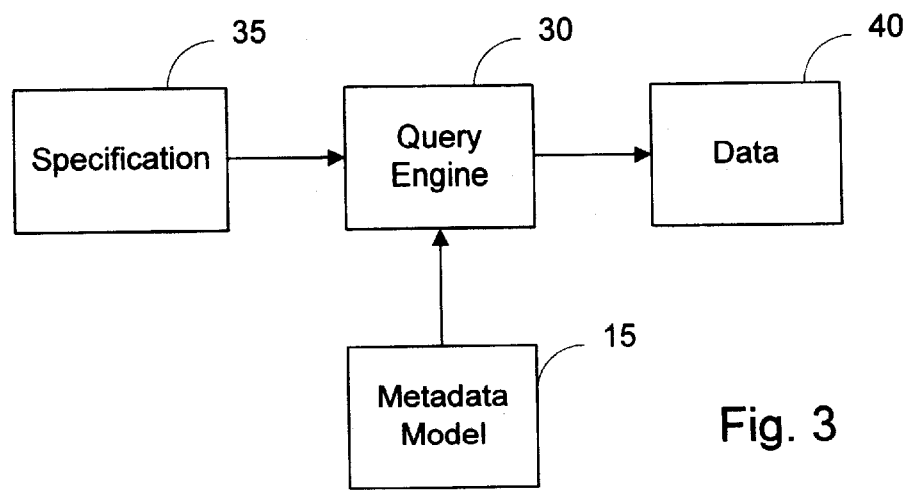
FIG. 3 is a diagram showing an example of a query engine shown in FIG. 2.

The use of the metadata model 15 by the query engine 30 is briefly described with reference to FIG. 3. A user uses a business intelligent tool or client application (not shown) to generate a user's request for information. Upon the receipt of the user's request, the client application generates an initial specification 35 based on the request. The specification 35 may be ambiguous. Also, it may not be in a form that can be applied to the data sources directly. Using the information that is built in the metadata model 15, the query engine 30 makes the specification 35 unambiguous and builds a query in terms of the data access layer 102 for the specification 35. This intermediate formulation of the query is also called a physical query and is subsequently translated into a data source specification language. The data source specification language may be Structured Query Language (SQL). A query in a data source specification language can be executed on the data sources. Thus, the correct data 40 may be obtained.

Metadata Model 15

The metadata model 15 is a tool to supply the common metadata administration tool, unified and centralized modeling environment, and application program interfaces for business intelligence tools. The architecture of the metadata model 15 will now be described in further detail.

Figure 2B:
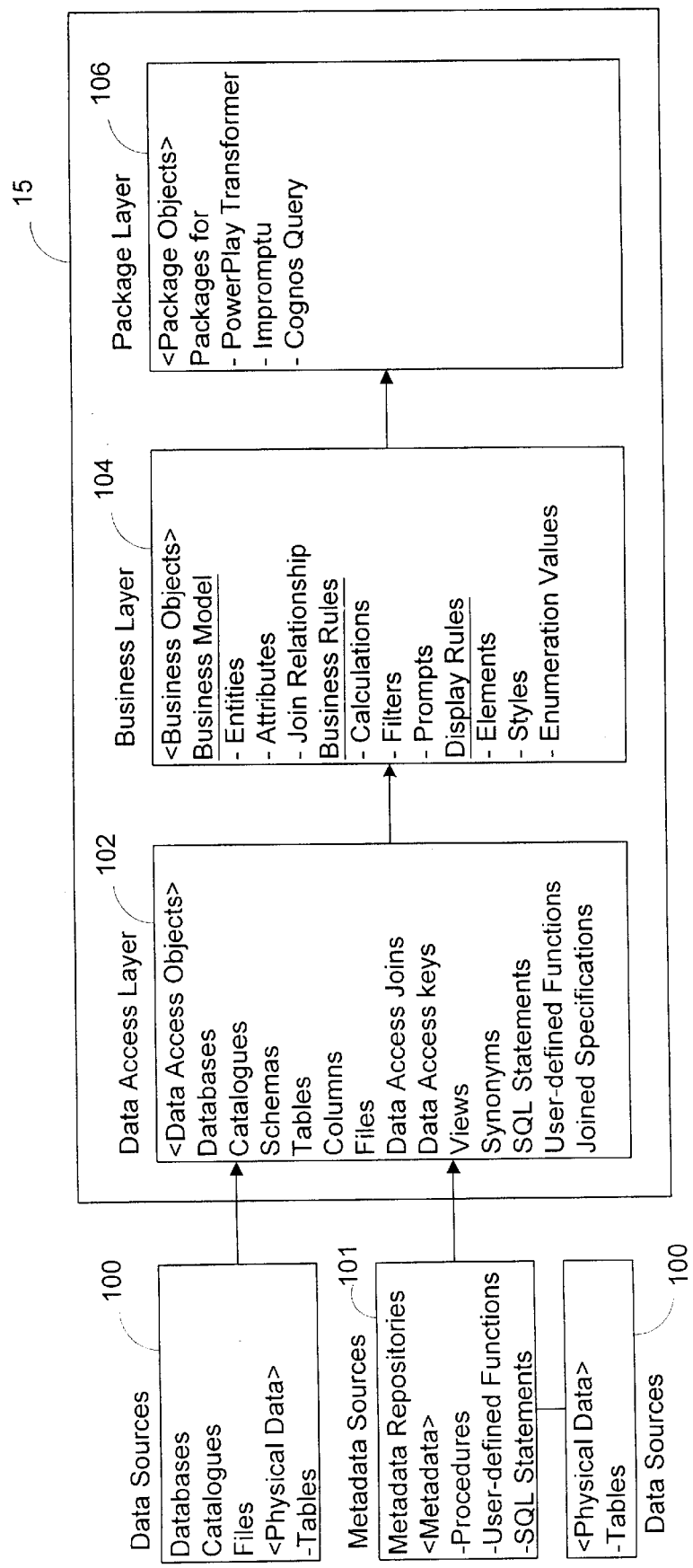
FIG. 2B is a diagram showing examples of objects contained in the metadata model shown in FIG. 2.

Metadata contained in the metadata model 15 is also called model objects. The metadata model 15 is organized as a single containment tree or a series of containment trees. A containment tree starts at the highest level with a model object. The model object itself is at the root of the tool, and all other objects, except the relationship objects, are contained within this root objects FIG. 2B shows the architecture of the metadata model 15. The metadata model is composed of several layers, namely, a physical layer or data access layer 102, a business layer 104 and a presentation layer or package layer 106. These layers correspond to those abstraction levels shown in FIG. 1.

The model objects contained in a higher abstraction layer may include objects which are constructed from a lower abstraction layer to the higher abstraction layer.

The model objects contained in a higher abstraction layer include objects which are constructed from a lower abstraction layer to the higher abstraction layer.

The data access layer 102 contains metadata that describes how to retrieve physical data from data sources 100. It is used to formulate and refine queries against the underlying data sources 100. The underlying data sources 100 may be a single or multiple data sources, as described above. Examples of data sources 100 include relational databases, such as Oracle, Sybase, DB2, SQL Server and Informix.

The data access layer 102 contains a part of the model objects that directly describe actual physical data in the data sources 100 and their relationships. These model objects may be called data access model objects. The data access model objects may include, among other things, databases, catalogues, schemas, tables, files, columns, data access keys, indexes and data access joins. Each table has one or more columns. Data access joins exist between tables. A data access key corresponds to a key in the data sources 100 that references one or more column names whose composite value is distinct for all rows in a table. A data access join is a relationship between two or more tables or files. Also, the data access model objects may include views, function stored procedures and synonyms, if applicable.

The data access model objects in the data access layer 102 are metadata, which are created as a result of importing metadata from data sources 100 and metadata sources 101 provided by users. Examples of metadata sources 101 include Impromptu Catalogue and Impromptu Web Query 2.12. The information of some data access objects may be available from the underlying data sources 100. Information for join relationships are not available from the underlying data sources 100. The user can customize some objects in the data access layer 102 in order to create data access joins, i.e., relationships between objects that were imported from various data sources. Also, the transformations 20 may transform the data access layer 102 to complete it.

Also, the data access layer 102 may allow users to define therein data source queries, such as SQL queries. Data source queries return a result set of physical data from underlying data sources 100. Those created data source queries are treated as objects in the data access layer 102 like tables. After data source queries are defined, a set of columns objects is generated for each data source query by the query engine 30 based on the SQL statement. Users may also define stored procedures and/or overloaded stored procedures, rather than importing them from metadata sources 101.

The business layer 104 describes the business view of the physical data in the underlying data sources 100. It is used to provide business abstractions of the physical data with which the query engine 30 can formulate queries against the underlying data sources 100.

The business layer 104 contains a part of the model objects that can be used to define in abstract terms the user's business entities and their inter relationships. These model objects may be called business model objects. The business model objects are reusable objects that represent the concepts and structure of the business to be used in business intelligence environments. They represent a single business model, although they can be related to physical data in a number of different data sources 100.

The business model objects consist of a business model, business rules and display rules. The business model may include entities, attributes, keys and joins. Joins may be also called join relationships. The user interface 25 can provide a view of the business model as an entity-relationship diagram. The business rules may include calculations, filters and prompts. The display rules may include elements, styles and enumeration values.

The business model objects are closely related to the data access model objects in the data access layer 102. For example, entities in the business layer 104 are related to tables in the data access layer 102 indirectly; and attributes in the business layer 104 correspond to columns in the data access layer 102. Business joins exist between entities. Each business model object has a partner in the data access layer 102, i.e., a relationship exists between a table and an entity. While the tables in the data sources 100 store data access layer objects in accordance with the design of its underlying data sources 100, the entities in the business layer 104 hold the metadata representing the business concept. Entities are collections of attributes.

Attributes of entities in the business layer 104 contain expressions related to columns of tables in the data access layer 102. An attribute is usually directly related to a single column of the data access layer 102. For example, the entity "customer" could have attributes "customer name", "customer address", and the like. In the simplest case, all the attributes of an entity in the business layer 104 are related one-to-one to the columns of a single table in the data access layer 102. However, the relationship is not always a one-to-one relationship. Also, an attribute may be expressed as a calculation based on other attributes, constants and columns. For example, an attribute may be a summary of data in other attributes, e.g., a total amount of all the orders placed by customer.

In the business layer 104, entities are related to other entities by joins. Joins are classified as one of containment, reference or association. A containment join represents a strong relationship between entities. For example, an entity OrderDetail would have no meaning without an entity OrderHeader. Thus, the entity OrderDetail is containment of the entity OrderHeader.

A reference join indicates that one entity acts as a lookup table with respect to the other. For example, OrderDetail and Products are related via a relationship. In this case, Products acts as a lookup table so the relationship is marked as a reference relationship.

An association join represents relationships between entities which are not categorised as containment or reference joins.

It is advantageous to categorize the joins into these three types because they should be treated differently when query paths are considered. For example, a reference join should not be taken as a query path because if multiple entities reference to an entity, the referenced entity could incorrectly relate the unrelated multiple entities to each other by a query path through the referenced entity. By identifying reference joins as such, query paths can easily avoid these joins.

In addition, an entity may inherit information from another entity using a technique called subtyping. A subtype entity may be specialization of its supertype entity. For example, an entity Employee is a supertype entity for a subtype entity Salesman. Generally, a subtype entity has more attributes than its supertype. In the above example, the entity Employee may have attributes EmployeeNumber, Name, and Salary; and the entity Salesman may have attributes Quota, Sales and Commission in addition to EmployeeNumber, Name, and Salary.

Entities and attributes in the business layer 104 are given user friendly meaningful names. For example, the column named CUSTNAM from the CUST table in the data access layer 102 could be mapped to Customer Name attribute contained in the Customer Entity in the business layer 104.

The ways of use of entity relationships in the metadata model 15 are different from those in conventional modelling tools. For example, in most Entity-Relationship (ER) modelling tools, the ER concept is used to provide an abstraction for defining a physical database, i.e., it is a different "view" of the physical database. Within the metadata model 15, the business layer 104 is used to provide an abstraction for reporting data from physical data sources 100.

The information of the objects of the business model in the business layer 104 is not generally available in underlying data sources 100. Usually available information in metadata sources 101 is associated with the data access layer 102, rather than the business layer 104. One thing that may be available in external metadata repositories 101 is the business names for objects in the metadata model 15. However, again these business names tend to be provided for the physical tables and columns. If they can be mapped to the appropriate business entity or attribute, they may be used.

The business rules are used to develop business intelligence applications. Calculations use a combination of attributes and expression components, and make them available to report so that the up-to-date and consistent definitions are used to execute reports.

Filters and prompts are used to restrict queries. Applying a filter to an entity or attribute limits the scope of data retrieval for all users who work with this entity or attribute. Applying a filter to an entity or attribute in conjunction with a user class limits the scope of data retrieval for the user class. Elements and styles are used to associate presentation information with an attribute.

The package layer 106 contains a part of the model objects that describe subsets of the business layer 104. These model objects may be called package model objects. These are used to provide an organized view of the information in the business layer 104. The information is organized in terms of business subject areas or by way in which it is used.

The package model objects in the package layer 106 include presentation folders and/or subjects. Each subject in the package layer 106 contains references to a subset of the business model objects that are interested in a particular group or class of users. The subset of the business model objects are reorganized so that they can be presented to the group of users in a way suitable to the group of users. Also, a user can combine references to the business model objects available from the business layer 104 into combinations that are frequently used in the user's business. User defined folders that contain these combinations of references are called user folders or presentation folders.

Presentation folders and subjects contain references to objects in the business layer 104, including entities, attributes, filters and prompts. Presentation folders create packages of information for the end user. Each package is defined for a specific purpose, e.g., one or more business intelligence applications. Designers can combine them, by functions of subjects or by group of users, in order to organize business model objects into collections of most frequently used objects, or in order to support various business intelligent tools or client applications using the reporting system 4 of the present invention as a metadata provider.

The information of the objects in the package layer 106 is not generally available in external data sources 100. The concept of organized business subject areas may exist in external metadata repositories 101. The metadata model 15 may use such a concept in the business layer or data access layer.

For all objects in the data access layer 102 and the business layer 104, business descriptive metadata may also be included. Business descriptive metadata is used to help understand the source and the meaning of the data which is being manipulated. Business descriptive metadata may include lineage, accuracy, description and refresh rules. Lineage is a history of source and processing steps used to produce data set. Refresh is update rules for refreshing aggregated or submitted data for reporting. Business descriptive metadata is used by an end user and an application designer to understand the source of the information. Business descriptive metadata includes such things as descriptions and stewards. A steward is a person or group that manages the development, approval, creation, and use of data within a specified functional area. Business descriptive metadata may also include information that can be used to relate the objects to information in external repositories 101.

Business descriptive metadata may exist in many forms in external repositories 101. General purpose repositories and business information directories collect this information as that is their raison d'etre. Warehouse Extract-Transform-Load (ETL) tools collect this information as a result of collecting the ETL specifications. The information may be duplicated or collected from a variety of sources in the metadata model 15 so that it is available directly to the user as metadata. The metadata model 15 may also include context information which can be used to retrieve information from external repositories 101.

Most objects in the metadata model 15 may be organized in a tree. Some objects model relationships between other objects. As described above, each business model object in the business layer 104 has a partner in the data access layer 102. This relationship provides the context for processing all the related information of the tables in the data access layer 102. For example, if a particular column has not been processed, transformations 20 process the column in the context of a parent relationship, i.e., build an attribute and put under the entity.

The metadata model 15 may be built using CML files. CML files are compiled into C++ code which is then compiled in the reporting system 4 to build the metadata model 15.

Transformations 20

The transformations 20 are performed to automatically construct portions of the common metadata model 15 based on the objects contained in another portion of the metadata model 15.

The transformations 20 contain a plurality of different transformations, as described below. Early in the lifecycle of a metadata model 15, the model designer will likely choose to use all or most of the transformations 20 to develop a standard model 15. As the model 15 progresses through the lifecycle, however, the number of transformations used by the designer is likely to decrease as the model 15 is customized to suit the particular needs of the application of the users.

The model designer may also determine that a transformation is not applicable to a particular metadata model. Applying this knowledge to selecting a subset of transformations 20 to execute can considerably reduce the amount of processing.

Figure 5:
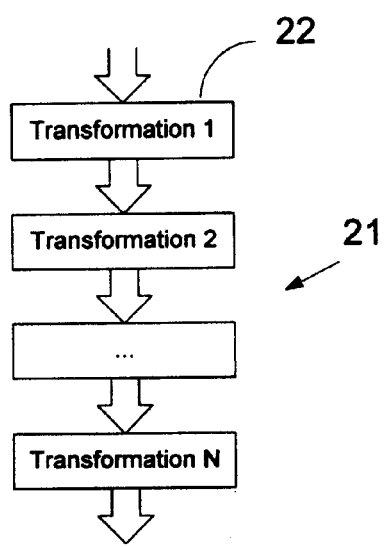
FIG. 5 is a diagram showing concept of the transformations.

In order to facilitate these demands, it is desirable that each transformation 20 is coded as independently as possible. In the simplest of scenarios, as shown in FIG. 5, the architecture of the transformations 20 could be thought of as a pipeline 21 with a number of pumping stations en route. Instead of transporting oil or natural gas, the metadata model flows through the pipeline 21. A pumping station represents a transformation step 22. Each transformation step 22 is constructed to suit the requirements of the scenario. As new transformations are constructed, they can be added to the pipeline 21 as required. Obsolete transformation steps may be removed from the pipeline 21.

Figure 6:
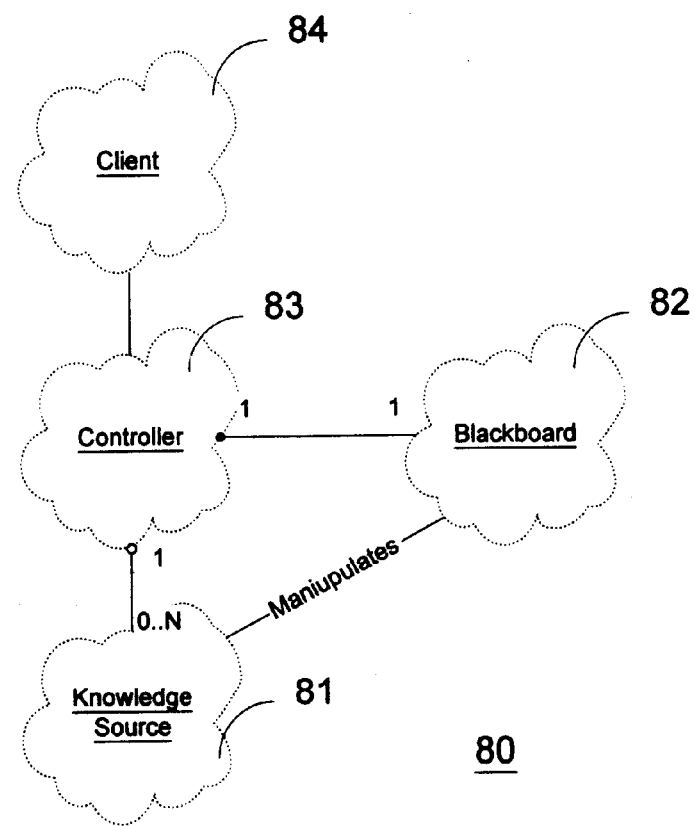
FIG. 6 is a diagram showing an implementation structure.

However, as development of the transformations 20 has progressed, a number of relationships have been developed between the transformations 20. Data about the model 15 that is constructed during the processing of some transformations 20 sometimes can be used by later transformations 20. The "Blackboard" pattern 80 shown in FIG. 6 ("Pattern-Oriented Software Architecture A System of Patters" by Buschmann, et. al., published by John Wiley & Sons 1996, pages 71–95) matches the requirements. The pattern 80 uses the term "Knowledge Source" 81 as the actor that manipulates the objects on a blackboard 82. The knowledge source 81 and the blackboard 82 are controlled by a controller 83 which presents results to a client 84. Each transformation 20 would be a Knowledge Source 81. The use of the pattern 80 preserves the independence of the transformations 20 as much as possible, yet recognizes that the transformations 20 are linked together by the data stored on the blackboard 82. The controller 83 is responsible for scheduling the execution of the knowledge sources 81, i.e., transformations 20.

Figure 4:
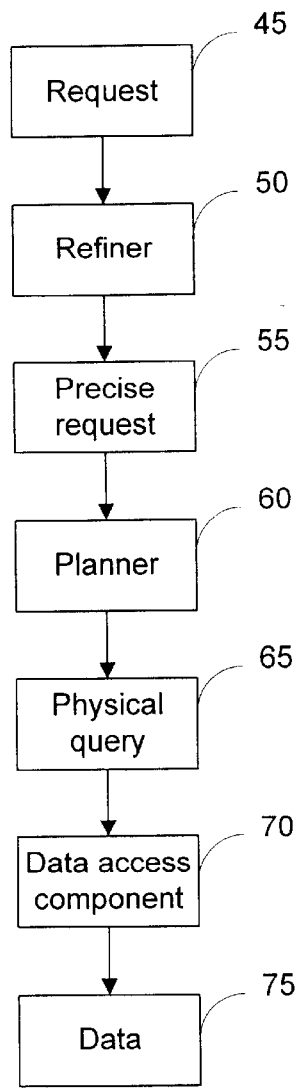
FIG. 4 is a diagram showing an example of functions of the query engine.
Figure 4A:
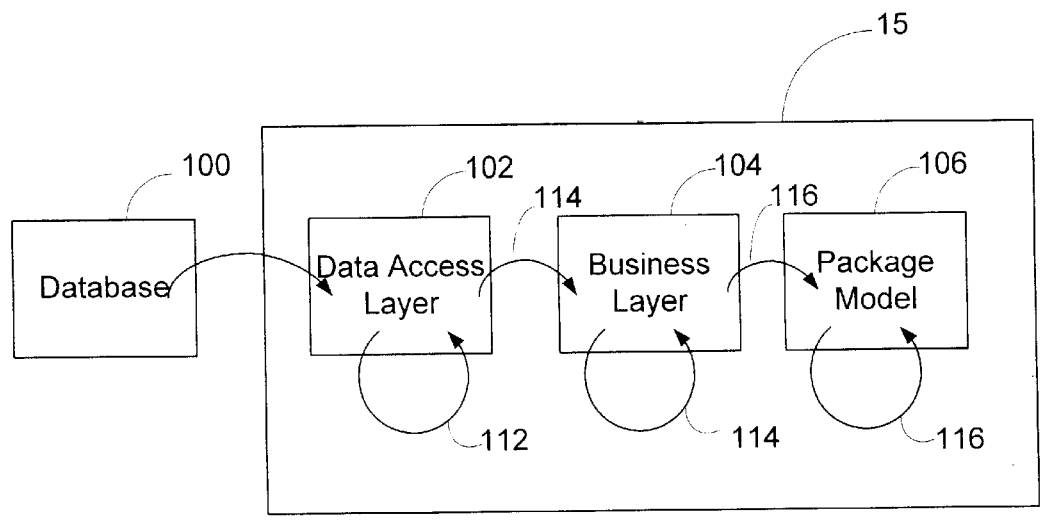
FIG. 4A is a diagram showing an example of functions of the transformations shown in FIG. 2.

Referring to FIG. 4A, the basic functions of the transformations 20 are described.

The metadata model 15 has the three layers: data access layer 102, business layer 104 and package layer 106, as described above. The transformations 20 also has three kinds: data access (physical) model transformations 112, business model transformations 114, package (presentation) model transformations 116. The transformations 20 transform metadata from the lower abstraction level 102 to the higher abstraction level 106.

A data source 100 is a source of physical definitions of physical data, i.e., a source of metadata. A data source 100 may be one or more database or other data sources. When the data source 100 is introduced into the reporting system 4, the physical definitions of the data source 100 are extracted from the data source 100 into the data access layer 102 in the metadata model 15 by the metadata exchange 10, as described above referring to FIG. 2A. The reporting system 4 may also import metadata from other metadata sources using the metadata exchange 10. Thus, data access layer objects are built in the data access layer 102 in the metadata model 15. These data access layer objects represent a solid picture of what exists in the data source 100.

However, these imported data access layer objects are inadequate to provide reports to users, i.e., the metadata model 15 is incomplete with only those imported data access layer objects and cannot be used to build reports. That is, the imported data access layer objects may not be enough to form a complete business layer 104. In order to improve the data access layer 102, the data access model transformations 112 take the data access layer objects that exist in the data access layer 102, and make changes to them and/or add new objects to complete the data access layer 102.

Then, the business model transformations 114 take the data access layer objects from the data access layer 102 and build their corresponding business layer objects in the business layer 104. However, these business layer objects that are transformed from the data access layer 102 are often inadequate to provide reports to users. In order to improve the business layer 104, the business model transformations 114 take the business layer objects that exist in the business layer 104, and make changes to apply some business intelligence to them.

The package model transformations 116 take the business layer objects from the business layer 104 and build their corresponding package layer objects in the package layer 106. Then, the package model transformations 116 prepare the package layer objects suitable for corresponding client applications. The package model transformations 116 take the package layer objects that exist in the package layer 106, and make changes to them to complete the package layer 106. The package layer objects in the package layer 106 may then be used to build reports to users by the client applications.

Thus, by the transformations 20, a physical database design is converted into a logical database design, i.e., the transformations 20 deduce what the logical intent of the model was.

The transformations 20 may also include multidimensional model transformations and general transformations as described below.

Transformation Data Recorded in the Model

Each transformation 20 records in the model 15 information about changes made during execution of the transformation 20 to avoid repeating the same activity in subsequent executions. Every object class that can be modified by the transformations 20 preferably supports an additional interface to store the transformation information.

When one object leads to the creation of another, a new relationship is created between the two objects. Transformations use the source and target object identifiers to identify the original set of objects and the resulting set of objects. Each transformation also uses two status flags. These flags are used to determine the processing flow for each object and to control the execution of a transformation over the relationship.

The first flag is a prohibit flag. If the prohibit flag is set, the transform will not modify the object during the execution of the transformation. The second flag is a processed flag. This flag records whether the transform has ever processed the object.

Data Access (Physical) Model Transformations 112

Referring to FIG. 4B, the data access model transformations 112 include a data access (physical) join constructing transformation 112a, a data access (physical) key constructing transformation 112b, a table extract constructing transformation 112c and a data access (physical) cube constructing transformation 112d.

Data Access (Physical) Join Constructing Transformation 112a

Referring to FIG. 4B, when the data source 100 contains physical tables having indexes, the metadata exchange 10 imports the physical definitions of the physical tables into the data access layer 102 of the metadata model 15. An index is a database structure used to optimize query performance by organizing the contents of specified columns into structures that facilitate quick searching.

Thus, the data access layer 102 contains the definitions of the physical tables, i.e., data access layer table objects 122 in the data access layer 102. The table objects 122 in the data access layer 102 may be called "data access layer tables". The data access layer tables 122 have indexes imported with the definitions of the physical tables from the data source 100.

The data access join constructing transformation 112a constructs join relationships 123 between the data access layer tables 122 based on the contents of their indexes. That is, the data access join constructing transformation 112a first finds columns used in the indexes in each data access layer table 122, and then for each pair of the data access layer tables 122, searches a best match of columns used in the indexes. The best match is defined primarily as the match with the largest number of matching columns. In case of ties, the match that uses the largest index wins. Columns match if their names are identical. The names are usually compared as being case insensitive. In all cases, one set of columns is a subset of the other column set as defined by the indexes of the tables. That is, one set of column names is wholly contained within the other set.

If a match is found between columns, the data access join transformation 112a joins the tables by constructing a new data access layer join relationship. The join's expression requires that the values of like named columns from the aforementioned column sets are equal.

The following shows an example of the operation of the data access join constructing transformation 112a. Herein, a unique index is an index that contains unique values.

I. For each non-prohibited data access layer table:
  A. Construct TableInfo:
    1. Get list of columns in table and sort by name.
    2. For each index:
      a) Construct IndexInfo
        (1) Record columns used in index, whether index is unique.
        (2) Sort column list based on name.
    3. Sort IndexInfo objects based on uniqueness of index, number of columns.
    4. For each index:
      a) If the columns of the index are not all contained within an IndexInfo object representing a unique index already associated with the TableInfo object:
        (1) Add the IndexInfo object to the TableInfo object
        (2) Remove columns used in index from TableInfo column list.

II. For each non-prohibited views and files:
  A. Construct TableInfo:
    1. For each non-prohibited view, file and stored procedure;
      a) Get list of columns in table and sort by name.

III. For each TableInfo pair {T1, T2}:
  A. If either T1 or T2 has not been processed by this transformation:
    1. Compare unique indexes {I1 from T1, I2 from T2} to determine best match.
    2. If a match is found:
      a) Build a join using the matching columns.
    3. Else
      a) Compare unique indexes from one table with non-unique indexes from the other table {I1 from T1, I2 from T2} to determine the best match.
      b) If a match is found:
        (1) Build a join using the matching columns.
      c) Else
        (1) Compare unique indexes from one table with column list from the other table {I1 from T1, C from T2} to determine the best match.
        (2) If a match is found:
          (a) Build a join using the matching columns.

IV. Mark each table as transformed.

The following table shows the status flag usage.

| Object Class | Prohibit | Processed |
| --- | --- | --- |
| Table | Do not process the instance. | When performing pair-wise comparisons, avoid pairs with both objects marked as processed. |
| View | | |
| Binary File | | |
| Ranged Binary File | | |
| Delimited Text File | | |
| Fixed Text File | | |

Data Access (Physical) Key Constructing Transformation 112b

The data access key constructing transformation 112b uses unique indexes in the data access layer tables 122. It constructs data access keys for the data access layer tables 122 based on the unique indexes.

The data access key constructing transformation 112b, for each data access layer table 122, builds a data access key for each unique index, and adds a relationship between the index and the data access key. The data access key constructing transformation 112b adds each column in the index to the data access key if the column does not exist in the data access key. It removes each column from the data access key if the column does not exist in the index. Thus, for each data access layer table 122, a data access key having columns common in all indexes of the data access layer table 122 is constructed for each unique index.

The following shows an example of the operation of the data access key constructing transformation 112b:

I. For each non-prohibited table:
  A. For each unique index:
  B. If index has already been transformed:
    1. Attempt to locate target key.
  C. Else
    1. Build key
    2. Mark index as transformed
    3. Add relationship between index and key.
  D. If key built or found:
    1. For each column in-index:
      a) If column does not exist in key:
        (1) Add column to key.
    2. For each column in key:
      a) If column does not exist in index
        (1) Remove column from key.

The following table shows the status flag usage.

| Object Class | Prohibit | Processed |
| --- | --- | --- |
| Table | Do not process this instance. | |
| Index | Do not process this instance. | Update this instance. |

Table Extract Constructing Transformation 112c

For the purposes of this transformation, a table, view and file are all considered equivalent. For example, an aggregate table described below may contain data derived from a query executed against a view.

As described above, the data access layer 102 contains a set of data access layer tables 122 that describe the physical tables in the data source 100. The physical tables may include aggregate tables. An aggregate table is contains summarized data or a subset of data that is used for faster reporting. When a data access layer table 122 is created based on an aggregate table, the data access layer table 122 is identified as such to avoid creating multiple entities for the same data.

The reporting system has data source specific language statements, such as SQL statements, in the metadata model 15. These statements are statements to populate tables and are supplied externally. A set of data source specific language statements 124 contain a query that populates a subset of the data access layer tables 122 in the data access layer 102. These statements may be available in a number of forms, such as a set of text files.

The table extract constructing transformation 112c uses the set of data source specific statements 124, and constructs metadata required to mark, as extracts, data access layer tables 122 that contain aggregate data. Extracts typically contain pre-computed summary values. The extract tables 122 can be used to return query results in less time than would be required if the query was executed against the physical tables in the data source 100.

Figure 8:
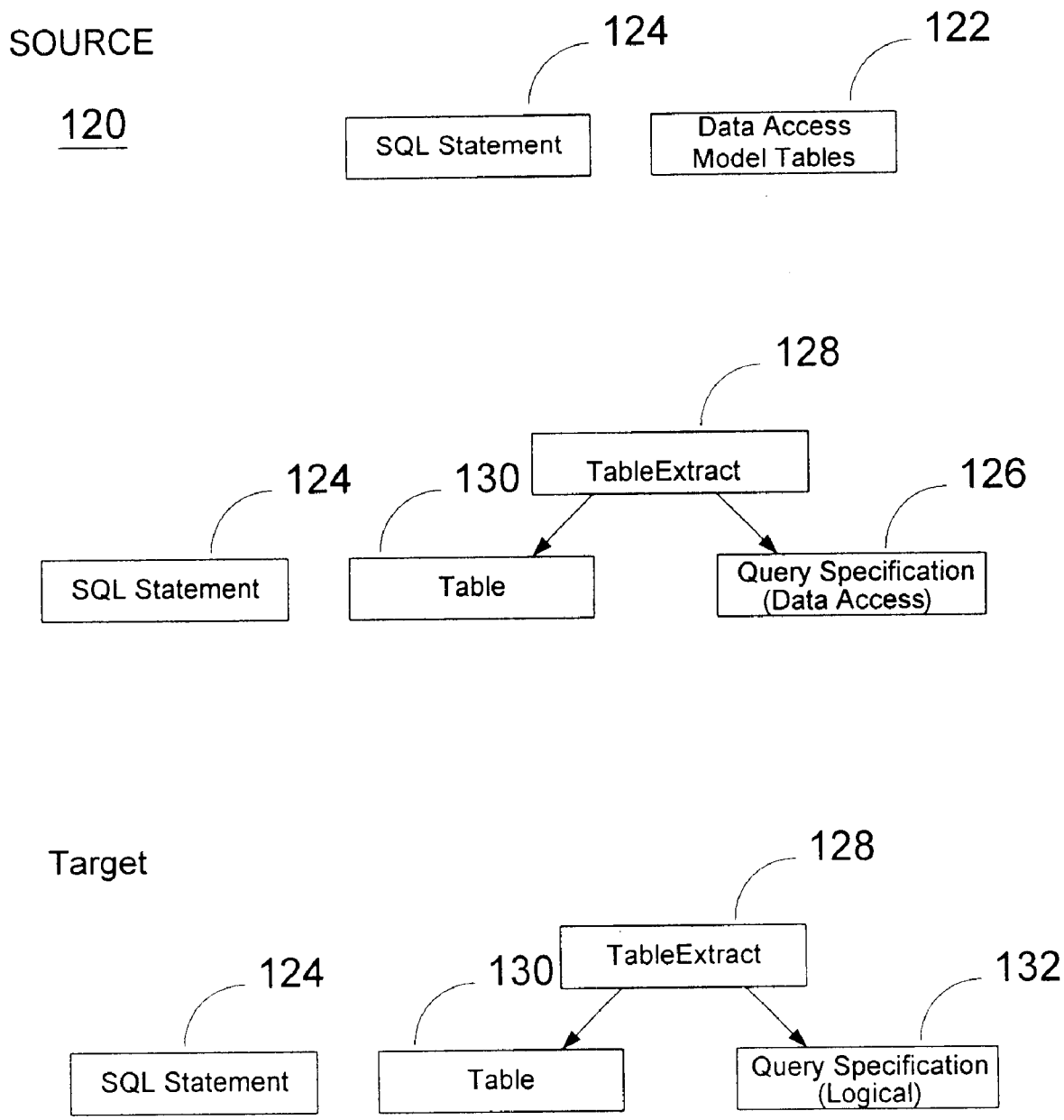
FIG. 8 is a diagram showing examples of source and target of a transformation.

As shown in FIG. 8, the table extract constructing transformation 112c, using the SQL statements 124, constructs query specifications 126 that reference data access layer tables 122 and other data access model objects.

When an SQL statement 124 is expressed as a query specification and references data access layer tables 122 and columns that are known to the data access layer 102, the table extract constructing transformation 112c builds a corresponding query specification query 126 in terms of data access layer tables 122 and columns, and also builds a table extract object 128 that references a destination table 130 and the newly constructed query specification query 126.

Then, the table extract constructing transformation 112c converts the reference to the data access layer tables 122 and other data access model objects in the constructed query specification queries 128 into logical objects 132. For example, a column in the table extract is replaced with a corresponding attribute. Thus, the table extract 128 is completely constructed.

The operation of the table extract constructing transformation 112c is as follows:

I. For each SQL statement:
  A. If a query specification query can be constructed from the SQL statement (i.e. the statement can be expressed as a query specification query and only references tables and columns that are known to the model) and the target tables and columns are known to the model:
    1. Build the corresponding query specification query in terms of physical tables and columns.
    2. Build an I_TableExtract object that references the destination table and the newly constructed query.
II. For each constructed table extract:
  A. Replace each reference to a physical object (column) with its corresponding logical object (attribute).

As clearly seen in the above operation, the implementation of the table extract constructing transformation has two distinct steps. Since there may be other transformations executed against the logical model, such as an E/R model, there would be an additional amount of bookkeeping required to reflect these logical model manipulations in the constructed queries. Implementing the transformation as two distinct steps avoids the bookkeeping.

The first step of the table extract constructing transformation 112c may be implemented in the following alternate way.

The table extract constructing transformation 112c may analyze keys and columns of the physical tables in the data source 100, as well as the relationships that those physical tables with other physical tables, and deter mine which physical tables contain aggregate data.

The analysis of keys and columns of the physical tables is carried out by building a list of extended record identifiers for the physical tables, and then determining a relationship between the extended record identifiers. An extended record identifier contains key segments from higher level keys. If the extended record identifier of physical table A is a subset of the extended record identifier of physical table B, then the table extract constructing transformation 112c determines that the data in the physical table A is an aggregate of data in the physical table B.

This alternate first step of the table extract constructing transformation 112c is described using an example.

Figure 9:
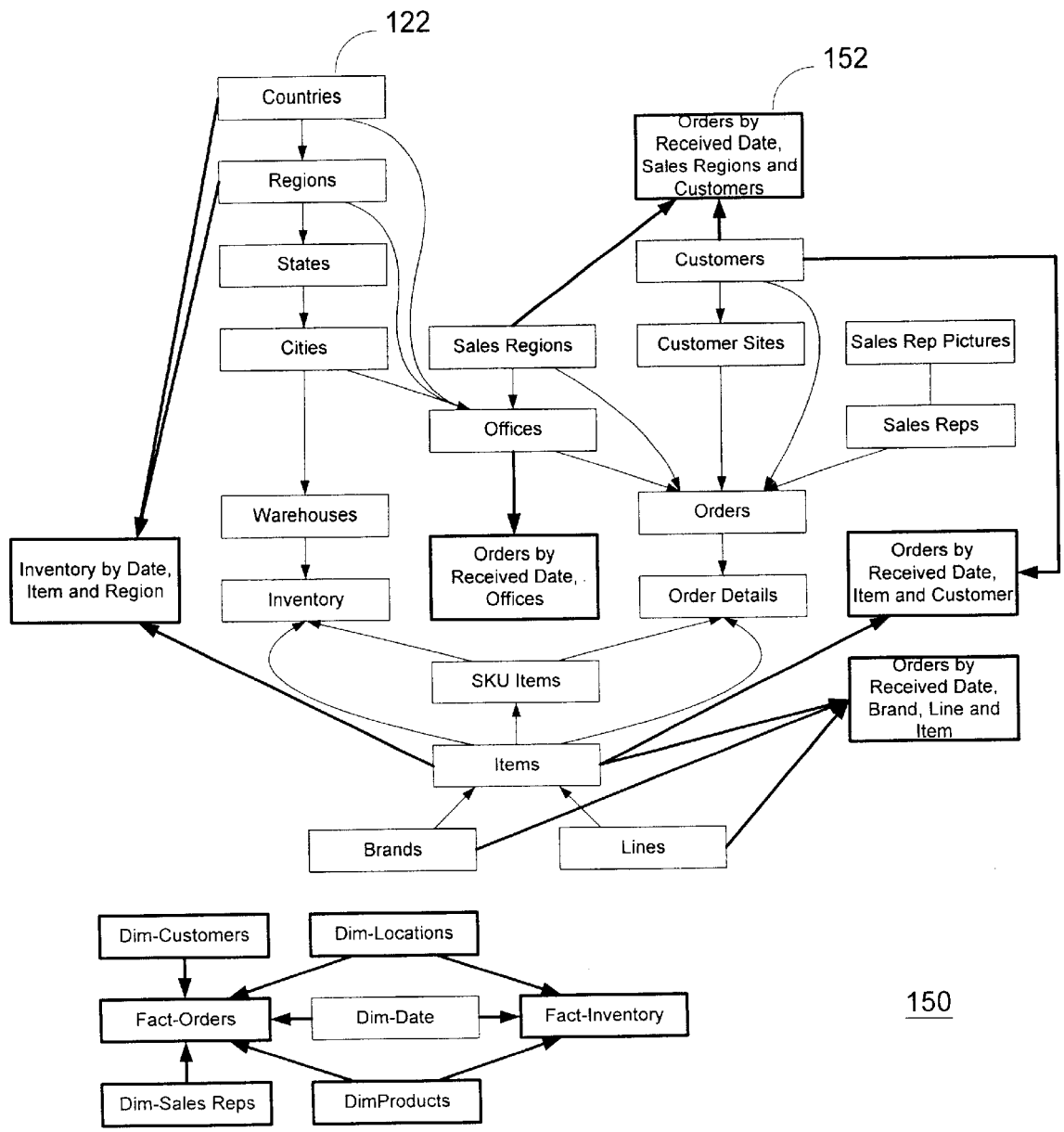
FIG. 9 is a diagram showing an example of a data access layer.

As a source of the table extract constructing transformation 112c, a data access model 150 shown in FIG. 9 will be considered. In FIG. 9, each box represents a data access layer table 122. The bold boxes 152 represent data access layer tables 122 that contain aggregated data. In this example, the data access layer tables 122 contain columns as shown in FIG. 16. In FIG. 16, key columns are shown bolded. A key column is a column that is used by a key. Each data access layer table 122 may have more columns.

The target of the table extract constructing transformation 112c is to recognize the data access model tables represented by the bolded boxes 152 in the source data access model 150 as extract tables.

A query specification for the extract is also constructed by understanding the relationship. The query may be incorrect for the reasons, such that matching of column names may be incorrect; incorrect assumption may be made regarding aggregate expressions, for example, aggregate expression may not be a sum and an aggregation level may not be correct; and missing filter clauses in the query. The extract may be relevant to a subset of the data contained in the base table.

The table extract constructing transformation 112c performs a detailed analysis of the key columns in the physical tables in the data source 100. The table extract constructing transformation 112c first constructs a list of key columns for each physical table in the data source 100. This list may be represented as a grid as shown in FIG. 10. The numbers across the top in FIG. 10 are the number of physical tables using that particular key column. The numbers down the left side of are the number of key columns in that particular physical table.

The table extract constructing transformation 112c then attempts to determine a relationship between data access layer tables 122 based on the extended record identifiers. These relationships are represented in the metadata model 15 as join relationships, which have two cardinality properties. Cardinality is the minimum and maximum number of records in a physical table that a given record can give a physical table on the other side of the relationship. It is shown at the join as {minimum number:maximum number}.

The table extract constructing transformation 112c builds extended record identifier lists for the tables by tracing all {0,1}:1–{0,1}:N join relationships, and all {0,1}:1–{0,1}:1 join relationships. Join relationships of cardinality {0,1}:1–{0,1}:N are traced from the N side to the 1 side. As new physical tables are encountered, their key segments are added to the physical table being traced. This may be accomplished by using a recursive algorithm. FIG. 11 shows the results of constructing the extended record identifiers.

The table extract constructing transformation 112c sorts the result table shown in FIG. 11 based on the number of key segments in each physical table. The table extract constructing transformation 112c compares each physical table to determine which table extended record identifier is a subset of the other table extended record identifiers. The table extract constructing transformation 112c only needs to compare those physical tables which are leaf tables. A leaf table is defined such that all of the {0,1}:N cardinalities of all associated joins is associated with the table. FIG. 12 shows the sorted result.

The table extract constructing transformation 112c now turns to the pair-wise comparisons of the leaf tables. The first two physical tables to be compared are Order Details and Fact-Orders, as shown in FIG. 13. The extended record identifiers differ only in the segments Order #, Order Line #, and Received Date. In order to determine the relationship between these two physical tables, the table extract constructing transformation 112c attempts to locate columns that match the unmatched key segments in the physical tables or their parent tables which are the tables at the other end of each 0:1–0:N join.

As shown in FIG. 13, for the first physical table, Order #, the table extract constructing transformation 112c needs to locate a column with the same name in the second physical table, Fact-Orders, or one of its' parent tables. If the table extract constructing transformation 112c can locate one such column, then it can consider the keys matching with respect to this key segment. If not, then the table extract constructing transformation 112c can deduce that the Fact-Orders table is an aggregation of the Order Details table with respect to this key segment. Turning to the sample database, Order # is seen not a column of the Fact-Orders table or any of its parent tables. The same search for Order Line # will also fail. The table extract constructing transformation 112c now locate the Received Date column in Order Details, or one of its parent tables. The table extract constructing transformation 112c finds such a column in the Orders table. It therefore declares that Order Details and Fact-Orders match with respect to this key. In summary, the pair of the tables has a number of key segments which allow the table extract constructing transformation 112c to declare that Fact-Orders is an aggregation of Order Details. Since there are no keys that declare that Order Details is an aggregation of Fact-Orders, the table extract constructing transformation 112c declares that Fact-Orders is an aggregation of Order Details.

The next two physical tables to be compared are Order Details and Inventory as shown in FIG. 14. The table extract constructing transformation 112c begins by attempting to find a column named Customer # in Inventory, or one of its' parents. This search fails, so the table extract constructing transformation 112c deduces that Inventory is a subset of Order Details with respect to this key segment. The next search attempts to locate a column named Date in Order Details. This search fails, so the table extract constructing transformation 112c deduces that Order Details is a subset of Inventory with respect to this key segment. The table extract constructing transformation 112c is now faced with contradictory information, and can therefore deduce that neither table is an aggregate of the other.

The table extract constructing transformation 112c continues the comparisons. At the end of the first pass of the comparisons, the table extract constructing transformation 112c determines the following relationships:

| Table | Relationship |
| --- | --- |
| Order Details | Base Table |
| Fact-Orders | Aggregate of Order Details |
| Inventory | |
| Fact-Inventory | |
| Orders by Received Date, Office Inventory by Date, Item, Region | Aggregate of Order Details |
| Orders by Received Date, Item, Customer | Aggregate of Order Details |
| Orders by Received Date, Brand, Line and Item | Aggregate of Order Details |
| Orders by Received Date, Sales Region, Customer | Aggregate of Order Details |

The table extract constructing transformation 112c can deduce that Inventory is a base table since it is not an aggregate of any other table. For the second pass, the table extract constructing transformation 112c only needs to examine those tables that have not been identified as either base tables or aggregates. The second pass completes the tables as follows:

| Table | Relationship |
| --- | --- |
| Order Details | Base Table |
| Fact-Orders | Aggregate of Order Details |
| Inventory | Base Table |
| Fact-Inventory | Aggregate of Inventory |
| Orders by Received Date, Office Inventory by Date, Item, Region | Aggregate of Order Details Aggregate of Inventory |
| Orders by Received Date, Item, Customer | Aggregate of Order Details |
| Orders by Received Date, Brand, Line and Item | Aggregate of Order Details |
| Orders by Received Date, Sales Region, Customer | Aggregate of Order Details |

The table extract constructing transformation 112c can deduce that Order Details is a base table since it is not an aggregate of any other table.

As the table extract constructing transformation 112c performs each pass, it remembers two pieces of information: (a) the table that is the current base table candidate; and (b) the list of tables that are aggregates of the current bas e table candidate.

Each time an aggregate relationship is determined between two tables, the current base table is adjusted appropriately. The table extract constructing transformation 112c can use the transitivity of the aggregation relationship to imply that if table A is an aggregate of table B and table B is an aggregate of table C, then table A is an aggregate of table C.

The table extract constructing transformation 112c will be completed as follows. Now that the table extract constructing transformation 112c has determined which leaf tables are base tables, it can now turn its attention to the remaining tables in the data source 100. The next phase of the table extract constructing transformation 112c begins by marking each table that is reachable from a base table via a {0,1}:1–{0,1}:N join relationship, traced from the N side to the 1 side, or a {0,1}:1–{0,1}:1 join relationship. This phase results in the following additional relationships:

| Table | Relationship |
| --- | --- |
| Order Details | Base Table |
| Fact-Orders | Aggregate of Order Details |
| Inventory | Base Table |
| Fact-Inventory | Aggregate of Inventory |
| Orders by Received Date, Office Inventory by Date, Item, Region | Aggregate of Order Details Aggregate of Inventory |
| Orders by Received Date, Item, Customer | Aggregate of Order Details |
| Orders by Received Date, Brand, Line and Item | Aggregate of Order Details |
| Orders by Received Date, Sales Region, Customer | Aggregate of Order Details |
| Orders | Base |
| Dim-Locations | |
| Offices | Base |
| Warehouses | Base |
| Cities | Base |
| SKU Items | Base |
| Dim-Products | |
| Items | Base |
| States | Base |
| Customer Sites | Base |
| Regions | Base |
| Dim-Customers | |
| Brands | Base |
| Countries | Base |
| Customers | Base |
| Lines | Base |
| Sales Regions | Base |
| Sales Rep Pictures | Base |
| Sales Reps | Base |
| Dim-Sales Reps | |
| Dim-Date | |

The table extract constructing transformation 112c still has not determined the status for the some tables, e.g., Dim-Locations. In this case, those tables are all dimension tables. A dimension table is one of a set of companion tables to a fact table. A fact table is the primary table in a dimensional model that is meant to contain measurements of the business.

The next step in the table extract constructing transformation 112c is the construction of the extract objects for those tables that are identified as aggregates. In order to perform this activity, the table extract constructing transformation 112c determines the smallest set of base tables that can provide the required key segments and columns. To do this, the table extract constructing transformation 112c uses the extended record identifier segment grid that was constructed in the first phase of the table extract constructing transformation 112c.

As an example, the aggregate table Inventory by Date, Item and Region are used. FIG. 15 shows the grid with the cells of interest highlighted. The only tables of interest in this phase are base tables; therefore, some tables that have matching key segments are not of interest.

Once all of the tables are marked, the table extract constructing transformation 112c can proceed with matching non-key columns of the aggregate table to non-key aggregates in the highlighted base tables. If a matching column is found, then the table is declared to be required. In this case, the only columns are from the Inventory table.

Once all of the columns have been matched, the table extract constructing transformation 112c can turn its attention to the key segments. The first step is to determine which key segments are not provided by the required tables identified above. The remaining highlighted tables can be sorted based on the number of unmatched key columns that the table could provide if added to the query. The unmatched keys in this example are Country #, Region #, and Item #. The tables Cities and Regions each provide two key segments; Countries, Inventory and Items provide one key segment each.

Processing begins with the tables that have the highest number of matches, in this case, Cities and Regions. Since the key segments provided by these tables overlap, some additional analysis be performed with these two tables. The table extract constructing transformation 112c picks the table that is the closest to the base table (Inventory). In this case, that table is Cities. Once Cities has been added to the query, the only key segment that is unmatched is Item #, which is only provided by Items.

Once the queries for all aggregate tables have been determined, the table extract constructing transformation 112c can turn to the tables that have not yet been assigned a status (in this example, the dimension tables). The same table extract constructing transformation 112c can be used for each of these tables. If the table extract constructing transformation 112c fails to determine a query for the table, the table is deemed to be a base table. In this example, the dimension table Dim-Date is declared to be a base table since a query which provides all of the required columns cannot be constructed from the set of base tables.

Thus, the alternate first step of the table extract constructing transformation 112c is completed.

Data Access Cube Constructing Transformation 112d

The data access layer 102 may contain one or more logical cube. A logical cube is a logical definition of a multidimensional space that may be represented in any number of physical storage formats, including multiple databases The data access cube constructing transformation 112d constructs a set of data access cubes based on the logical cubes in the data access layer 102. The data access cube constructing transformation 112d constructs data access cubes to instantiate the multidimensional space defined by the logical cubes.

The following shows an example of the operation of the data access cube constructing transformation 112d:

1. For each logical cube:
   a) Construct physical cube.
   b) For each dimension in the cube:
   i) Add the "All" view of the dimension to the physical cube.

Business Model Transformations 114

As described above, the business model transformations 114 extract the data access layer objects from the data access layer 102 and transform them to construct the business layer 104, as shown in FIG. 4A.

As shown in FIG. 4B, the business model transformations 114 include a basic business model constructing transformation 114a, many to many join relationship fixing transformation 114b, entity coalescing transformation 114c, redundant join relationship eliminating transformation 114d, subclass relationship introducing transformation 114e, entity referencing transformation 114f, attribute usage determining transformation 114g; and date usage identifying transformation 114h.

In a simple case, there is a 1:1 mapping between the data access layer 102 and the business layer 104, e.g., for every data access model table in the data access layer 102, there is an entity in the business layer 104; and for every column in the data access layer 102, there is an attribute in the business layer 104. More complicated business model transformations 114 will manipulate the business layer 104 and make it simpler and/or better.

Basic Business Model Constructing Transformation 114a

The basic business model constructing transformation 114a constructs a business model that is similar to the existing data access layer 102.

The basic business model constructing transformation 114a uses eligible or acceptable objects in the data access layer 102. A table or view is eligible if it is not associated with a table extract and has not been transformed. A stored procedure result set call signature is eligible if it has not been transformed. A join is eligible if it has not been transformed, is not associated with a table associated with a table extract, and both tables have been transformed. A synonym is eligible if the referenced object has been processed by this transformation and the synonym has not been processed. A synonym for a stored procedure is eligible only if the stored procedure has a single result set call signature.

Figure 17:
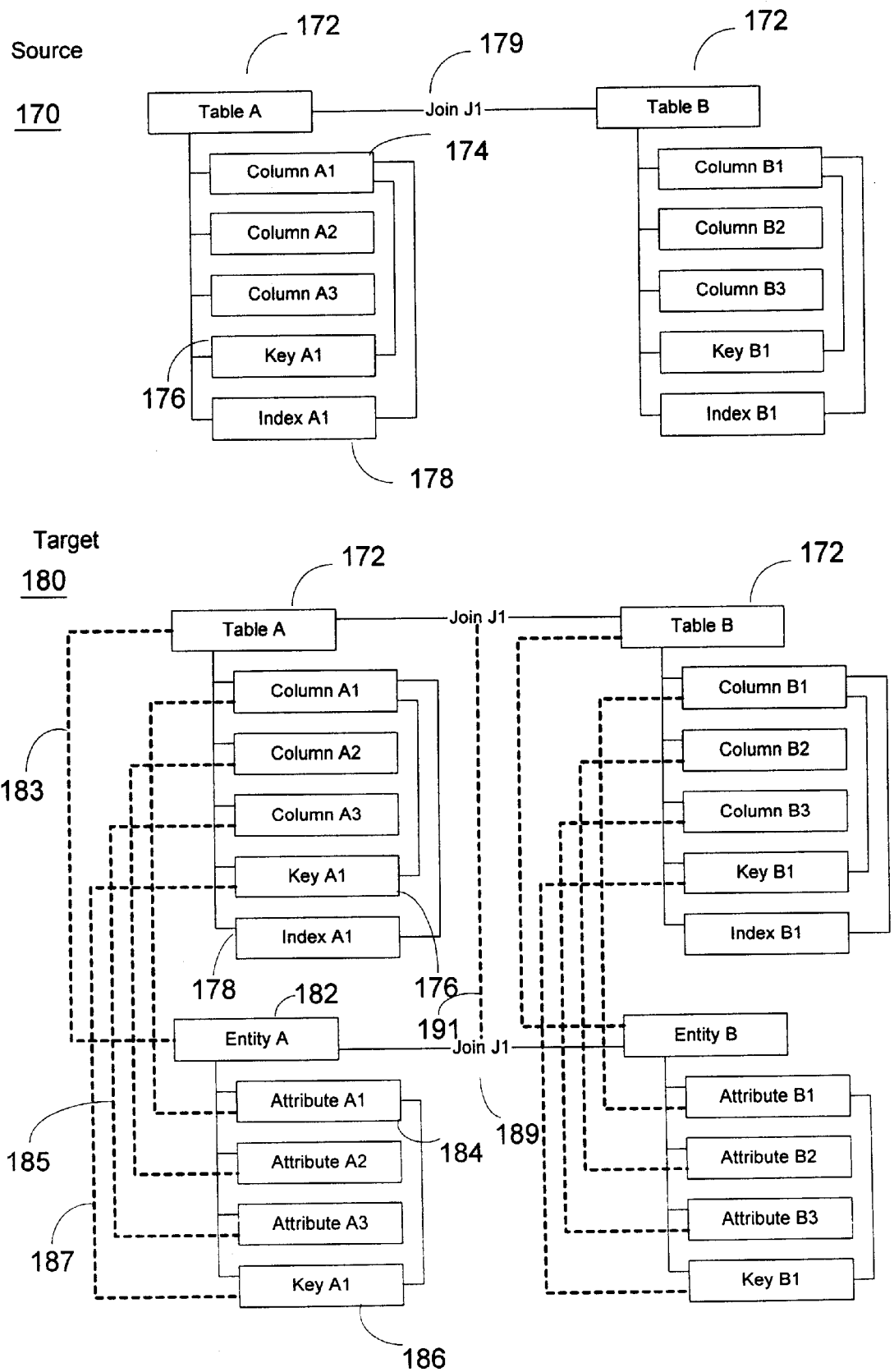
FIG. 17 is a diagram showing examples of source and target of a transformation.

FIG. 17 shows an example of a source data access model 170. The basic business model constructing transformation 114a constructs a target business model 180 from the source data access model 170. The source data access model 170 has two data access model tables 172. The data access model tables 172 have columns 174, keys 176 and indexes 178. The tables 172 have a data access join 179.

The basic business model constructing transformation 114a builds an entity 182 in the business model 180 for each acceptable data access model table 172 in the data access model 170, and adds the relationship 183 between the table 172 and the entity 183 to the business model 180. For each entity 182 built, the basic business model constructing transformation 114a builds an attribute 184 in the entity 182 for each column 174 of the data access model table 172, and adds the relationship 185 between the column 174 and the attribute 184 to the entity 182. The basic business model constructing transformation 114a also builds a key 186 in the entity 182 for each data access key 176 in the data access model table 172, and adds the relationship 187 between the key 186 in the business layer 104 and the data access key 176 to the entity 182. When the key 186 is built in the business layer 104, the basic business model constructing transformation 114a adds attribute to the key 186 for each column in the data access key 176 if the column has been transformed and the attribute is found but not in the key 176.

Similarly, the basic business model constructing transformation 114a builds an entity with columns, attributes and relationship for each non-prohibited view, for each non-prohibited file and for each non-prohibited stored procedure result set call signature. For each non-prohibited synonym, the basic business model constructing transformation 114a builds an entity and marks it as a subtype of an entity corresponding to the object referenced by the synonym. It also maps a business join in the business model 180 for each join 179 in the data access model 170 and constructs a new business join 189. The expression is copied from the join 179 in the data access model 170 and is modified to refer to corresponding elements from the business model 180, i.e. an expression referring to a column is replaced with an expression referring to an attribute. The choice of attribute is determined by examining the transformation relationship information stored in the model.

The following shows an example of the operation of the basic business model constructing transformation 114a:

1. For each non-prohibited table:
   a) If table has already been transformed:
   i) Attempt to locate target entity.
   b) Else
   i) Build entity.
   ii) Mark table as transformed.
   iii) Add relationship between table and entity.

c) If entity built, or found:
i) For each column in table:
   a) If column has not been transformed yet:
      (1) Build attribute
      (2) Mark column as transformed
      (3) Add relationship between column and attribute
ii) For each physical key in table:
   a) If physical key has already been transformed:
      (1) Attempt to locate key
   b) Else
      (1) Build key
      (2) Mark physical key as transformed
      (3) Add relationship between physical key and key
   c) If key built or found:
      (1) For each column in physical key:
         (a) If column has been transformed:
            (i) Attempt to locate attribute:
            (ii) If attribute found and attribute not in key:
               (a) Add attribute to key
2. For each non-prohibited view:
   a) If view has already been transformed:
      i) Attempt to locate target entity.
   b) Else
      i) Build entity.
      ii) Mark view as transformed.
      iii) Add relationship between view and entity.
   c) If entity built, or found:
      i) For each column in view:
         a) If column has not been transformed yet:
            (1) Build attribute
            (2) Mark column as transformed
            (3) Add relationship between column and attribute
3. For each non-prohibited file:
   a) If file has already been transformed:
      i) Attempt to locate target entity.
   b) Else
      i) Build entity.
      ii) Mark file as transformed.
      iii) Add relationship between file and entity.
   c) If entity built, or found:
      i) For each column in file:
         a) If column has not been transformed yet:
            (1) Build attribute
            (2) Mark column as transformed
            (3) Add relationship between column and attribute
4. For each non-prohibited stored procedure result set call signature:
   a) If signature has already been transformed:
      i) Attempt to locate target entity.
   b) Else
      i) Build entity.
      ii) Mark signature as transformed.
      iii) Add relationship between signature and entity.
   c) If entity built, or found:
      i) For each column in signature:
         a) If column has not been transformed yet:
            (1) Build attribute
            (2) Mark column as transformed
            (3) Add relationship between column and attribute
5. For each non-prohibited and non-processed synonym:
   a) Build entity.
   b) Mark synonym as transformed.
   c) Add relationship between synonym and entity.
   d) Make entity a subtype of entity corresponding to object referenced by synonym. (If the synonym refers to a stored procedure, use the one and only result set call signature of the stored procedure instead.)
6. For each non-prohibited and non-processed join:
   a) Map join expression.
   b) If either cardinality is 0:1 replace with 1:1.
   c) If either cardinality is 0:N replace with 1:N.
   d) Construct new join.

If a source object has been marked as transformed, an attempt is made to locate the target if the source object could contain other objects. If there are no target objects, then processing of the source object halts, but no error is written. In this case, the basic business model constructing transformation 114a assumes that the lack of a target object indicates the administrator's desire to avoid transforming the object.

Many to Many Join Relationship Fixing Transformation 114b

The many to many join relationship fixing transformation 114b seeks out entities that exist as an implementation artifact of a many to many relationship. The transformation 114b replaces business joins associated with entities of this type with a single business join. It also marks these entities so that they will not be considered when the package layer 106 is constructed.

The many to many join relationship fixing transformation 114b may be used when the following conditions are met:
1. An entity (artificial) participates in exactly two join relationships with one or two other entities.
2. The cardinalities of the join relationships are 1:1 and $\{0,1\}$:N. The N side of each of the join relationships is associated with artificial-entity.
3. Each attribute of artificial-entity participates exactly once in the join conditions of the join relationships.
4. Artificial-entity has a single key that is composed of all attributes of the entity.
5. The artificial entity does not participate in any subtype, containment or reference relationships.

The operation of the many to many join relationship fixing transformation 114b is divided into two sections. The behaviour of the transform 114b varies for those entities that are related to a single business join only.

The first section of the many to many join relationship fixing transformation 114b deletes an entity that is related to two other entities, and creates a new business join between the two other entities.

FIG. 18 shows an example of a source business model 200 in the business layer 104. The source business model 200 has three entities 202 having attributes 204 and keys 206. The three entities 202 are related to each other by business joins 208 and 209. The middle entity C has attributes C.1 and C.2. The attribute C.1 matches attribute A.1 of entity A. The attribute C.2 matches an attribute B.2 of entity B. Accordingly, entity C is an artificial entity related to two other entities A and B. The first section of the many to many join relationship fixing transformation 114b transforms the source business model 200 to a target business model 220 also in the business layer 104.

The first section of the many to many join relationship fixing transformation 114b creates a new business join 222 that represents union of the two existing joins 208 and 209. The transformation 114b then deletes the existing business joins 208 and 209, and deletes the artificial entity C. Thus, the target business model 220 is created. C.1 and C.2 are now column references derived from the deleted attributes C.1 and C.2.

The second section of the many to many join relationship fixing transformation 114b transforms an entity related to one other entity, and creates a new entity that is a subtype of the other entity.

FIG. 19 shows an example of a source business model 240 in the business layer 104. The source business model 240 has two entities 242 having attributes 244 and keys 246. The two entities 242 are related by business joins 248 and 249. Attribute A.1 of entity A matches attribute C.1 of entity C. Attribute C.2 of the entity C matches attribute A.1 of the entity A. Accordingly, entity C is an artificial entity related to one other entity A. The second section of the many to many join relationship fixing transformation 114b transforms the source business model 240 to a target business model 260 also in the business layer 104.

The second section of the many to many join relationship fixing transformation 114b creates a new entity A' 262 that is a subtype of the entity A 242. The transformation 114b also creates a new business join 268 that represents union of the two existing business joins 248 and 249. The new business join 268 associates the entity A 242 and its new subtype entity A' 262. The transformation 114b deletes existing joins 248 and 249, and also deletes the artificial entity C. Thus, the target business model 260 is created. C.1 and C.2 are now column references derived from the deleted attributes C.1 and C.2. The subtype entity A' 262 has attribute proxies 264 and key proxies 266.

The status flag usage is as follows:

| Object Class | Prohibit | Processed |
| --- | --- | --- |
| Entity | Do not process the instance. | NA |
| Business Join | Do not process the instance. | NA |

Entity Coalescing Transformation 114c

The entity coalescing transformation 114c seeks out entities that are related via a 1:1 join relationship, and coalesces these entities into a single entity. The new entity is the union of the entities participating in the join relationship.

The entity coalescing transformation 114c may be used when the following conditions are met:
1. Two entities (e.g., left and right entities) are related by a single join that has cardinalities 1:1 and 1:1. The join condition consists of a number of equality clauses combined using the logical operator AND. No attribute can appear more than once in the join clause. The join is not marked as processed by this transformation.
2. The entities cannot participate in any subtype or containment relationships.
3. Any key contained within the left-entity that references any left-attribute in the join condition references all left-attributes in the join condition.
4. Any key contained within the right-entity that references any right-attribute in the join condition references all right-attributes in the join condition.

Figure 20:
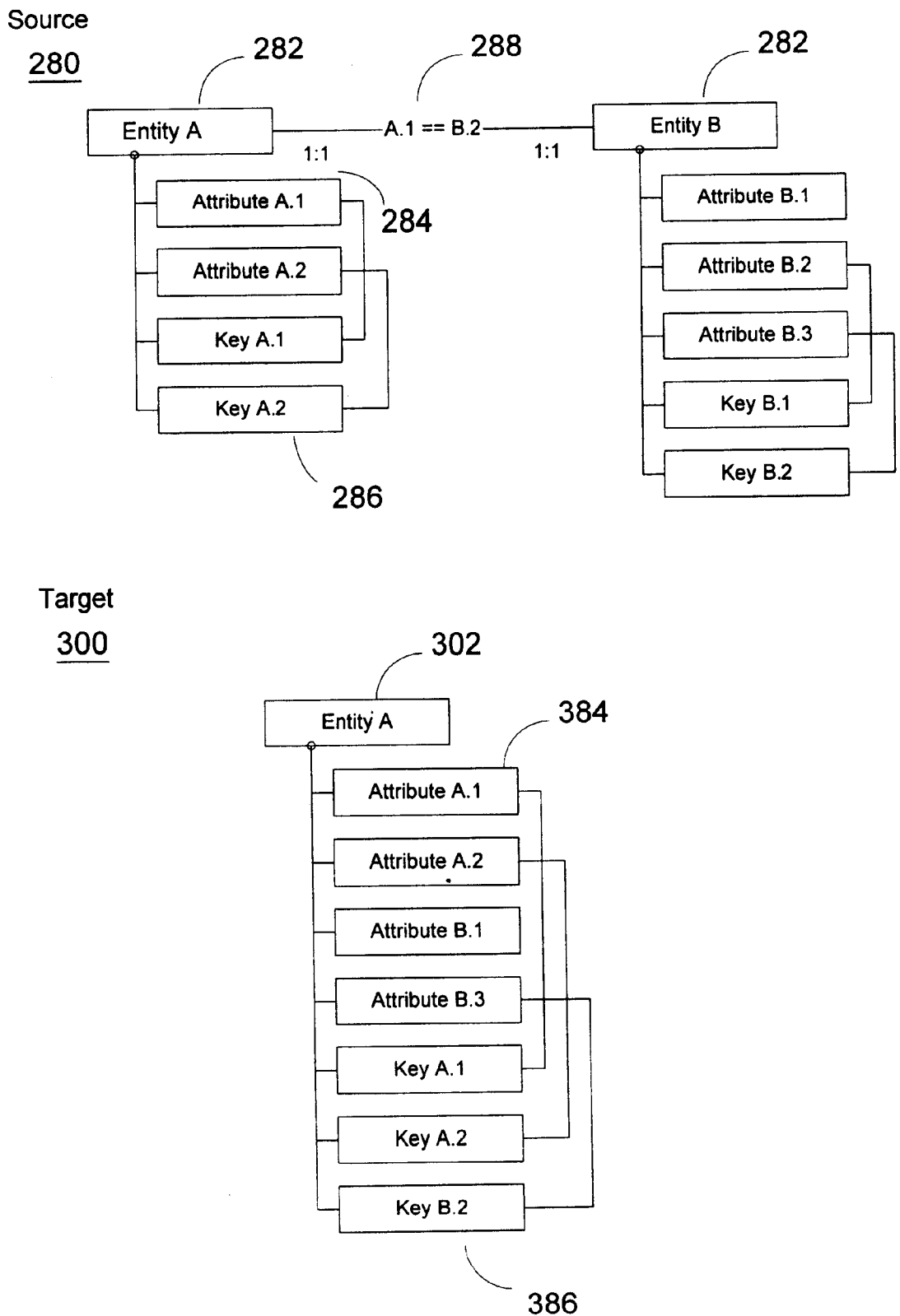
FIG. 20 is a diagram showing examples of source and target of a transformation.

FIG. 20 shows an example of a source business model 280 in the business layer 104. The source business model 280 has two entities 282 having attributes 284 and keys 286. The two entities 282 are related to each other by a business join 288. Attribute A.1 of entity A matches attribute B.2 of entity B. Thus, the entities A and B are related via a 1:1 join relationship 288.

The entity coalescing transformation 114c transforms the source business model 280 to a target business model 300 also in the business layer 104. The entity coalescing transformation 114c coalesces these entities A and B 282 into a single entity 302. The new entity 302 is the union of the entities A and B 282. Key B.1 is removed since its associated attribute B.2 is equivalent to attribute A.1, and is therefore not retained as a key 386 of the new entity 302. Since the attribute B.2 is not retained in the new entity 302, the key B.1 is not retained.

The following shows an example of the operation of the entity coalescing transformation 114c:
1. Scan join clause to construct mapping between left-attributes and right-attributes.
2. Delete right-keys that reference right-attributes in the join clause.
3. Delete right-attributes that occur in the join clause.
4. Move remainder of right-attributes from their presentation folder to left-entity presentation folder.
5. Move remainder of right-attributes and right-keys to left-entity.
6. For each join associated with right-entity (other than join that triggered the transformation):
   a) Build new join between other-entity and left-entity, replacing any right-entity that occurs in attribute map (from step 1) with corresponding left-entity. All other join attributes have the same value.
   b) Delete old join.
7. Delete right-entity.

The processing order is determined by examining all 1:1–1:1 joins and choosing the join that relates the two entities with the fewest number of joins that do not have cardinality 1:1–1:1. The choice of which entity to remove from the model is determined by picking the entity with the fewest number of non 1:1–1:1 joins.

The entity coalescing transformation 114c transforms a set of vertically partitioned tables into a single logical entity.

Redundant Join Relationship Eliminating Transformation 114d

The redundant join relationship eliminating transformation 114d eliminates join relationships that express the transitivity of two or more other join relationships in the business layer 104. That is, when two or more joins have identical start and end points and return the same result set of objects, they are redundant, and the transformation 114d removes the redundancy. Thus, the redundant join relationship eliminating transformation 114d can reduce the number of join strategies that need to be considered during query refinement by the query engine 30.

The redundant join relationship eliminating transformation 114d may be used when the following conditions are met:
1. Two entities (start and end) are related by two join paths that do not share a common join relationship.
2. The first join path consists of a single join relationship.
3. The second join path consists of two or more join relationships.
4. The join relationships all have cardinalities 1:1 and 1:N.
5. The join relationship that forms the first join path has cardinality 1:1 associated with start-entity.
6. The join relationship that forms the second join path has cardinality 1:1 associated with start-entity. The set of join relationships associated with each intermediate-entity in the second join path has a single member with cardinality 1:1 at the intermediate-entity. The other member has cardinality 1:N. (The joins all "point" in the same direction.)
7. Both join paths return the same set of records.
8. All joins are of type association only.

Figure 21:
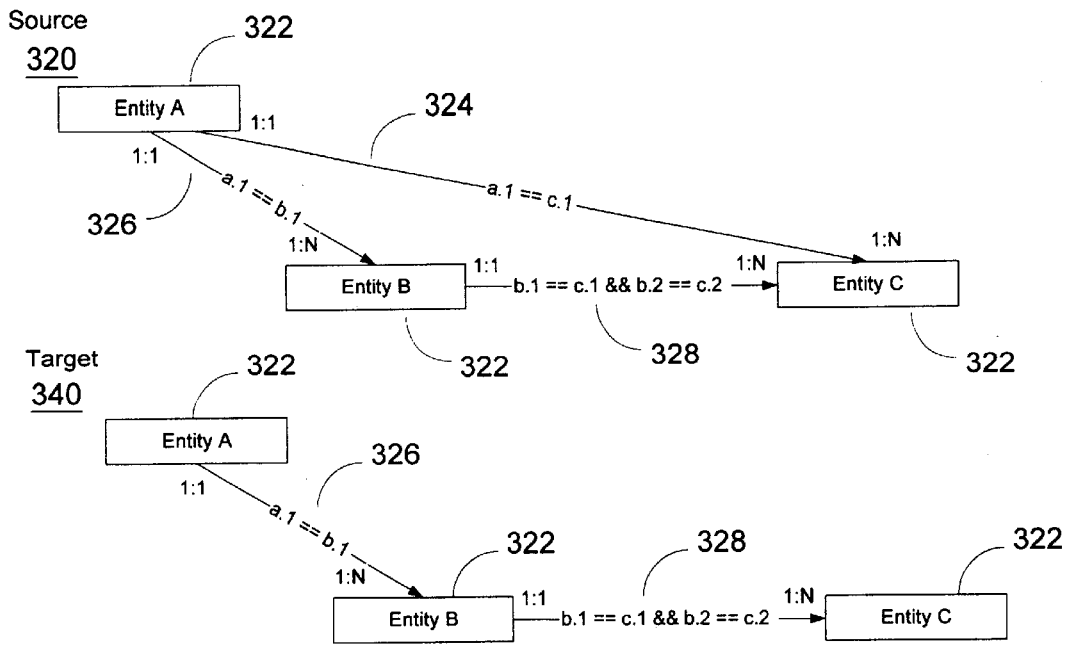
FIG. 21 is a diagram showing examples of source and target of a transformation.

When redundant joins are found, the redundant join relationship eliminating transformation 114d eliminates, a join that passes through the least number of entities. FIG. 21 shows an example of a source 326 of the redundant join relationship eliminating transformation 114d. In the source 320, there are three entities 322, entities A, B and C. Entity A and entity C have redundant join relationships, one through a direct join path 324 and the other through join paths 326 and 328 via entity B. All join relationships 324, 326 and 328 are 1:1–1:N join relationships. The redundant join relationship eliminating transformation 114d deals only 1:1–1:N join relationships.

The redundant join relationship eliminating transformation 114d transforms the source 320 to a target 340. In the target 340, the redundant join path 324 is eliminated, and entity A and entity C have a single join relationship through the join paths 326 and 328 via entity B.

The following shows an example of the operation of the redundant join relationship eliminating transformation 114d:
1. Consider only 1:1–1:N join relationships.
2. Order entities in the business layer 104 using an algorithm to determine strongly connected components. Treat the join relationships as directed edges (from 1:1 end to 1:N end). A directed edge can be traversed in a single direction.
3. Apply a distance to each entity:
    a) For each entity:
        i) distance=distance[entity]+1;
        ii) for each join relationship leaving this entity:
            a) distance[otherEntity]=max(distance[otherEntity], distance)
4. For each entity:
    a) For each join relationship leaving this entity:
        i) If distance[rightEntity]–distance[leftEntity]>1
            a) This join relationship is a candidate for elimination.
            b) Find all alternate join relationship paths from startEntity to endEntity. Note that an alternate path can have no more than distance[rightEntity]–distance[leftEntity] relationships in it.
            c) For all alternate paths:
                (1) If the candidate join relationship is equivalent to the alternate path
                    (a) Remove candidate join relationship from model.
                    (b) Break. Continue processing at Step 4.

The status flag usage is as follows:

| Object Class | Prohibit | Processed |
| --- | --- | --- |
| Business Join | Do not process the instance. | NA |

Figure 22:
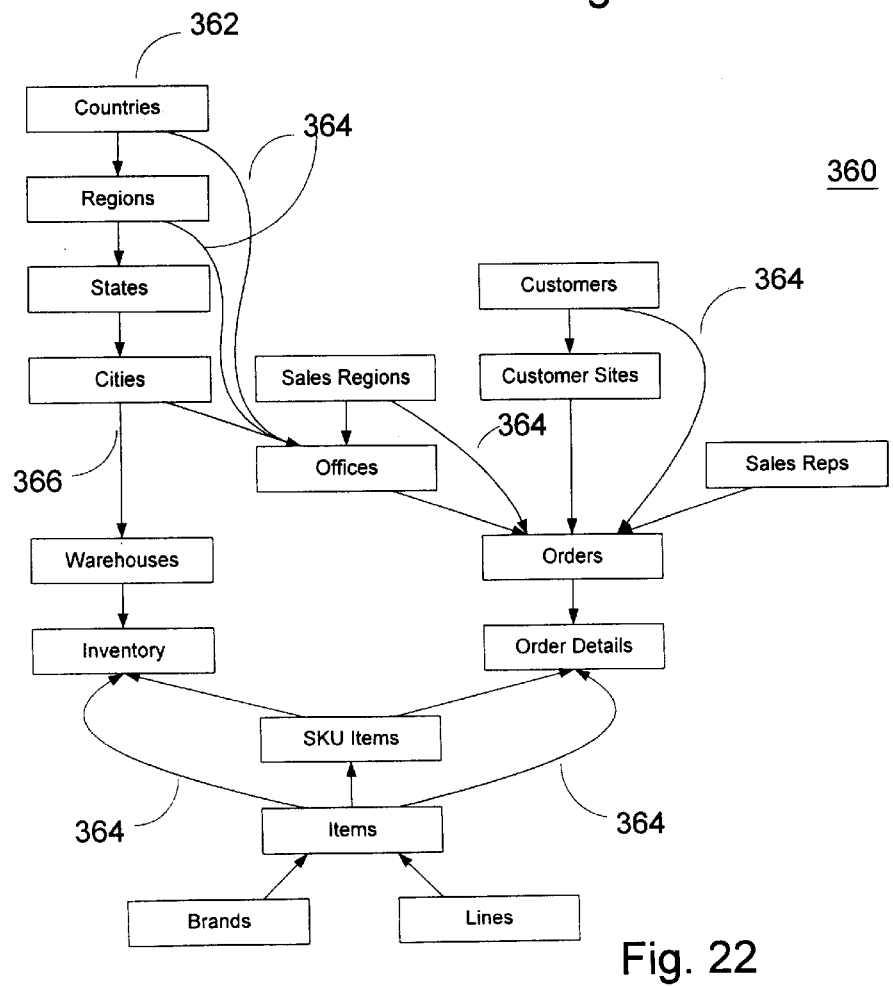
FIG. 22 is a diagram showing an example of a model to which a transformation is applied.

The operation of the redundant join relationship eliminating transformation 114d is further described using an example of a business layer 360 shown in FIG. 22. In FIG. 22, the business layer 360 is illustrated using an entity/relationship diagram or graph. The business layer 360 contains a number of redundant join relationships 364 between some entities 362. These redundant join relationships 364 shown in the curved lines in FIG. 22 are eliminated using the redundant join relationship eliminating transformation 114d.

Figure 23:
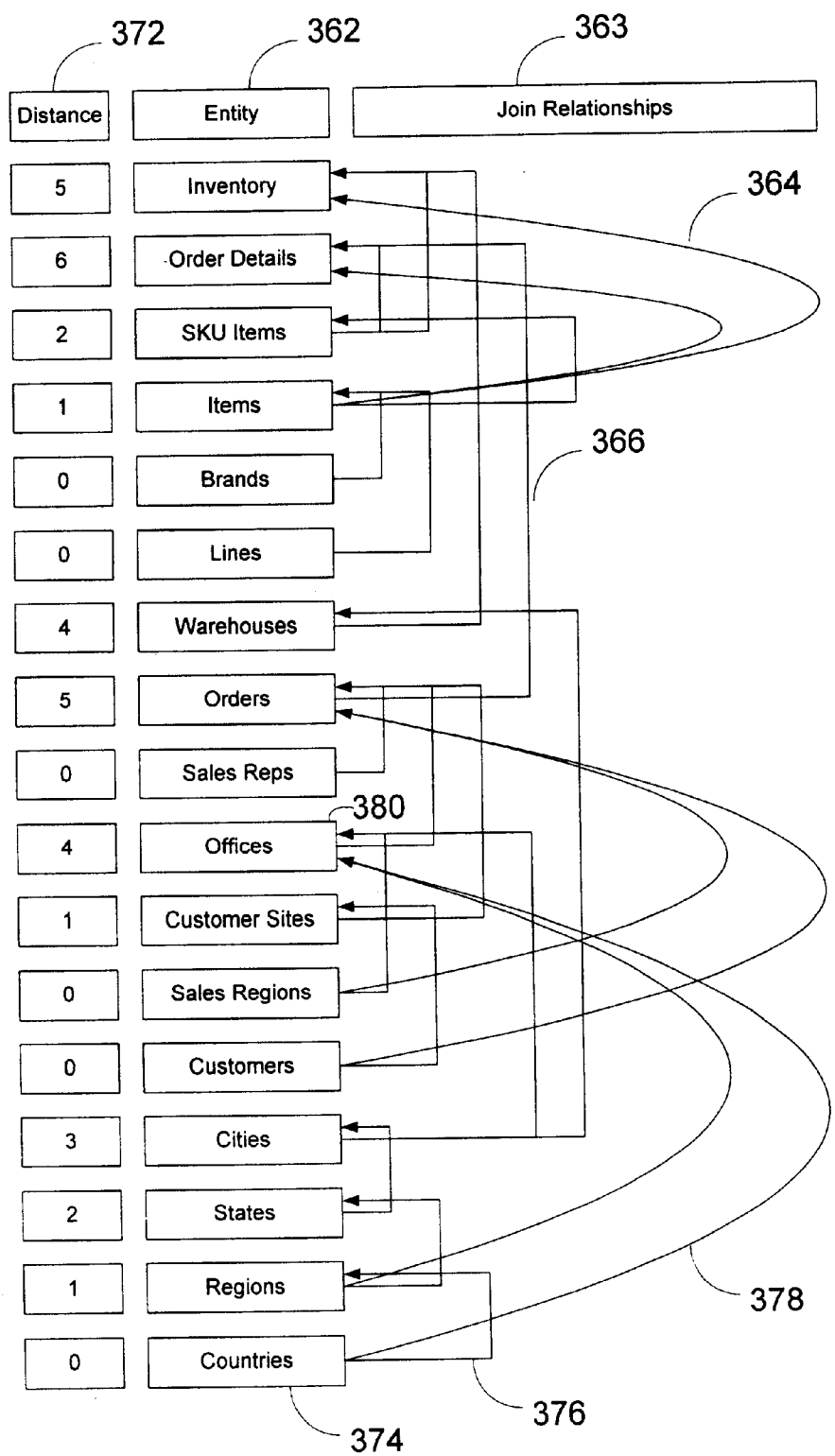
FIG. 23 is a diagram showing an example of a process state.
Figure 24:
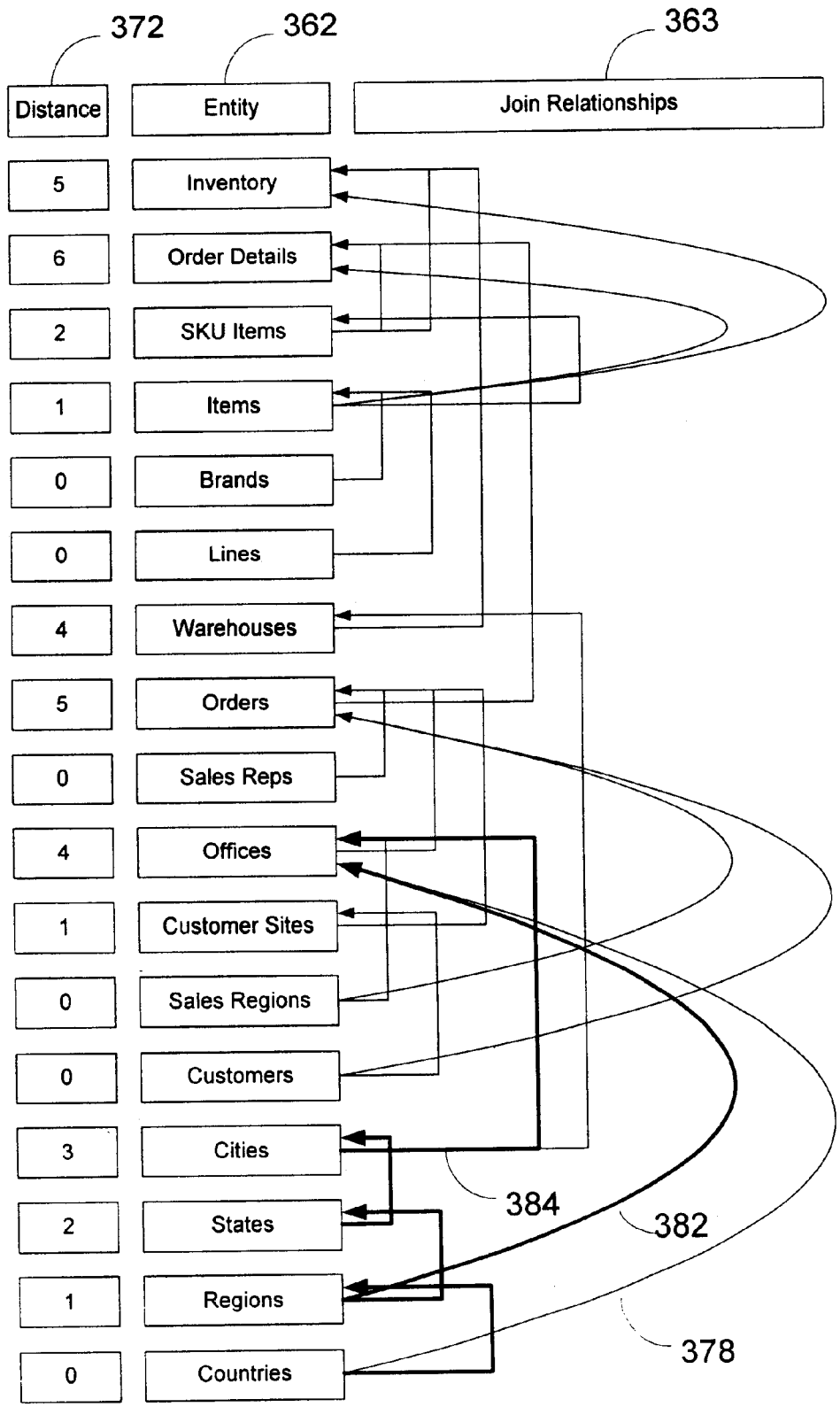
FIG. 24 is a diagram showing an example of a process state.

The operation is described using the graph manipulations referring to FIGS. 22–24.

FIG. 23 shows a graph 370 representing the business model after applying a distance 372 to each entity 362 as described in above step 3 in the algorithm. Consider the processing of step 4 in the algorithm for the first entity "Countries" 374 at the bottom of the graph 370. There are two join relationships 376 and 378 that leave entity "Countries" 374, but only one is a candidate for elimination. The candidate join relationship 378 is represented by the curved line from entity "Countries" 374 to entity "Offices" 380. There are two alternate join paths 382 and 384, as shown in FIG. 24 with thick lines. After analysing the join conditions, the redundant join relationship eliminating transformation 112d determines that the candidate join relationship 378 can be eliminated from the graph 370.

The redundant join relationship eliminating transformation 114d performs the analysis of the join conditions as follows.

Once an alternate path 382 or 384 has been found, the redundant join relationship eliminating transformation 112d compares the path of the candidate join relationship 378 to the alternate path 382 or 384 to determine if they are equivalent.

Figure 25:
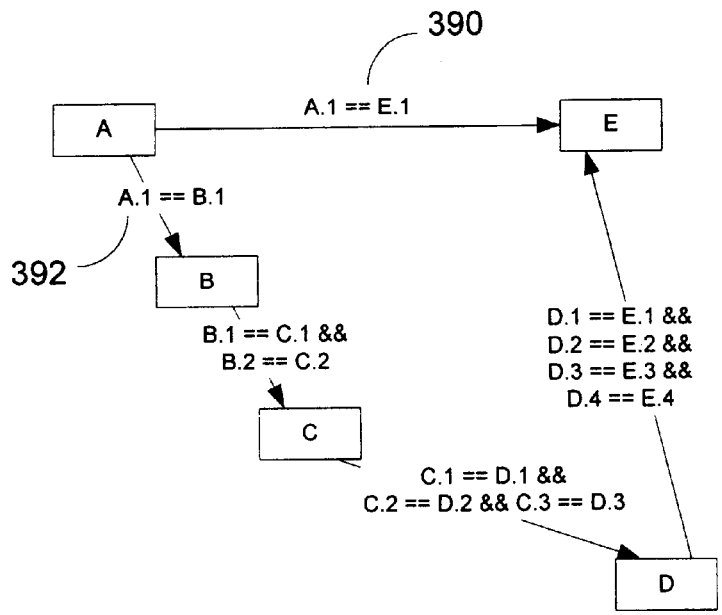
FIG. 25 is a diagram showing relations of objects.

For example, as shown in FIG. 25, an alternate path 392 involves entities A, B, C, D, and E, and join relationships AB, BC, CD, DE. The candidate path or original path 390 involves entities A, E, and join relationship AE.

The alternate expression describing the alternate relationship consists of the expressions from each of the join relationships AB, BC, CD, DE in addition to the expressions of any filters involving the intermediate entities B, C and D. The expressions from each of the join relationship and the filters from the intermediate entities are all combined using the And operator to form the alternate expression.

The original expression describing the candidate relationship consists of the expression from the join relationship AE.

Using the example expressions shown in FIG. 25, the alternate expression is as follows:

(A.1==B.1) && (B.1==C.1 && B.2==C.2) && (C.1==D.1 && C.2==D.2 && C.3==D.3) && (D.1==E.1 && D.2==E.2 && D.3==E.3 && D.4==E.4)

The redundant join relationship eliminating transformation 114d compares the alternate expression to the original expression as follows:

A.1==E.1

During processing, the redundant join relationship eliminating transformation 114d constructs a map which records equality specifications in the joins 390 and 392. The expressions are then modified using these maps before comparing them. The comparison function simplifies both of these expressions to true, so the join paths 390 and 392 are equivalent. Thus, the redundant join relationship eliminating transformation 114d verifies that the join paths 390 and 392 are equivalent and that the join path 390 is redundant.

Subclass Relationship Introducing Transformation 114e

The subclass relationship introducing transformation 114e eliminates some join ambiguities by introducing new entities and subclass relationships into the business layer 104.

The subclass relationship introducing transformation 114e may be used when the following conditions are met:
1. Two entities (left and right) are related by two join relationships.
2. The cardinalities of the join relationships are identical.
3. The cardinalities of the join relationships associated with each entity are identical.
4. The related entities do not participate in any subtype, containment or reference relationships.
5. The join condition of the join relationships matches. Details of the matching criteria are described below.

Figure 26:
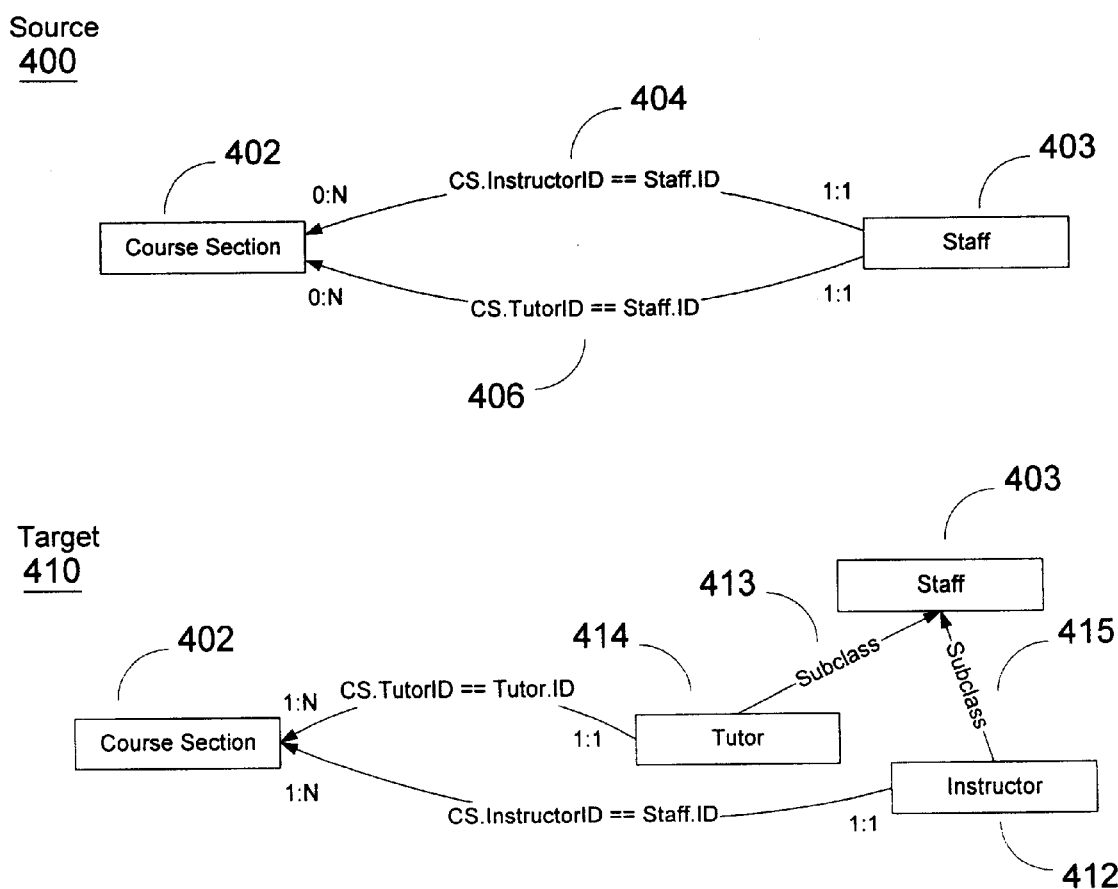
FIG. 26 is a diagram showing examples of source and target of a transformation.

FIG. 26 shows an example of a source 400 of the subclass relationship introducing transformation 114e. In the source 400, there are two entities, entity "Course Section" 402 on the left side and entity "Staff" 403 on the right side. The two entities 402, 403 are related by two join relationships 404 and 406. The cardinalities of the join relationships 404 and 406 are both {1:1}–{0:N} and identical. The related entities 402, 403 do not participate in any subtype, containment or reference relationships with other entities.

The subclass relationship introducing transformation 114*e* transforms the source 400 to a target 410. In the target 410, subtype entities 412 and 414 are constructed and subclass relationships 413 and 415 are introduced to the "Staff" entity 403.

The following shows an example of the operation of the subclass relationship introducing transformation 114*e*:

1. Create two new entities (derived1, derived2) based on an entity whose attributes were not substituted (constant) in the matching join conditions (the base entity). If attributes from neither entity are substituted, then create four new entities (two for each base entity).
2. Create subclass relationships.
3. Create new join relationships between other entity and derived entities (or solely from the derived entities). If the join cardinality at either end of the relationship was 0:N, change the cardinality to 1:N (0:1 is changed to 1:1).
4. Add a filter condition to each derived entity. The condition is identical to the join condition of the join constructed in the previous step.
5. Delete old join relationships.
6. Fix up presentation layer by removing folder references that were constructed based on the old joins.

The subclasses in this example represent roles of the original entity 403. A staff member in the entity "Staff" 403 can act as an Instructor or as a Tutor or as a generic staff member. The filter conditions that are assigned to the new entities 412, 414 define the roles. By assigning a filter condition to each derived entity 412, 414, the subclass relationship introducing transformation 114*e* causes the join relationship 413, 415 to be used in queries. Since the join relationships 413, 415 always specify an inner join, the subclass relationship introducing transformation 114*e* restricts the set of records retrieved to suit the role.

In step 1 of the operation, the subclass relationship introducing transformation 114*e* considers two join condition expressions to be matched when the only logical change in the expression is the substitution of attributes of a single entity with other attributes of the same entity. For example, simple rearrangement of expressions such as "a+b" to "b+a" is not considered to be a significant enough change to prevent these expressions from matching. A change such as "(a+b)*c" to "a+(b*c)" does prevent the expressions from matching. The subclass relationship introducing transformation 114*e* may use some form of tree comparison to implement the matching logic.

The following are some examples of matching and non-matching expressions. A and B represents entities and A.1 represents attribute 1 of entity A.

(A.1==B.1) and (B.1==A.2)

These expressions match because the only difference is that A.1 has been replaced with A.2.

(A.1==B.1 && A.2==B.2) and (A3==B.2 && A.4==B.1)

These expressions match because the only difference is that A.1 has been replaced with A.4 and A.2 has been replaced with A.3.

(A.1==B.1 && A.2==B.2) and (A.1==B.3 && A.3==B.2)

These expressions do not match because the differences A.2 has been replaced with A.3 and B.1 has been replaced with B.3. Since attributes from both entities have been substituted, these expressions do not match.

(A.1==B.1 && A.1==B.2) and (A.2==B.1 and A.3==B.2)

These expressions do not match because A.1 has been replaced by both A.2 and A.3.

Entity Referencing Transformation 114*f*

The entity referencing transformation 114*f* eliminates some join ambiguities by changing the association type of business joins to reference type.

The entity referencing transformation 114*f* may be used when the following conditions are met:

1. An entity, which is a reference entity, is related to two or more other entities via a {0,1}:1–{0,1}:N join with the {0,1}:1 end associated with the reference entity.
2. Each join references non-key attributes of the non-reference entities.
3. The reference entity cannot participate in any subtype or containment or reference relationships.

Figure 27:
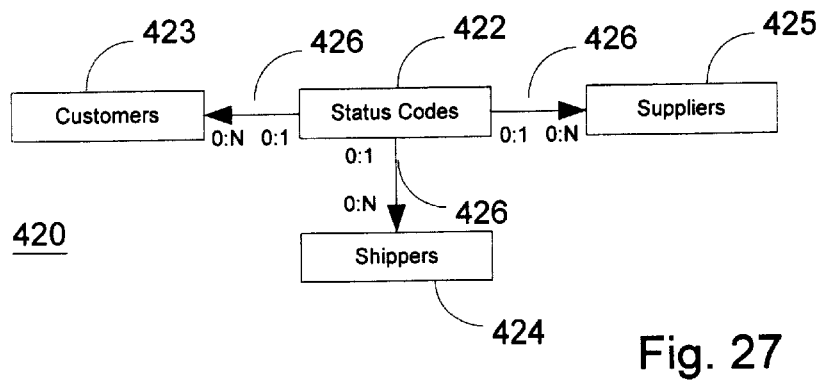
FIG. 27 is a diagram showing an example of relations of objects.

FIG. 27 shows an example of a business layer 420 having a reference entity. The business layer 420 has four entities 422–425. Entity "status Codes" 422 is related to other three entities 423–425 via 0:1–0:N joins 426 with the 0:1 end associated with the entity 422. Accordingly, the entity 422 is a reference entity. The entity referring transformation 114*f* marks the joins 426 as reference relationships on the reference entity side. The reference relationships are represented by arrows from the reference entity 422 in FIG. 27.

The status flag usage is as follows:

| Object Class | Prohibit | Processed |
| --- | --- | --- |
| Entity | Do not process this instance. | Do not process this instance. |
| Business Join | Do not process this instance. | NA |

Introducing the reference relationships into the business layer 104 allows the query engine 30 to avoid joining entities through the reference entity.

For example, an entity "Address" is referenced by both entity "Customers" and "Suppliers". Formulating a report that shows the relationships between customers and shippers with their addresses would prove very difficult without the ability to define an alias in the query definition. Without this capability, the query would likely attempt to join the two entities "Customers" and "Suppliers" via the "Address" entity. It is very unlikely that both a Customer and Shipper would share the same address. Accordingly, by introducing the reference relationships into the business layer 104 allows the query engine refiner to avoid joining the entities "Customers" and "Suppliers" through the "Address" entity. In this case, a user or client application would need to define a query unit for each instance of the "Address" entity required in the query.

Attribute Usage Determining Transformation 114*g*

The attribute usage determining transformation 114*g* determines the usage of an attribute based on how it is used by other model objects.

The following shows an example of the operation of the attribute usage determining transformation 114*g*:

I. For each non-prohibited entity:
  A. For each key
    1. Construct list of attributes (not attribute proxies) as descriptive list B. For each join related to this entity
1. Extract attributes (not attribute proxies) of this entity, add to descriptive list.
C. Add attributes (not attribute proxies) of entity that are not in descriptive list to value list.
D. For each attribute in descriptive list
1. If attribute usage is unknown && not prohibited && not marked as transformed
   a) set usage to descriptive
   b) mark attribute as transformed
E. For each attribute in value list
1. If attribute usage is unknown && not prohibited && not marked as transformed
   a) If attribute is numeric
      (1) set usage to performance indicator
      (2) mark attribute as transformed The status flag usage is as follows:

| Object Class | Prohibit | Processed |
|---|---|---|
| Entity | Do not process the instance, or contained attributes. | |
| Attribute | Do not process the instance. | Do not process the instance. |

Date Usage Identifying Transformation 114h

The date usage identifying transformation 114h examines model attributes to determine where dates are used in the model. Identifying date sensitive information can assist in the construction of dimensions in subsequent transformations.

The date usage identifying transformation 114h builds a date table in the data access layer 102, in addition to the required business model objects to reflect the physical table in the data source 100. The date usage identifying transformation 114h is unique in that the database administrator will be required to make changes to the physical database or other data source 100 to use the metadata model 15 to perform queries after the transformation 114h has completed. The database administrator will also be required to populate the date table. For these reasons, the date usage identifying transformation 114h is always considered as optional.

Figure 28:
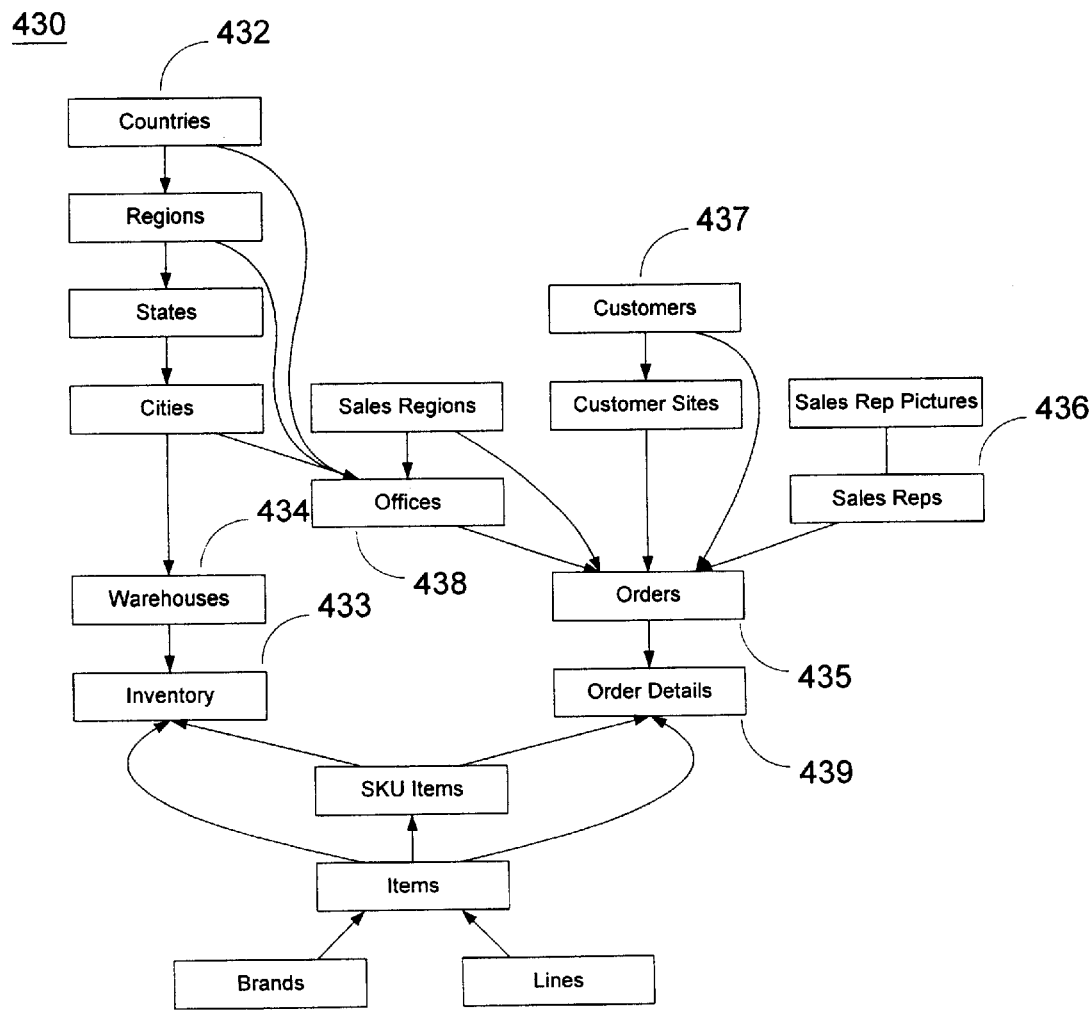
FIG. 28 is a diagram showing an example of source of a transformation.

FIG. 28 shows an example of a source business layer 43 of the date usage identifying transformation 114h. In the source business layer 430, there are some entities 432. Among the entities 432, date attributes exist within only some entities, e.g., Inventory 433, Warehouses 434, Orders 435, Sales Reps 436, Customers 437, Offices 438. However, the entity, Order Details 429 does not have any date attribute.

Figure 29:
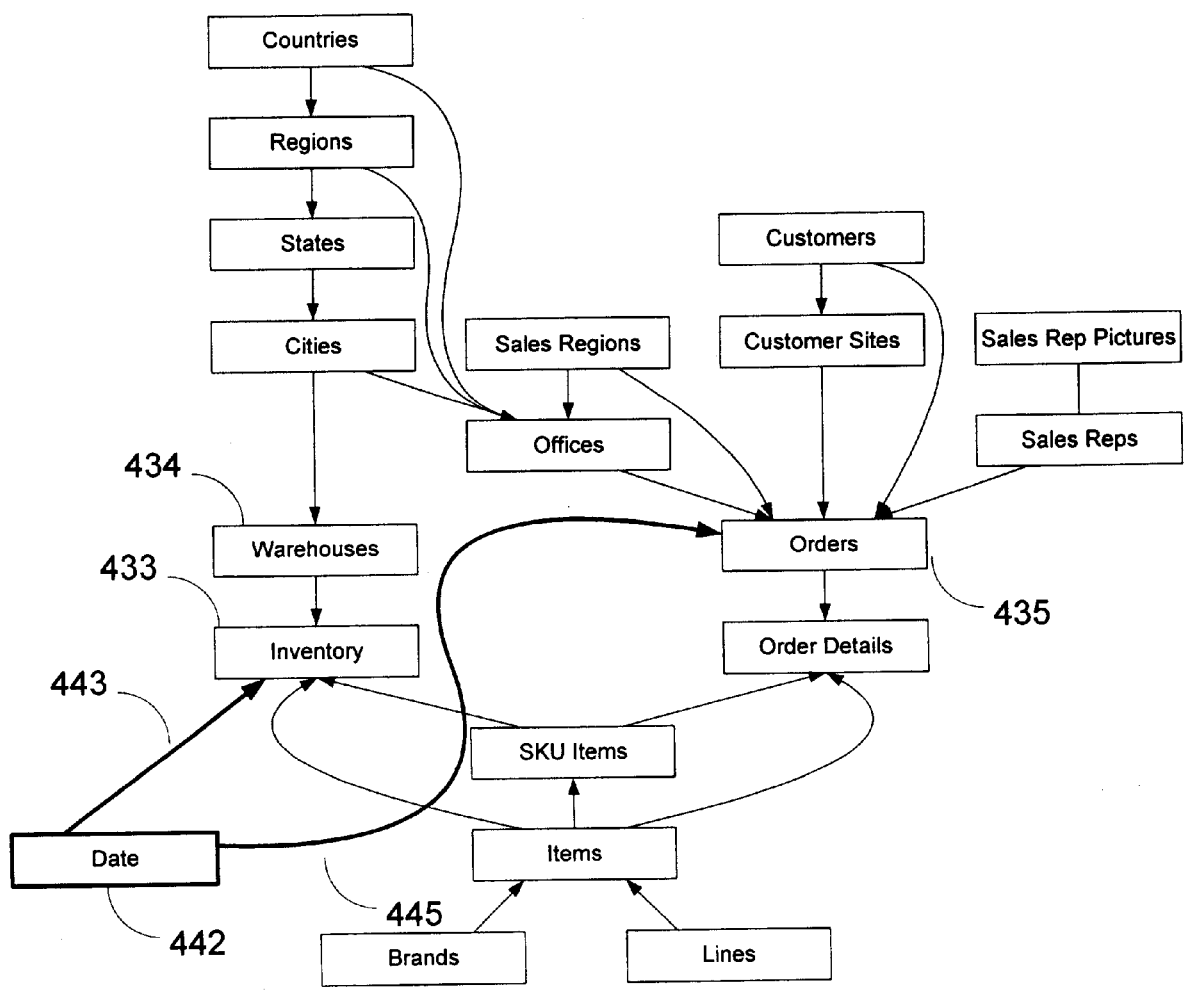
FIG. 29 is a diagram showing an example of target of the transformation.

The date usage identifying transformation 114h transforms the source 430 to a target 440 shown in FIG. 29. In this example, the date usage identifying transformation 114h creates an entity, Date 442, and its underlying physical objects. It also joins by joins 443, 445 the Date entity 432 to a number of entities, e.g., entities 433 and 435, as shown in bold in FIG. 29. The locations to join to the Date entity 432 is based on the proximity of the date attribute's entity to the "fact" entities, e.g., entities 433 and 435, that participate on the {0,1}:N side of join relationships.

Thus, the date usage identifying transformation 114h provides a reasonable set of relationships between the Date entity 442 and other entities 432. The relationships are added in a manner that facilitates the construction of dimensions in later transformations.

The following shows an example of the operation of the date usage identifying transformation 114h:
1. Order entities in graph using algorithm to determine Strongly Connected Components. Treat the join relationships as directed edges (from 1:1 end to 1:N end).
2. For each entity (from "deepest" to "shallowest"):
   i) If the entity is not marked and the entity contains a date attribute:
      a) If the transformation has not been run before:
         (1) Create date objects in model.
         (2) Mark model as transformed.
      b) Else
         (1) Locate previously created date entity and attribute.
      c) If date attribute has not been transformed and date entity and attribute exist:
         (1) Create join between the entity's attribute and the date attribute.
      d) Mark all ancestor entities to prevent adding additional joins to Date entity.

Multidimensional Model Transformations 115

The multidimensional model transformations 115 include measure identifying and measure dimension constructing transformation 115a, category dimension and level constructing transformation 115b, and logical cube constructing transformation 115c.

Measure Identifying and Measure Dimension Constructing Transformation 115a

The measure identifying and measure dimension constructing transformation 115a identifies a reasonable set of measures by analyzing the structure of a source model, e.g., an E/R model, to identify entities that contain measure candidates. An entity contains a measure candidate if all of the considered join relationships terminate at the entity. This transformation 115a considers only the join relationships that have cardinalities {0,1}:1–{0,1}:N. A join relationship with these cardinalities can be considered to be directed, beginning at the end with cardinality {0,1}:1 and terminating at the end with cardinality {0,1}:N. The entities suitable for this transformation 115a have numeric attributes that do not participate in keys or in any join relationship.

Once the transformation 115a discovers a suitable entity, it tests each attribute of the entity to determine if the attribute could be a measure. An acceptable attribute is numeric, and is not a member of a key and is not referenced in any join relationship associated with the entity.

Figure 30:
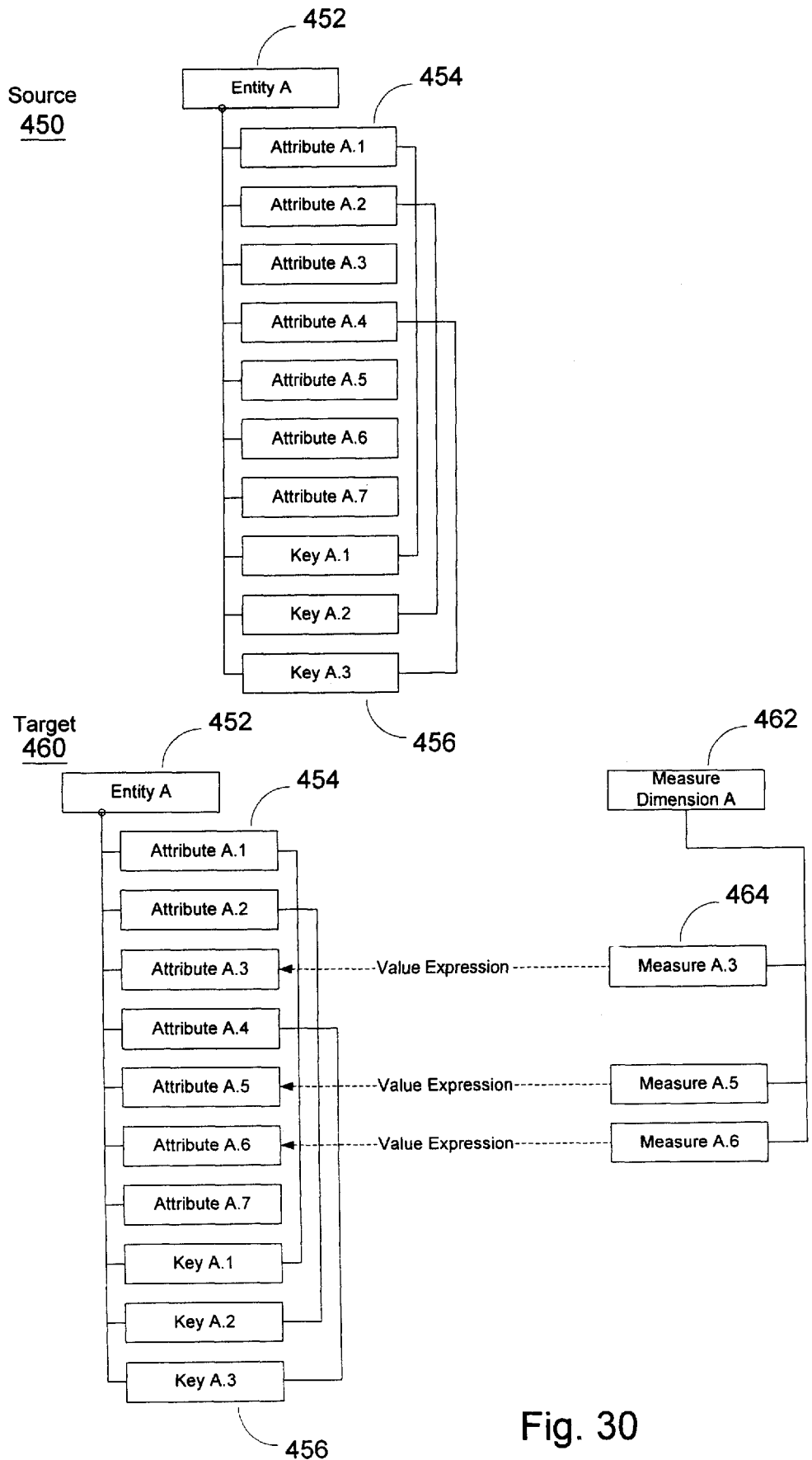
FIG. 30 is a diagram showing examples of source and target of a transformation.

FIG. 30 shows an example of a source 450 of the measure identifying and measure dimension constructing transformation 115a. In the source 450, an entity 452 has seven attributes 454 and three keys 456. Attributes A.1, A.2 and A.4 participate in keys A.1, A.2 and A.3, respectively.

The measure identifying and measure dimension constructing transformation 115a transforms the source 450 to a target 460. The transformation 115a tests each attribute 454 in the entity 452. Attributes A.1, A.2 and A.4 are not suitable to be measures as they participate in keys 456, and attribute A.7 is unacceptable because it is a string. Accordingly, the transformation 115a determines attributes A.3, A.5 and A.6 to be measures A.3, A.5 and A.6. Thus, the transformations 115a identifies measure dimension 462 having the measures 464.

The measure identifying and measure dimension constructing transformation 115a identifies a basic set of measures based on an analysis of the source model. This transformation 115a may not identify all of the attributes that could be measures in the model, since only the "fact table" entities are examined for attributes that could be measures.

The following shows an example of the operation of the measure identifying and measure dimension constructing transformation 115a:
1. For each entity:
   a) If all joins with cardinalities {0,1}:1, {0,1}:N terminate at this entity:
      i) If entity has been marked as transformed:
         a) Attempt to locate measure dimension.
      ii) If measure dimension found or entity not marked as transformed:
         a) For each attribute in entity:
            (1) If attribute has not been transformed, not used by any key or join, and is numeric:
               (a) Build measure
               (b) If entity has not been transformed:
                  (i) Build measure dimension
                  (ii) Mark entity as transformed.
                  (iii) Add relationship between attribute and measure.
               (c) Add measure to measure dimension.

Category Dimension and Level Constructing Transformation 115b

The category dimension and level constructing transformation 115b analyzes a source model, e.g., a business layer, and constructs dimensions and levels for the source model. The transformation 115b creates, if necessary, additional Date entities to maintain the consistency of the model.

The category dimension and level constructing transformation 115b may be used when the following conditions are met:
1. The source model contains at least one entity whose associated {0,1}:1–{0,1}:N join relationships terminate at the entity.
2. Entities that are keyed with an attribute of type date only participate on the {0,1}:1 side of all associated join relationships.
3. The category dimension and level constructing transformation 115b has not been run against this model before.

Figure 31:
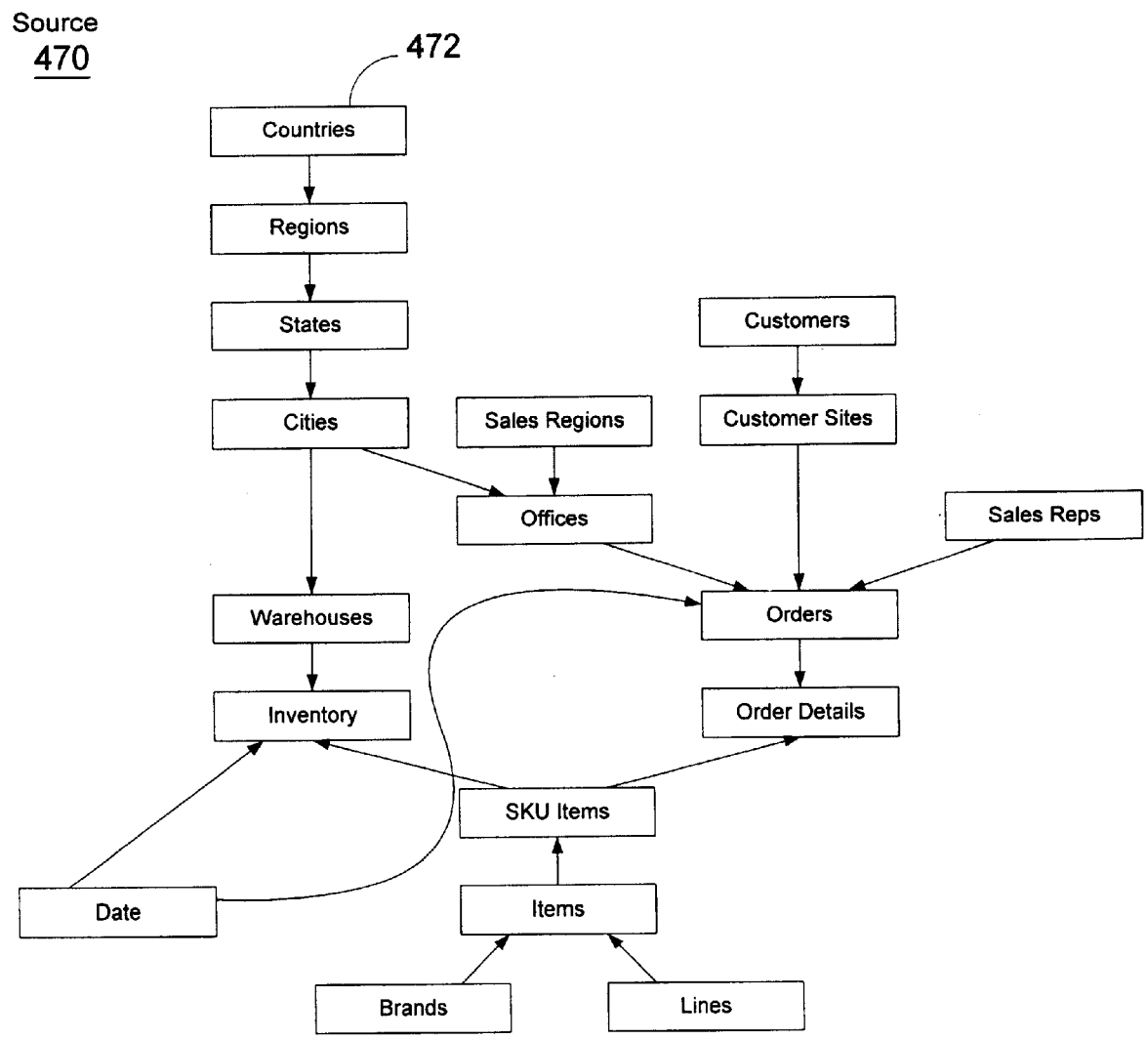
FIG. 31 is a diagram showing an example of source of a transformation.

FIG. 31 shows an example of a source model, an business layer 470, of the category dimension and level constructing transformation 115b. The model 470 has multiple entities 472 joined as shown in FIG. 31. The transformation 115b identifies "fact tables" and dimensions in the model 470.

Figure 32:
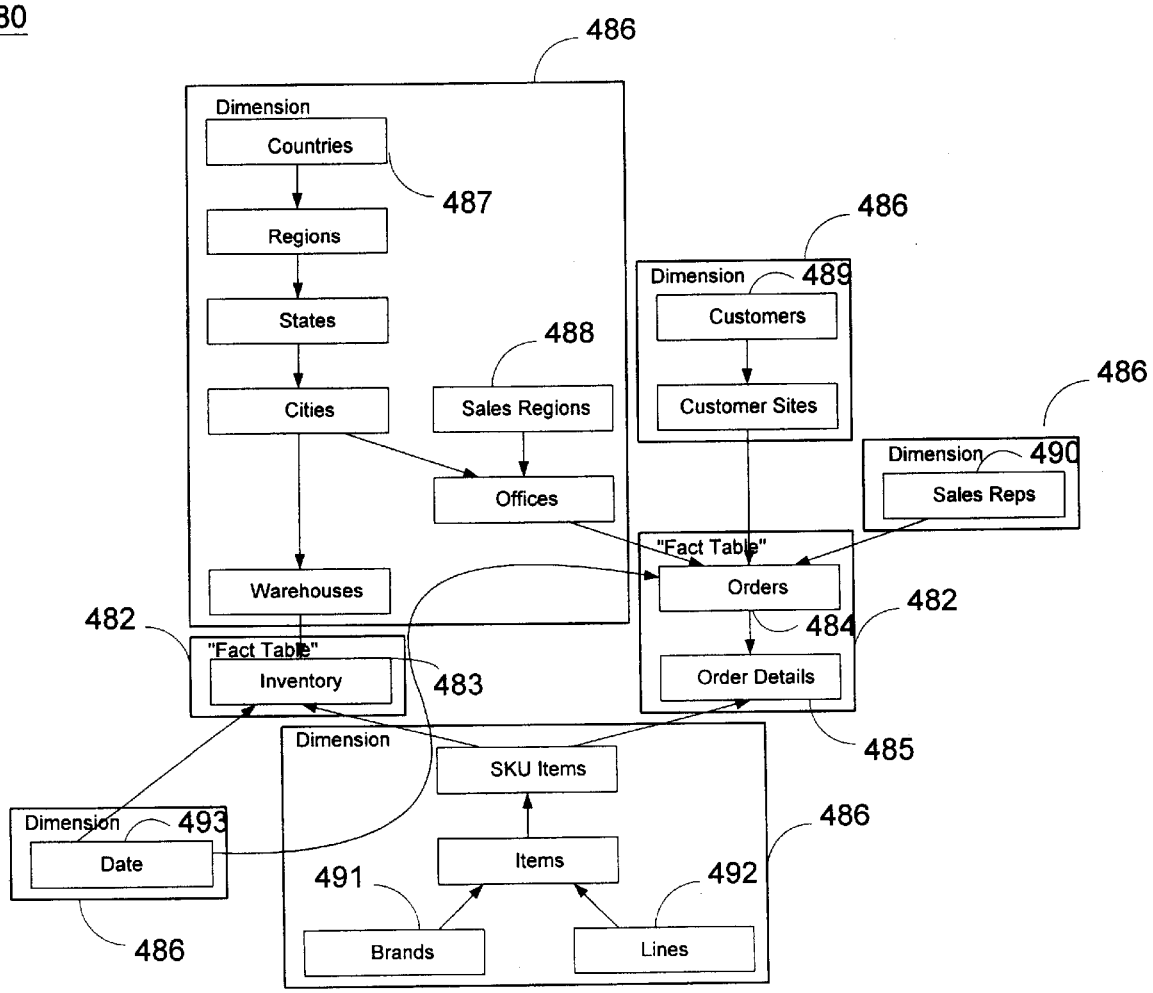
FIG. 32 is a diagram showing an example of target of the transformation.

The category dimension and level constructing transformation 115b transforms the source 470 to a target 480 as shown in FIG. 32. In this example, the transformation 115b identified two logical "fact tables" 482: one containing an entity Inventory 483, and the other containing the pair of entities Orders 484 and Order Details 485. The transformation 115b also identified five dimensions 486: geographical containing entities Countries 487 and Sales Regions 488, customers containing an entity Customers 489, sales representatives containing an entity Sales Reps 490, products containing entities Brands 491 and Lines 492, and time containing an entity Date 493.

An example of the operation of the category dimension and level constructing transformation 115b is described referring to FIGS. 33–39. The transformation 115b relies rather heavily on recursion. FIGS. 33–39 illustrates the operation progress on the sample model 470 shown in FIG. 31. The operation of the transformation 115b has five phases.

Figure 33:
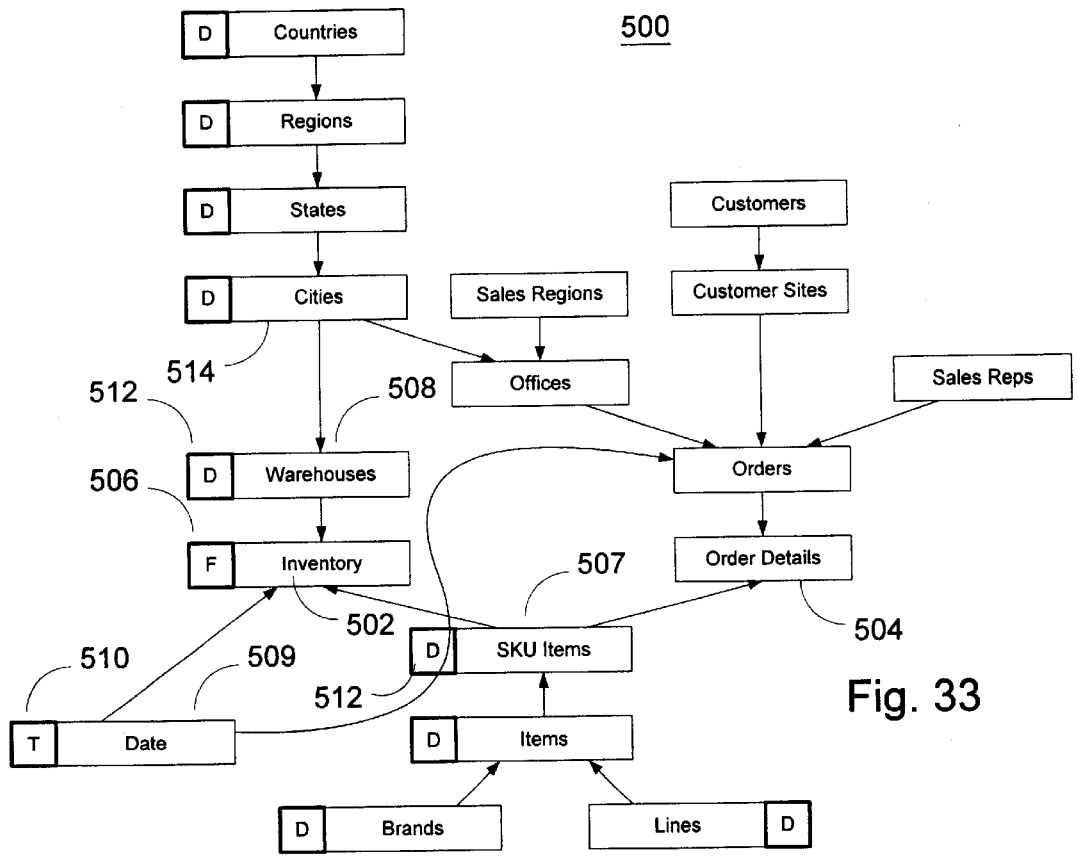
FIG. 33 is a diagram showing an example of a step of a transformation.

FIG. 33 shows a graph 500 representing the sample model 470. In FIG. 33, F indicates a fact entity, D indicates a dimension entity, and T indicates a time entity. The first phase of the category dimension and level constructing transformation 115b is to determine which entities are fact entities and which entities are dimension entities. The transformation 115b begins by processing all entities that have join relationships with cardinality {0,1}:1–{0,1}:N all terminate at the entity. For the sample model 500, the entities that satisfy this criterion are Inventory 502 and Order Details 504.

Consider the Inventory 502 node. The category dimension and level constructing transformation 115b marks this entity 502 as a fact entity 506. It then processes all entities 507–509 that are associated with the fact entity 506 via {0,1}:1–{0,1}:N join relationships in a recursive fashion. If the entity 507–509 has not been processed yet, the transformation 115b processes it. If the entity 509 has a key of type date, the transformation 115b marks the entity 509 as a Time entity 510. Otherwise, the entity 507 or 508 is marked as a dimension entity 512, and it's related entities 514 are processed recursively. After the transformation 115b completes the processing of the Inventory entity 502, the graph 500 is decorated as shown in FIG. 33.

Figure 34:
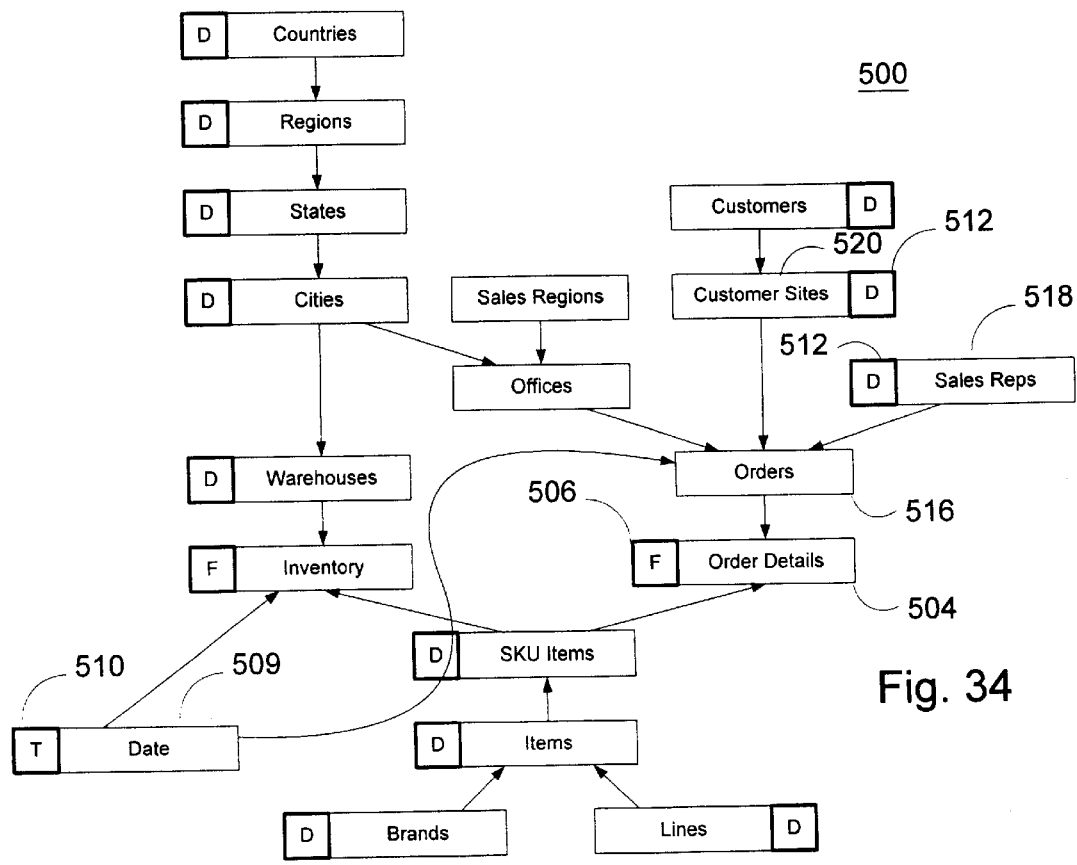
FIG. 34 is a diagram showing an example of a step of the transformation.

Referring to FIG. 34, the category dimension and level constructing transformation 115b now turns its attention to the Order Details entity 504, where some of the interesting things happen. Once again, the transformation 115b marks the Order Details entity 504 as a fact entity 506, and processes the associated entities recursively if they have not yet been processed. For the sake of explanation, say the transformation 115b is currently processing the Orders entity 516. It has processed the related entities Sales Reps 518 and Customer Sites 520, marking them as dimension entities 512. The transformation 115b is about to process the Date entity 509. FIG. 34 shows how the graph 500 has been decorated to this point.

Figure 35:
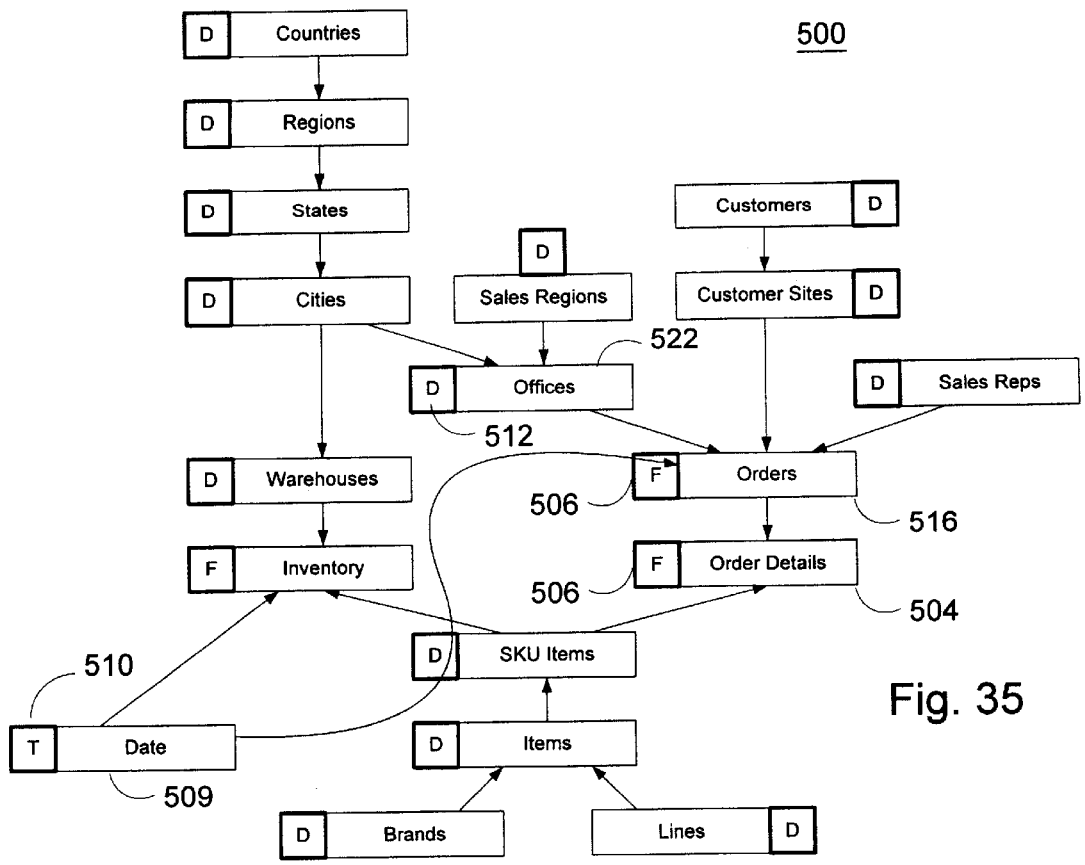
FIG. 35 is a diagram showing an example of a step of the transformation.

Referring now to FIG. 35, when attempting to process the Date entity 509, the transformation 115b notes that the Date entity 509 has already been processed, and it is a time entity 510. This forces the Orders entity 516 to be marked as a fact entity 506 instead of a dimension entity. Processing of the Offices entity 522 continues normally. The tail of the recursive process marks all intermediate entities between Orders 516 and Order Details 504 as fact entities 506. In this case, there are no such entities. FIG. 35 shows the graph 500 at the end of the first phase in processing of the transformation 115b.

Figure 36:
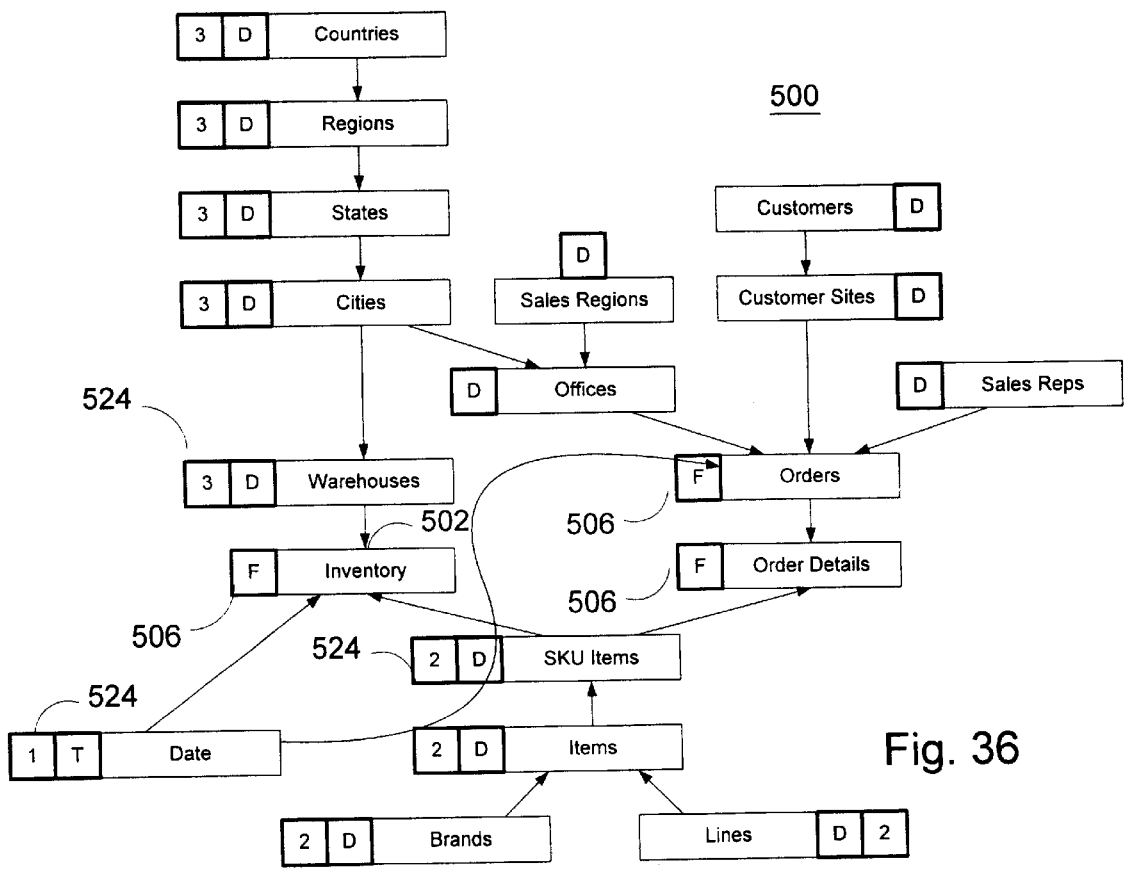
FIG. 36 is a diagram showing an example of a step of the transformation.
Figure 37:
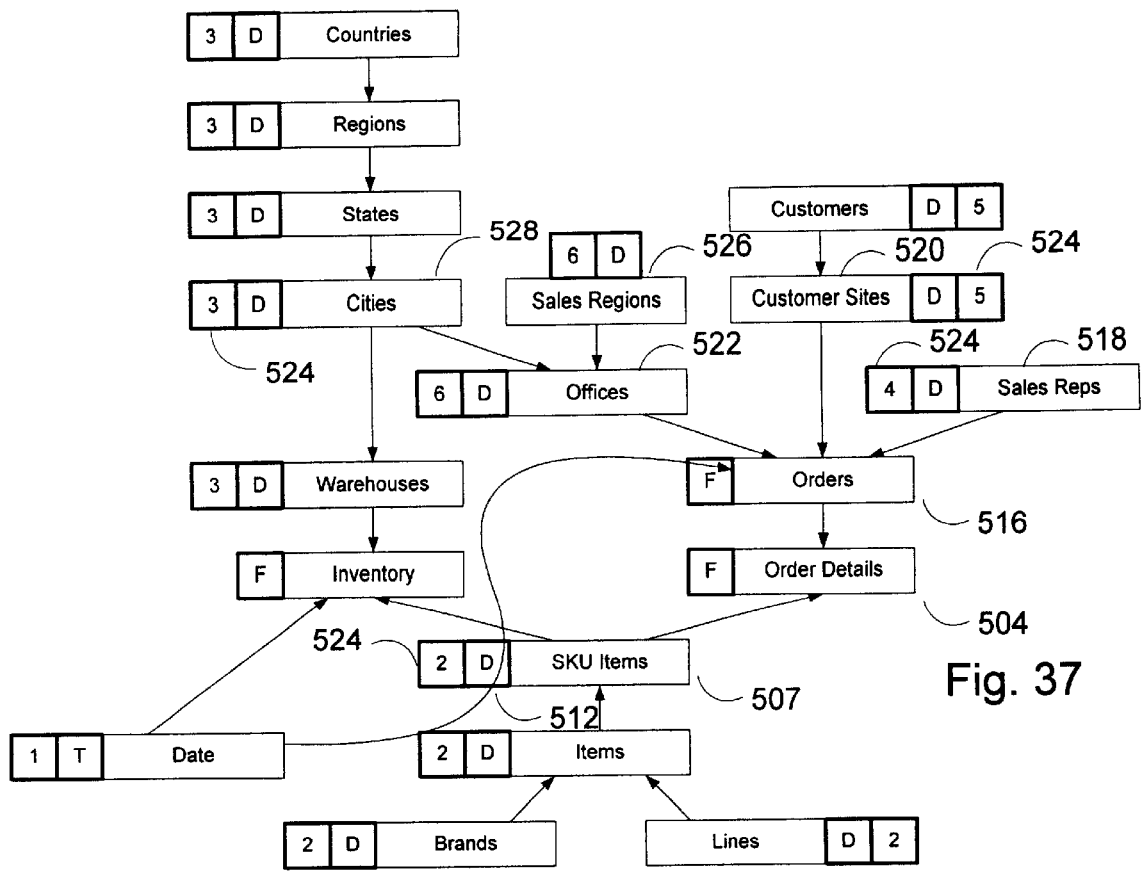
FIG. 37 is a diagram showing an example of a step of the transformation.

Referring now to FIG. 36, the second phase of the transformation 115b groups entities into groups that will eventually be dimensions. For this phase, the transformation 115b processes all of the entities tagged as fact entities 506. The transformation 115b recursively processes all associated entities of the fact entities 506, and assigns to them a dimension number 524. FIG. 37 shows the graph 500 after processing the Inventory fact entity 502.

Referring now to FIG. 37, the transformation 115b now considers the processing of the Order Details entity 504. All associated dimension entities 512, i.e., SKU Items entity 507, already has a dimension number 524 assigned to it. Accordingly, the processing of the Order Details entity 504 is complete.

When processing the Orders entity 516, the transformation 115b can process the associated entities Sales Reps 518 and Customer Sites 520. It assigns them dimension numbers 524.

During processing of the Offices entity 522, immediately after processing the Sales Regions entity 526, when the transformation 115b attempts to process the Cities entity 528, it notes that the Cities entity 528 has already been assigned a dimension number 524. In this situation, the transformation 115b merges the dimension group under construction with the existing group. This is accomplished by changing the dimension numbers 524 of those entities in the new group to the dimension number of the existing group. In this case, all entities tagged with the dimension number "6" would be re-tagged with the dimension number "3". This merge operation also completes the second phase in the transformation 115*b*.

Figure 38:
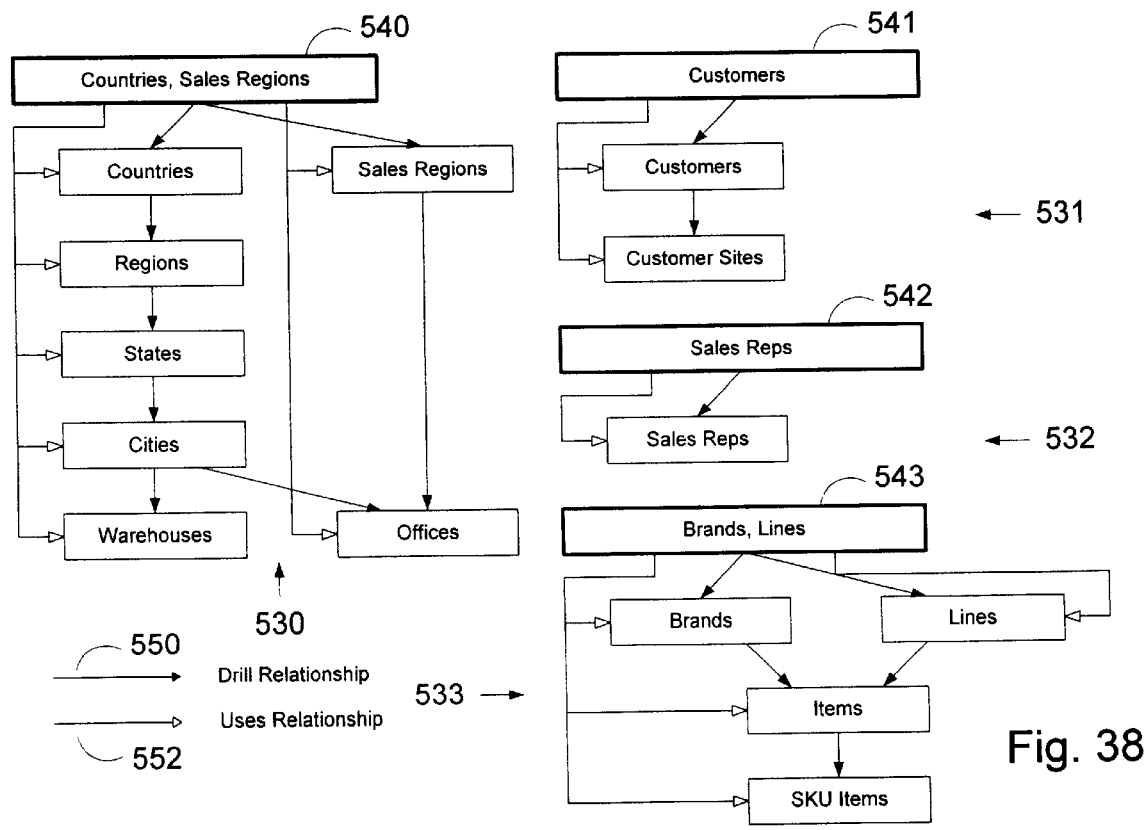
FIG. 38 is a diagram showing the dimensions constructed as the output of the transformation.

The third phase in the transformation 115*b* is the construction of dimensions and levels. Referring now to FIG. 38, each group 530–533 corresponds to a dimension 540–543. The transformation 115*b* processes each group 530–533 in turn. For each group 530–533, the transformation 115*b* finds all of the roots in the dimension. It then constructs a name for the dimension by concatenating these names together. When the dimension is constructed, the transformation 115*b* adds the dimension to the appropriate presentation folder.

For every dimension 540–543 other than the dimension based on a time entity, the fourth phase of the transformation 115*b* is the construction of the levels. Each entity in the dimension group 530–533 is used to construct the level. The entity key is used as the level source value expression. Each level is added to the dimension 540–543 as it is constructed. Then, based on the entity join relationships, drill relationships 550 are constructed between the levels. A drill relationship 550 defines navigation between levels in the metadata model 15. FIG. 38 is an illustration of each dimension, other than the time dimension, after it has been constructed.

Figure 39:
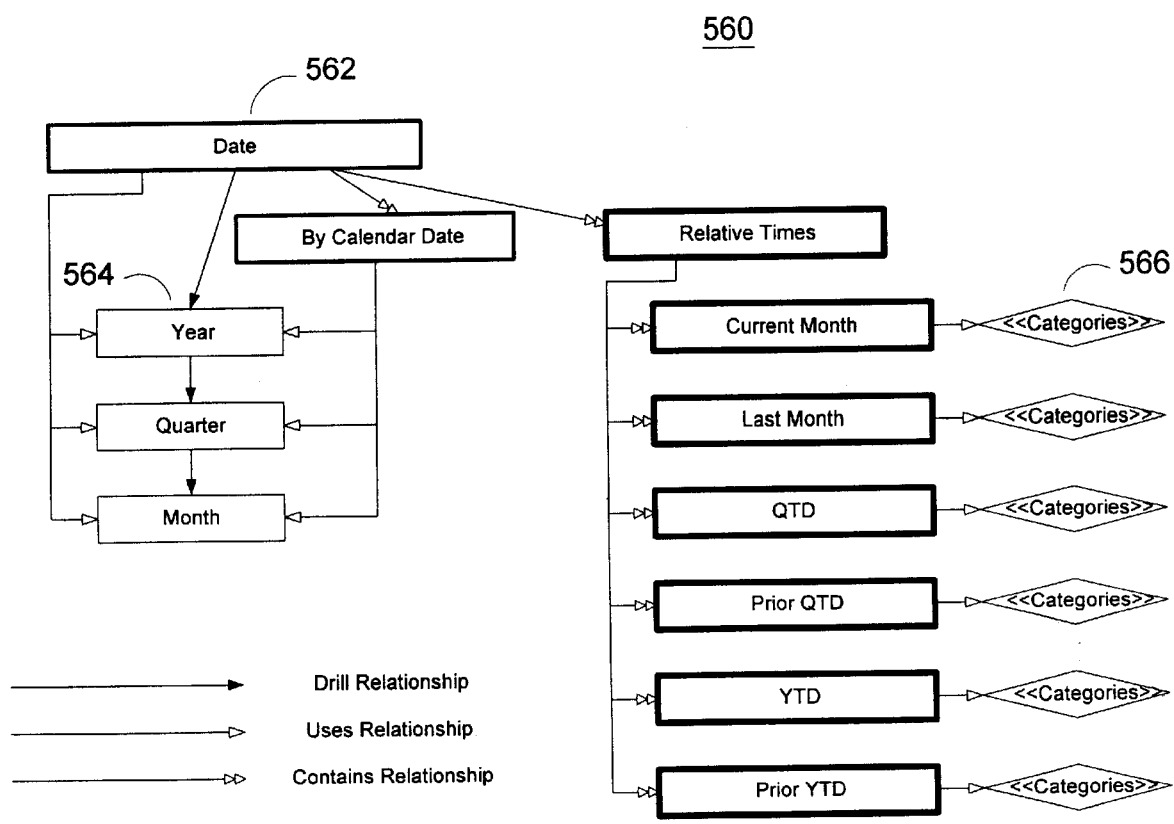
FIG. 39 is a diagram showing the dimensions constructed as the output of the transformation.

Referring to FIG. 39, when the transformation 115*b* constructs a time dimension 562, extra objects 564 are added to the model. The extra object 564 is a drill object, which coordinates settings across levels for time dimensions 562. Some examples of the type of information managed include the year start date, the beginning day of the week, and the rule for managing the construction of partial weeks. The construction of the time dimension 562 yields a structure 560 that is very similar to the dimension as produced by Transformer. FIG. 39 shows the structure 560 for the time dimension 562. The categories 566 are constructed within levels based on the data processed.

The fifth phase of the transformation 115*b* is the association of measures with levels. The association is required to determine the level of detail of data of the measure, as well as determine which dimensions are relevant to the measure. For example, a measure which tracks the number of days in a month only has the Month level. A measure such as Units from Orders is associated with all of the dimensions in the model.

This fifth phase of the transformation 115*b* is accomplished by examining each measure in the model to determine which entities are used to define the measure. All of these entities are fact entities. The measure is associated with the level of each dimension entity that this associated with the fact entity. For Units of Order Details, the associated level list is Sales Reps, Customer Sites, Offices, SKU Items, and Month. In the case of Month, the most detailed level as determined by drill relationships is associated with the measure.

Logical Cube Constructing Transformation 115*c*

The logic cube constructing transformation 115*c* constructs a set of logical cubes based on the dimensions in the business layer of the model. The transformation 115*c* is applicable when the model contains at least one measure dimension.

The logic cube constructing transformation 115*c* collects dimensions that are related to measures in a single measure dimension together to form a logical multidimensional space.

The following shows an example of the operation of the logic cube constructing transformation 115*c*:

1. For each measure dimension:
    a) Construct a logical cube that contains the measure dimension. Add the logical cube to the presentation layer.
    b) For each associated entity in the business layer:
        i) If the entity has a level:
            a) Add the dimension using the dimension to the cube (if the dimension is not already used by the cube).

Package (Presentation) Model Transformations 116

As shown in FIG. 4B, the presentation model transformations 116 include a basic package (presentation) model constructing transformation 116*a*, and package constructing transformation for Cognos Query 116*b*.

Basic Package (Presentation) Model Constructing Transformation 116*a*

The basic package (presentation) model constructing transformation 116*a* constructs a package layer 106. The package layer 106 may be similar to an existing E/R model.

The basic package model constructing transformation 116*a* may be used when the following conditions are met:
1. Business Model exists.
2. All entities except those prohibited or previously transformed are acceptable.
3. A join is acceptable if it has not been transformed yet, joins two entities that have been transformed, and the entities each have a single transformation target.

Figure 40:
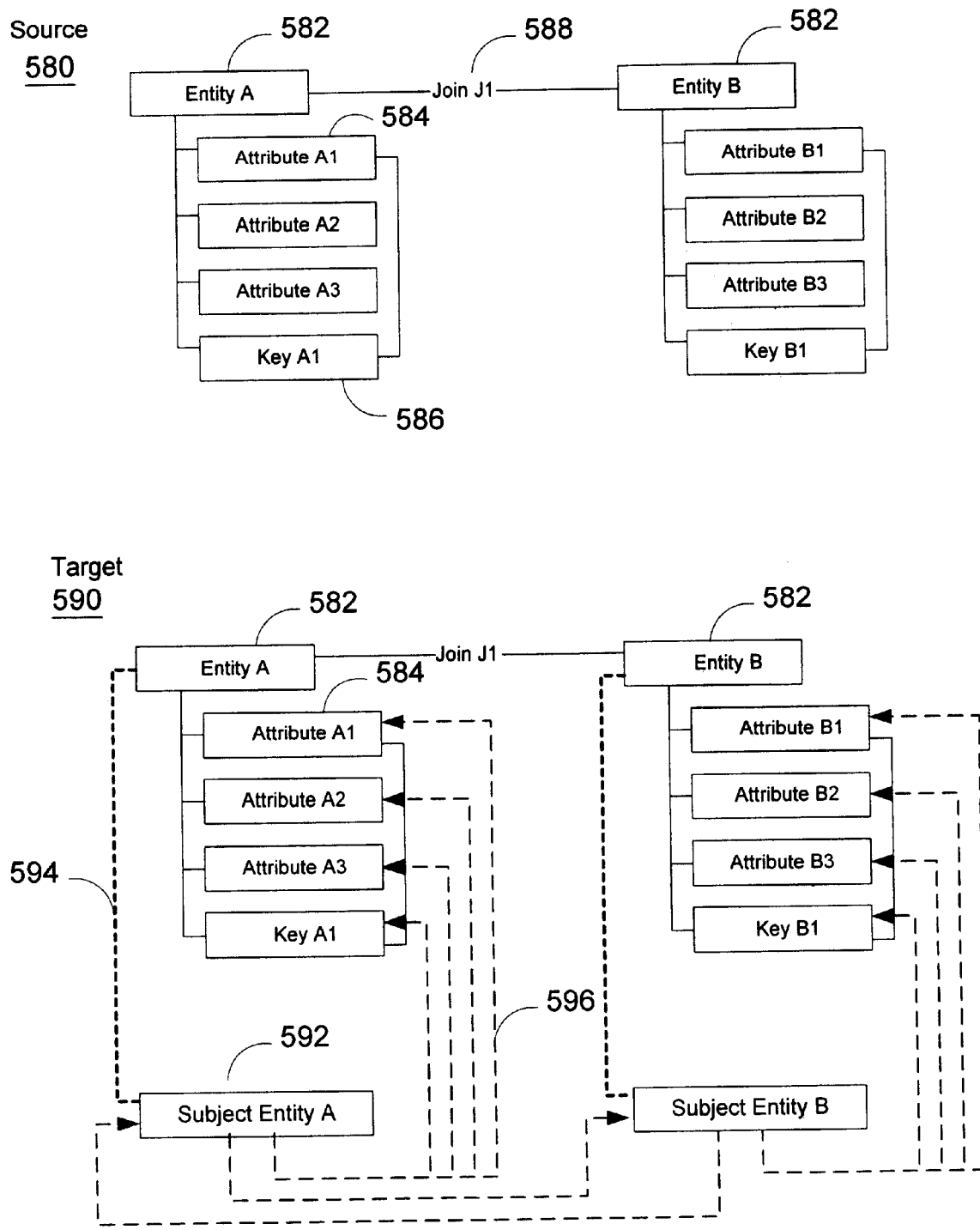
FIG. 40 is a diagram showing examples of source and target of a transformation.

FIG. 40 shows an example of a source 580 of the basic package model constructing transformation 116*a*. The source 580 has two entities 582, each having attributes 584 and a key 586. The two entities 582 are related with a join 588.

The basic package model constructing transformation 116*a* transforms the source 580 to a target 590. The transformation 116*a* builds a subject entity 592 for an entity 582, and adds a relationship 594 between the entity 582 and the subject entity 592. For each attribute 584 in the entity 582, the transformation 116*a* builds a subject item attribute 584 in the subject entity 592.

The basic package model constructing transformation 116*a* attempts, if a source object has been marked as transformed, to locate a target if the source object could contain other objects. If there are no target objects, then processing of the source object halts, but no error is written. In this case, the transformation 116*a* assumes that the lack of a target object indicates the administrator's desire to avoid transforming the object.

The following shows an example of the operation of the basic package model constructing transformation 116*a*:

1. For each non-prohibited entity:
    a) If entity has already been transformed:
        i) Attempt to locate target subject entity.
    b) Else
        i) Build subject entity.
        ii) Mark entity as transformed.
        iii) Add relationship between entity and subject entity.
    c) If subject entity built, or found:
        i) For each attribute in entity:
            a) If attribute has not been transformed yet:
                (1) Build subject item attribute in subject entity.
                (2) Add relationship between attribute and subject item attribute.
                (3) Mark attribute as transformed 2. For each non-prohibited join:
   a) Add a query path between each pair of subject entities relating to entities related to join.
   b) Build relationship between join and query path.
   c) Mark join as transformed.

Package Construction Transformation for Cognos Query (CQ) 116*b*

The package construction transformation 116*b* attempts to construct a package that conforms to the Cognos Query constraints from a generic package. Arbitrary packages are typically generated via Impromptu Catalogue Import, but they may be generated via other client applications.

The package that is created when an Impromptu catalogue is imported consists of a hierarchy of subject folders. A folder does not define any semantic information—it is simply a container for other objects. Users navigate these folders when building reports in Impromptu. A folder will not typically represent a report in the catalogue, but will contain a set of related objects from which a report could be constructed. The report semantics are determined by the order in which items are added to the report as well as the joins defined in the Impromptu catalogue.

When CQ uses the reporting system 4, it uses subject entities. A subject entity defines the additional semantics required by the CQ query engine. A subject entity is really a very simple form of query—it contains a projection list as well as the information required to construct a "where" clause. The CQ user navigates from subject entity to subject entity via paths, which consist of a chain of joins from the business model. Each path acts as a filter in the query to which the user has navigated.

Since an Impromptu catalogue import produces subject folders, and CQ uses subjects, the two applications do not share a common presentation model. The transformation 116*b* attempts to map one presentation model onto the other.

The transformation 115*b* builds and/or updates packages based on a source package. For each subject folder, it determines whether it is suitable for conversion to a subject. If it is suitable, the transformation 115*b* builds a subject, and populates the contents based on the contents of the source folder. Subject entities will be copied.

The transformation 116*b* collapses the folder hierarchy into a list.

The transformation 116*b* builds paths between the newly created subject entities based on the business model joins. Each constructed path references a single join.

Figure 41:
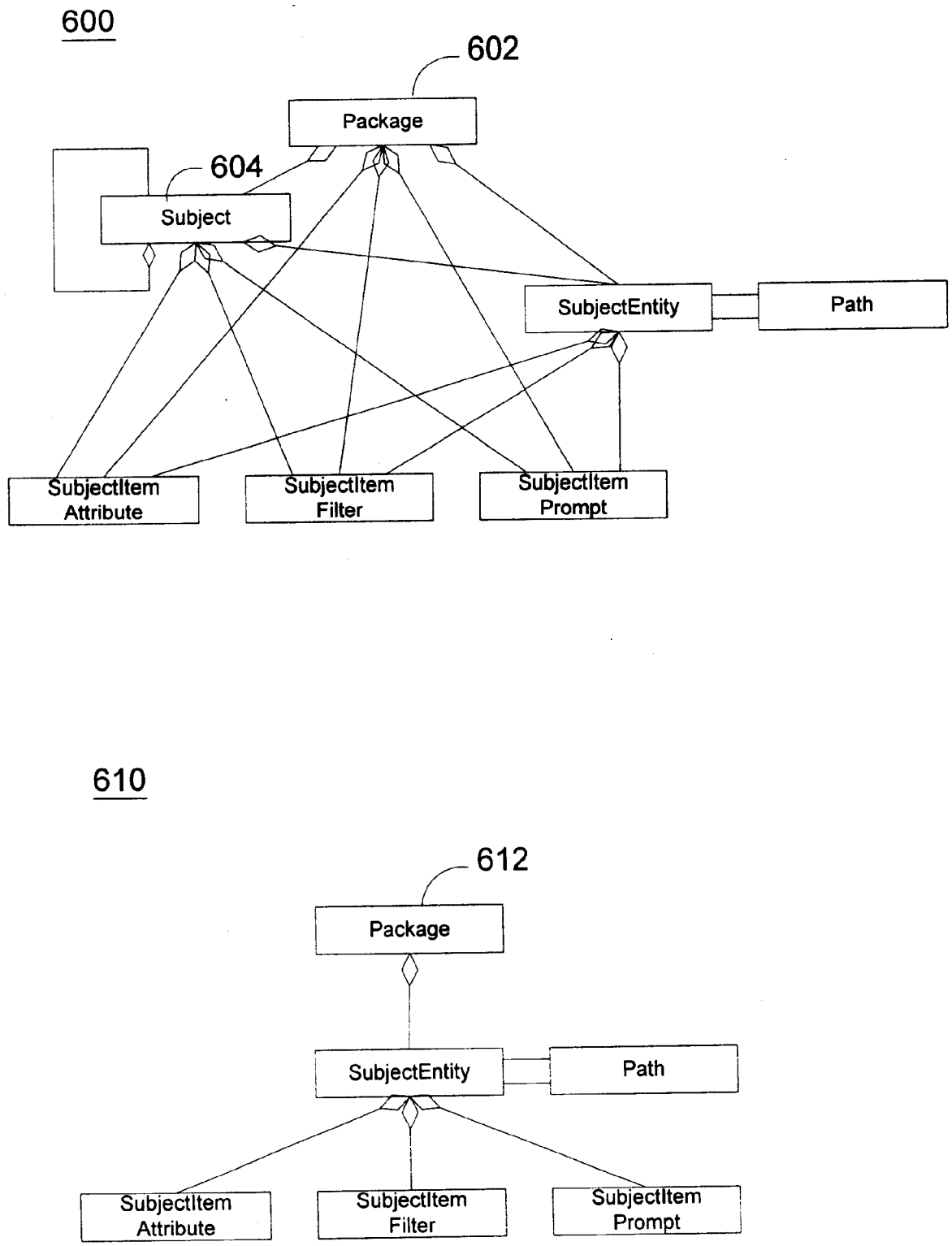
FIG. 41 is a diagram showing an example of a source model and a target model of a transformation.

FIG. 41 shows an example of a source 600. Packages 602 and subjects 604 contain a collection of subjects and subject entities, as well as a collection of subject items. A subject entity contains a collection of subject items. Subject entities are linked together with paths. There are three types of subject items: subject item attribute, subject item filter, and subject item prompt.

FIG. 41 also shows an example of a target 610. The target package 612 will be constructed for use by Cognos Query. The primary structural change will be the conversion of subjects to subject entities, and the elimination of the subject hierarchy.

The transformation 116*b* transforms each subject/subject entity in the source package 610, constructing a subject entity in the target package 612 and linking it to the other subject entities in that package 610.

Before a subject or subject entity can be transformed, it needs to satisfy the following conditions:

It contains at least one subject item attribute.

The subject item attributes reference at least one data source object, e.g., table or view.

The graph formed by all referenced entities is connected.

The graph is spanned with a minimal spanning tree which is unambiguous.

A method in the query engine 25 is used to build the graph and determine the connectivity. The information that is passed to and received from the method is:

The input includes the set of entities referenced by the set of subject item attributes.

The input includes the set of business joins referenced by the set of subject item attributes.

The output includes the driver entity. This is the entity to which the target s ubject entity is associated.

The output includes the set of paths to the other referenced entities. These paths (actually a vector of joins) are used to construct the subject item attributes in the target subject entity.

An exception is thrown if the required output information cannot be generated. The remainder of the logic required in the transformation 116*b* is related to synchronization activities. If new objects are created in the source package 600, they are reflected in the target package 610. Transformations 20 typically do not delete objects. Also, if the user subsequently deletes objects created by this transformation 116*b*, these objects do not re-appear the next time the transformation 116*b* is executed.

An object is acceptable if:

It contains subject item attributes

The contained subject item attributes identify a set of entities that can be unambiguously connected.

The set of entities references at least one physical data source.

For the purpose of the transformation 116*b*, a subject entity is always deemed acceptable The following is an example of the operation of the transformation 116*b*.

1. For each package specified in new target package list:
   a) Create a new package
   b) Create transformation relationship between two packages.
   c) Add source package and relationship ID to internal update list.
2. For each package specified in external update list:
   a) For each transformation relationship associated with the package:
      i) Add the source package and relationship ID to internal update list.
3. If internal update list is empty:
   a) Populate the internal update list by looking for packages and relevant transformation relationships in the model.
4. Sort the internal update list such that independent packages are processed before dependent packages.
5. For each package/relationship ID pair in internal update list:
   a) Process Container (for package)
   b) For each source subject in the package:
      i) Process Container.
   c) For each source subject entity in the package:
      i) Process Container.
   d) For each path in the package
      i) If not processed:
         a) Determine target subject entities in target package
         b) Create new path
         c) Mark source path as transformed d) Create transform relationship between source and target paths
e) If path is related to any join relationships via transformation relationships:
  (1) Relate target path to the same join, preserving status flags.
e) Update Path Information in Target Package
  i) This logic is similar to the basic entity model construction with regards to how joins are propagated to the business model.
    a) Determine the joins that may need transformation by examining the entities related to the transformed subject entities.
    b) For each join that hasn't been processed in the context of the package:
      (1) Determine the pairs of subject entities that should have a path between them based on the join.
      (2) For each pair:
        (a) Build a path
        (b) Build a transformation relationship between the join and the path.
      (3) Mark the join as transformed.
f) Mark source-package as transformed.

Process Container
1. Determine acceptability of source object.
2. If source object acceptable:
  a) If source object has already been transformed:
    i) For each target subject entity:
      a) Determine match on entity for subject entity.
      b) If match:
        (1) Process Contained Items
      c) Else
        (1) Log status. Significant change to source object has occurred that prevents automatic update. Other choice is to create a new subject entity and destroy the existing target, but this causes some issues in terms of preserving the semantics. Maybe this isn't what the user wants.
  b) Else
    i) Build target subject entity
    ii) Mark source object as transformed.
    iii) Process Contained Items.

Process Contained Items
1. For each subject item attribute in source subject:
  a) If source item not transformed:
    i) Build a new subject item attribute containing all required join path information.
    ii) Mark source object as transformed.
  b) Else
    i) Update properties, if target exists.
2. For each subject item filter in source subject:
  a) If source item is not transformed:
    i) Build a new subject item filter.
    ii) Mark source object as transformed.
  b) Else
    i) Update properties, if target exists.
3. For each subject item prompt in source subject:
  a) If source item is not transformed:
    i) Build a new subject item prompt.
    ii) Mark source object as transformed.
  b) Else
    i) Update properties, if target exists.

The following table shows the status flag usage.

| Object Class | Prohibit | Processed |
| --- | --- | --- |
| Package | Do not process the instance. | Assists in determining whether a subject entity should be created for a subject or subject entity in the source package. |
| Subject, SubjectEntity | Do not process the instance. | Assists in determining whether a subject entity should be created for the object in the package. Note that the processed flag is never set on a relationship for an object of this type to allow new items to be processed. |
| SubjectItemAttribute, SubjectItemFilter, SubjectItemPrompt | Do not process the instance. | Assists in determining whether a corresponding subject item should be created for the object in the subject entity. |
| RelationshipPath | Do not process the instance. | Assists in determining whether a corresponding path should be created for the path in the target package. |
| RelationshipJoin-Business | Do not process the instance. | Assists in determining whether a path should be created for the join in the target package. |

General Transformations 117

The general transformations 117 include a name mutation transformation 117a.

Name Mutation Transformation 117a

The name mutation transformation 117a acts on the business and package layers. It constructs user friendly names for objects. Subject objects include cubes, measure dimensions, category dimensions, entities, keys attributes, levels, measures and business joins.

The transformation 117a uses a dictionary for text substitution provided by the user. The transformation 117a is applicable when a name has a fragment that matches an entry in the dictionary. The match criteria can include the location of the fragment within the name. Also, the object has not been transformed.

The name mutation transformation 117a replaces the fragment of the name with associated entry from dictionary.

The name mutation transformation 117a is very open ended in nature and can be improved over time by adding additional entries to the dictionary. The effectiveness of the name mutation transformation 117a is only as good as the supplied dictionary. Users may also benefit if they could provide their own dictionaries. It is possible to construct a dictionary rich enough to translate over 75% of the names found in a physical database. With a custom dictionary, the success rate is much higher.

For example, an object has a name "CUSTNO", and a dictionary entry specifies that "NO" at the end of a name could be replaced with "Number", and "CUST" at the beginning of a name could be replaced with "Customer". In this case, the name mutation transformation 117a first transforms the fragment "NO" of the name "CUSTNO" into "Number", and the resulting text becomes "CUST Number". The name mutation transformation 117a further performs a second transformation to replace the fragment "CUST" with "Customer". Thus, the result of these transformations becomes "Customer Number". An additional operation could change the case of letters in the name. For example, "Customer Number" "Customer number" could be the result of this transformation.

The status flag usage is as follows:

| Object Class | Prohibit | Processed |
|---|---|---|
| Cubes | Do not process the instance. | Do not process the instance. |
| Measure Dimensions | | |
| Category Dimensions | | |
| Entities | | |
| Keys | | |
| Attributes | | |
| Levels | | |
| Measures | | |
| Business Joins | | |

Transformation Execution Order

The above described transformations 112–117 may be executed in many different orders. The following shows preferred orders for the execution of the transformations 112–117. While strict ordering is not necessary, better results may be possible if, for example, the data access layer 102 is complete before starting the business model transformations 114.

Operation I of the table extract constructing transformation 112c requires keys. Accordingly, depending on the data access layer contents, it may be preferable to run the data access key constructing transformation 112b before executing operation I of the table extract constructing transformation 112c. Also, operation 11 of the table extract constructing transformation 112c preferably runs with a completed business layer 104.

The data access cube constructing transformation 112d preferably runs after the logical cube constructing transformation 115c.

The basic business model constructing transformation 114a is preferably executed after operation I of the table extract constructing transformation 112c to avoid generation of entities which represent aggregate tables. Since these tables store aggregated data, they do not deserve representation in the business layer 104 of the metadata model 15.

The many to many join relationship fixing transformation 114b preferably runs after the basic business model constructing transformation 114a. The redundant join relationship eliminating transformation 114d preferably runs after the many to many join relationship fixing transformation 114b.

The entity coalescing transformation 114c and the subclass relationship introducing transformation 114e preferably run after the redundant join relationship eliminating transformation 114d because there will be less business joins to examine and manipulate.

The date usage identifying transformation 114h preferably runs before the subclass relationship introducing transformation 114e because the date usage identifying transformation 114h may generate multiple joins between entities as a result of multiple date attributes in an entity.

The measure identifying and measure dimensions constructing transformation 115a and the category dimension and level constructing transformation 115b are preferably executed after completion of all business layer manipulations.

The logical cube constructing transformation 115c is preferably executed after the measure identifying and measure dimensions constructing transformation 115a since the measure identifying and measure dimensions constructing transformation 115a will construct logical cubes based on measure dimensions constructed by that transformation. The logical cube constructing transformation 115c is also preferably executed after the category dimension and level constructing transformation 115b since the logical cube constructing transformation 115c will require the dimensions constructed by the category dimension and level constructing transformation 115b to construct meaningful logical cubes.

The basic package model constructing transformation 116a preferably runs after completion of the business layer 104 and the multidimensional Layers.

The data access join constructing transformation 112a, data access key constructing transformation 112b and the name mutation transformation 117a may be executed any time.

The following shows an example of preferred order of transformations:

data access join constructing transformation 112a;

data access key constructing transformation 112b;

the first part of the table extract constructing transformation 112c;

basic business model constructing transformation 114a;

many to many join relationship fixing transformation 114b redundant join relationship eliminating transformation 114d entity coalescing transformation 114c entity referencing transformation 114f attribute usage determining transformation 114g the second part of the table extract constructing transformation 112c measure identifying and measure dimension constructing transformation 115a date usage identifying transformation 114h category dimension and level constructing transformation 115b logic cube constructing transformation 115c basic package model constructing transformation 116a package constructing transformation for CQ 116b name mutation transformation 117a When one object leads to the creation of another, a new relationship is created between the two objects. These objects are provides with source and target object identifiers. These identifiers and the status flags are used to control the execution of a transformation over the relationship. FIG. 7 shows a chart describes, in general terms, the execution flow over a relationship. Each specific transformation is described above.

In FIG. 7, the first column indicates if a prohibit flag is set or not; and the second column indicates if an object is processed or not. An object may be a parent or child. When the current object is a parent, the third and fourth columns are used. The third column indicates if the relationship is processed or not for the parent, and the fourth column indicates the action to be taken for the parent. When the current object is a child, the fifth and sixth columns are used. The fifth column indicates if the relationship is processed or not for the child, and the sixth column indicates the action to be taken for the child.

Some examples of the use of FIG. 7 are described below using a case where an entity is built based on a table. The table is a parent and has a column and a key as children Currently, nothing has been processed or prohibited, and no relationship has been created. In this case, the execution flow follows the second row where the "parent action"

column indicates to create new target object and relationship, and to mark object and relationship as processed after processing children. Accordingly, an entity and relationship between the table and the entity are created.

Next, the execution flow follows the fourth row for the column where the "child action" column indicates to create new target object and relationship, and to mark object and relationship as processed. Accordingly, an attribute and relationship between the column and the attribute are created, and marked as processed. Similarly, a key in the entity and relationship between the key in the table and key in the entity are created and marked as processed.

As all children has been processed, the table and the relationship between the table and the entity are marked as processed according to the second row of FIG. 7. Thus, the transformation from the table to the entity is completed.

If a second column is added to the table, the object has not been processed, and the table has been processed. No relationship exists for the second column. Accordingly, the execution flow follows the eight row where the "child action" indicates to create new target object and relationship, and to mark object and relationship as processed. Thus, a second attribute and relationship between the second column and the second attribute are created and marked as processed.

If the second attribute is now deleted from the entity, the second column has been processed and the table has been processed. The relationship will be deleted when either partner is deleted. In this case, the column is marked as processed. Accordingly, the execution flow follows the last row where the "child action" indicates to do nothing. Thus, recreation of the deleted second attribute is avoided.

A prohibit flag may be set by a user. For example, when a data access object is important in the data access layer 102, but the user does not want it represented in the business layer 104. In this case, the prohibit flag is used to prevent a partner business model object from being built for the data access object in the model.

Common Object Services 5

Referring back to FIG. 2, COS 5 will now be described in further detail. COS 5 is not part of the metadata model 15. Rather, it provides a secure layer around the metadata model 15. Actions on objects in the metadata model 15 cannot be performed without the involvement of COS 5. COS 5 communicates with the underlying repository where the metadata model 15 is stored.

The metadata model 15 can be accessed by many users at the same time. Anything that a user would manipulate, such as an entity or an attribute, is represented as an object in the metadata model 15. Each user may change objects or their properties, thereby changing the metadata model 15. Most of the objects in the metadata model 15 are part of different kinds of relationships, and changes may cause inconsistency in the metadata model 15 if the changes are made without a mechanizm for providing consistency.

COS 5 provides the means of preserving the semantic integrity of the metadata model 15. COS 5, provides access to the objects within the repository where the metadata model 15 is stored; performs validation checks, insuring precision object storage; provides user security checks; oversees the changes to the objects; and participates in the creating of new object and deleting of existing ones.

COS 5 provides each new object with a base ID. The base ID guarantees that the object can be found in the metadata model 15. The base ID is unique and stable for each object, i.e., it never changes.

COS 5 also facilitates communication between the query engine 30 and the metadata model 15.

The most important objects in COS 5 are, the gateway; the gateway broker; the gateway factory; and the transaction.

The gateway object is responsible for providing secure access to the objects in the metadata model 15. The gateway may be viewed as an intersection of the user and the repository. Multiple users can work with the same repository at the same time. Each such user will have one separate gateway to this particular repository. A single user can work at the same time with multiple repositories and have a separate gateway object for each repository.

The gateway factory is a globally available single object responsible for creating and registering new repositories.

The gateway broker is a globally available single object responsible for opening existing repositories, enumerating the registered repositories, associating repository names with path/locations.

The transaction isolates the changes that the user makes to the objects of the metadata model 15. Thus, two or more users cannot make changes to the same repository objects simultaneously.

There are three types of transactions, namely, Physical, Undo and Checkout.

A checkout transaction is used to isolate changes made by one user from other users until those changes are complete. Checkout transactions can include one object or many, depending on the task. Checkout transactions can last days, and spans multiple invocations of the user interface. Any change to an object's state checks out the object automatically. New objects are checked out to the user that created them.

If a user determines that a set of changes are valid, they may be checked in. A user may also discard any changes by un-checking his changes.

Objects will be checked out automatically when the user attempts to change their state. When an object is checked out to a user, all other users will only be able to view this object in the way it was at the moment of being checked out. Any attempt by other users to change, delete or check out an object already in the locked state due to another user action will fail.

The object itself is aware of the fact that it is being changed, and who is making the changes. Until the user makes a decision to make the changes permanent and applies a check in method to the object in order to save these changes, the object is carrying around two data blocks. The first data block contains information in the original object status at the check out moment, and the second data block contains the changed object status. Once the object is checked in back to the repository, these changes contained in the second data block become permanent. The object in its brand new state becomes visible and available for further possible actions to all other users.

A checkout transaction has two possible outcomes. If the user determines that the changes are correct, they can be made permanent. In this case, the data block that kept information about the original object's state is discarded. If the user determines that the changes are incorrect, or unwanted, they can be discarded, in which case the data block that kept information about the changes is discarded.

An object that has not been checked out is considered to be in the normal state, in which case it has the same content for all users.

New objects are created such that they are considered checked-out by the user that created them, thereby making them visible to that user only.

An object will be checked-out for a user when it is deleted, if necessary. An object that is checked-out by a user and deleted will not be visible to that user, but will remain visible to others until the checkout user checks-in the deleted object. When the checking occurs, the object is permanently removed from the repository.

The undo transactions allow users to undo changes to the repository during a single invocation of the user interface. This type of transaction is applicable to each logical unit of work. Undo transactions are nested inside checkout transactions.

Physical transactions are supplied by the repository. Because of the volume of objects that may be manipulated in a single Undo transaction, the Undo transaction is typically subdivided into a series of physical transactions.

There are two types of physical transactions, namely, read-only and read-write. A read-only transaction provides read-only access to objects in the repository. A read-write transaction provides the user with the ability to change objects.

All the changes are performed as a series of atomic consistent isolated durable (ACID) database transactions.

Changes to an object may affect other objects based on the relationships that object has with other objects in the model. The user can check the integrity of the metadata model at any time by calling explicitly the metadata check method.

Thus, COS 5 maintains object persistence in the repository. COS 5 also performs house keeping and maintenance of objects as operations are performed, such as copy, paste, move, delete. COS 5 insures that these operations are executed in a consistent manner.

COS 5 includes a modelling language, which is used to describe the objects stored in the repository. The modelling language reduces the amount of coding that required to be done. In the preferred embodiment, the modelling language produces C++ code is used. COS 5 also provides transaction management and repository services.

COS 5 defines proxy objects, which act as stand-ins for other repository objects in a specific context. Any modifications made to the original object are exposed through the proxy. The modelling language supports automatic generation of C++ classes that implement object proxies, saving the error-prone, tedious work manually writing this code.

Query Engine 30

The query engine 30 allows the formulation of queries based on the model objects defined in the business layer 104 that are stored in the metadata model repository and for the retrieval of the physical data stored in the underlying data sources 100. The query engine 30 includes some objects to facilitate the formulation of queries. The objects include query specifications and data matrixes.

Figure 44:
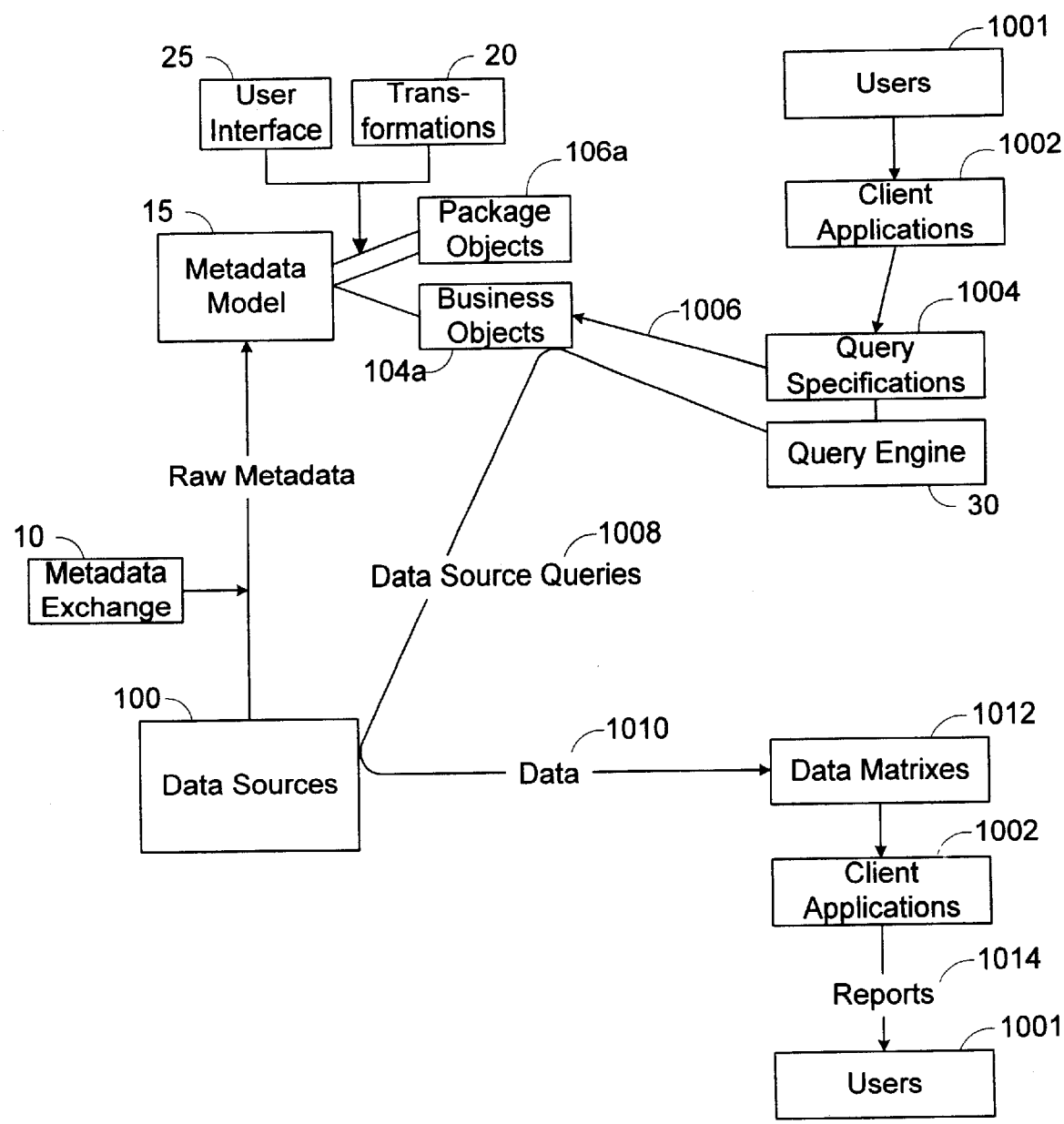
FIG. 44 is a diagram showing an example of functions of a query engine.

FIG. 44 illustrates the function of the query engine 30. When users 1001 want to obtain reports about data stored in one or more data sources 100, users 1001 use client applications 1002, such as Impromptu, Power Play Transformer, Cognos Query and third party tools, to query the data sources 100. The metadata model 15 provides the business layer 104 and the package layer 106 as described above. The client applications 1002 use the information in the package layer 106 to allow users 1001 to construct reports 1012. That is, the client applications 1002 use the package layer 106 to present users with a portion of the objects 106a in the package layer 106, and let users pick objects 106a to add to reports. Each package is made up of objects that make references to objects in the business layer 104 of the metadata model. A single metadata model may contain multiple packages each with their own unique references to the business layer 104.

The client applications 1002 formulate query specifications 1004 in terms of the objects in the business layer 104.

The client applications 1002 use query specifications 1004 that contain references 1006 to the business objects 104a in the business layer 104 of the metadata model 15. The query specifications 1004 may be simple or multidimensional.

The query engine 30 accepts the query specifications 1004 as input for its operation to generate a data matrix 1012 for the client applications 1002. The query engine 30 uses the business layer 104 to translate and apply rules to the query specifications 1004 and formulates data source queries 1008 applicable to the appropriate underlying data sources 100. The data source queries 1008 is in a form that can be applied to the data sources 100 to obtain data 1010 required for the reports from the data sources 100. The client applications 1002 are given access to the generated data source queries 1008 through data matrixes 1012 to receive the data 1010. Thus, the client applications 1002 can render the reports 1014 to users 1001 using the data 1010 obtained from the data sources 100 and provided in the data matrixes 1012. The formulation of data source queries 1008 is further described below.

Figure 45:
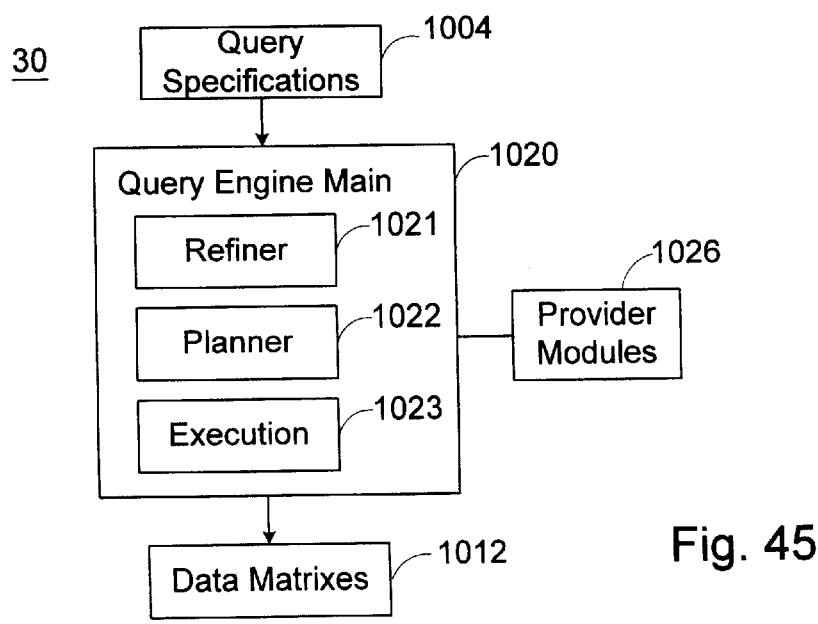
FIG. 45 is a diagram showing an example of components of the query engine.

FIG. 45 shows an example of functional components of the query engine 30. The query engine 30 comprises query specifications 1004, query engine main components 1020, data matrixes 1012 and one or more provider modules 1026.

The query specifications 1004 function as an input interface for the query engine main components 1020. Each query specification 1004 defines data and organization of the data to be returned as a report to its corresponding client application 1002 (FIG. 44). The data matrix 1012 functions as an output interface for the query engine main components 1020. It is viewed as a storage of the retrieved data and methods for the retrieved data. Multiple implementations of the data matrix may exist, all providing the same interface. Some implementations may store the actual data values that are obtained, other implementations may provide a virtual storage mechanism and only obtain those values that are currently requested. A third form may be implemented that is a hybrid of the previous two.

The provider modules 1026 have knowledge about accessing one or more data sources 100. In the query engine 30, there may be multiple instances of these modules 1026, each providing access to one or more underlying data sources 100.

The query engine main components 1020 include a refiner 1021, planner 1022 and execution 1023. The refiner 1021 applies to the query specifications 1004 defaults for missing or unspecified information, and performs join path resolution based on the information in the metadata model 15. The planner 1022 allows for a bidding process by various provider modules (1026). The planner 1022 thus determines the best method of obtaining the desired data. Each of the provider modules (1026) involved in the bidding process generates the appropriate data source queries 1008 upon request of the planner 1022. The planner 1022 makes this request to a particular provider module (1026) once it has selected that particular provider module (1026) as being the best provider module (1026) for a query within the context of the bids received by all the provider modules (1026). The execution 1023 executes the data source queries 1008 and obtains and stores the retrieved data in data matrixes 1012.

Each component of the query engine 30 is further described below.

Query Specifications 1004

A query specification is a compound object modelled in the reporting system 4. It allows queries to be defined in reporting system 4 and to be referenced in other queries. Defined queries may be similar, but not equal to the Impromptu dataset.

The query specifications 1004 are constructed from a group of classes. The query specification 1004 allows for zero to n-dimensional queries to be defined. Various component classes of a query specification 1004 are created using constructor blocks, which is a concept of COS 5 of the reporting system 4 (FIG. 2). The component classes may be stored in the repository, but may also be stored in transient, non-persistent memory. This latter storage mechanism is useful for applications that have read-only access to the metadata repository or that have a capability to generate the appropriate query specification 1004 from its own application specific data structures.

The query specifications 1004 may be a C++ callable query specification interface or an automation query specification interface. Different interface classes may provide access to the query engine 30 at different levels of detail. A simple request interface provides a very coarse interface, which specifies a query and executes it. An advanced request interface allows the client application 1002 greater control over the execution of the main components 1020 of the query engine 30, such as the refine 1021, planner 1022 and execute 1023, and data matrix building steps. The advanced query specification interface also allows client applications 1002 to ask for the generated data source queries 1008.

Figures 46, 47:
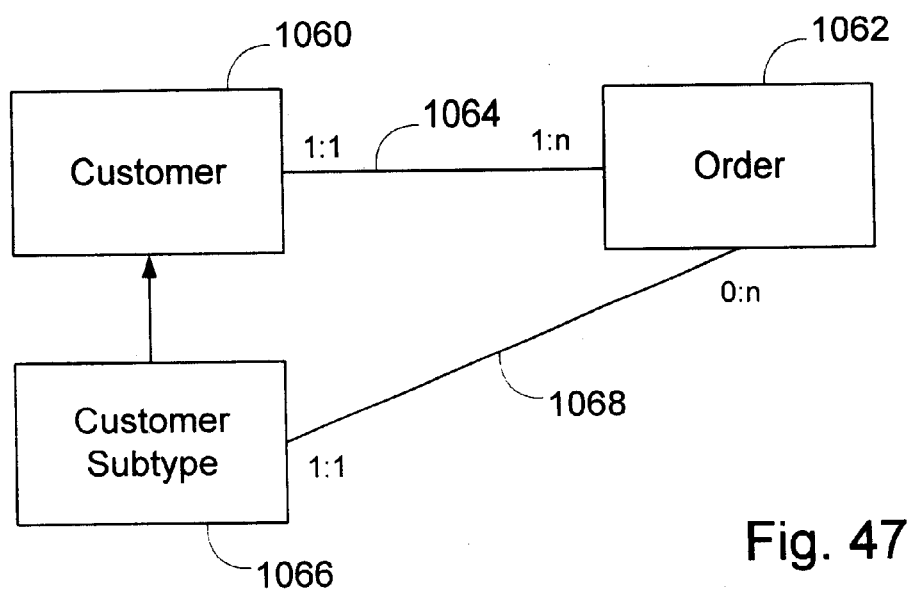
FIG. 46 is a diagram showing an example of a query specification structure.
FIG. 47 is a diagram showing an example of a relationship between entities.

FIG. 46 shows an example of various component classes of the query specifications 1004. There are two aspects or parts to a query specification 1004, namely a data-layout 1004a and a data access 1004b.

The data access 1004b of the query specification 1004 complements the business layer 104 and gives additional specifications on how data 1010 is to be related for the report 1014. It is a reflection of information that is gathered by the client application 1002 from the user based on information in the package layer 106 of the metadata model 15. The data access 1004b is encapsulated by query units 1041 and join information 1043 and 1044.

The data-layout 1004a of the query specification is closely related to the way data 1010 is presented to the user. It depends on how the user interacts with the client application 1002 that displays the data 1010. The data layout 1004a is encapsulated in the concepts of edges 1031, levels 1032 and data areas 1033.

These two aspects are described further below.

Query Specification Data Layout 1004a

The query specification data layout 1004a consists of nine major classes: edge 1031, level 1032, data area or dimension data area 1033, query item 1034, key 1035, sort item 1036, data area or measure data area 1037, query item 1038 and sort item 1039.

Referring to FIGS. 49 and 51, these classes 1031–1039 define which data 1010 is to be retrieved from the data sources 100 and how the data 1010 is to be organized to facilitate rendering by the client applications 1002. Hereafter, the terms "edge" and "dimension" are considered equivalent.

A specification 1004 may contain zero or more edges 1031 and zero or more measure data area 1037. In order for data to be retrieved, at least one of the previous objects will need to be defined.

An edge 1031 contains one or more levels 1032. A level 1032 contains one data area 1033, which is often referred to as a dimension data area. A data area 1033 contains one ore more query items 1034, optionally one or more keys 1035 and optionally one or more sort items 1036. The addition of an edge 1031 to a query specification 1004 automatically creates a default level for this edge, this level is often referred to as the 'overall' level 1032 for that edge 1031.

This level must neither have keys 1035 nor sort items 1036 defined for it. It is used to allow the specification of query items 1034, which contain expressions that yield a single value for that edge. The client applications 1002 may define other levels 1032. The addition of a level to an edge causes the creation of a data area 1033 for that level 1032. The data area 1033 associated with a level 1032 is often referred to as a dimension data area.

A data area 1037 associated with a query specification 1004 is often referred to as a measure data area. A measure data area 1037 may contain one or more query items 1038 and sort items 1039. The measure data area 1037 must not contain any keys 1035. The measure data area 1037 of a query specification 1004 can explicitly be associated with at most one level from each edge 1031 defined in the query specification 1004. The refiner 1021 will supplement the identification of the levels for a measure data area 1037 by implicitly using the 'overall' level for each edge 1031 for which no level 1032 has been identified. By means of the explicit associated levels 1032 of a measure data area 1037 there exists an implicit association of a measure data area 1037 with a set of keys. This set is comprised of all the keys 1035 of all the dimension data areas 1033 from the highest level 1032 of an edge 1031 to the explicitly specified level 1032 of an edge 1031, which is collected for all the edges 1031 that are associated with the measure data area 1037 by means of the levels 1032 that are defined for the measure data area 1037. It is to be noted that the dimension data areas 1033 of the implicitly associated levels 1032, i.e. the overall level 1032 of the edges 1031 for which no level 1032 is specified for the measure data area 1037, do not contribute any keys 1035 to this set, since the overall level 1032 must not have any keys 1035 defined in its associated dimension data area 1033. This implicit association of a measure data area 1037 with a set of keys is often simply referred to as the set of keys for the measure data area 1037. It is understood that a measure data area 1037 will have neither explicit nor implicit association with levels 1032 if the query specification 1004 does not contain any edges 1031.

The explicit keys 1035 of a dimension data area 1033 define an implicit set of keys 1035, which is comprised of all the keys that occur at the current level and all previously specified levels 1032 of the edge 1031 to which the level 1032 belongs. The previously specified levels 1032 are also known as higher levels. Thus a dimension data area 1033 will yield only a single row of data for each unique key value within the context of the key values of the higher levels 1032 within the same edge 1031. Thus the key values at the various levels when considered as a whole form a tree. The following is an example of a valid set of keys for an edge 1031 that has two levels 1032 called level-one and level-two. Note that there are two entries in Level-two with the value 'Door', however this is permitted by the stated rules, since each belongs to a higher level with a different value.

| Level-one | Level-two |
|---|---|
| Home | Door |
|  | Window |
|  | Stairs |
| Car | Wheel |
|  | Motor |
|  | Door |

The definition of each data area 1033, 1037 has a usage property. The usage property indicates when the client application 1002 intends to use the data 1010 that is returned from the data sources 100 for the data area 1033, 1037. In addition to the timing it also defines the number of rows that are expected to be returned to the application for each unique combination of key-values of the implicit or explicit specified levels 1032. The usage property can have one of three possible values, i.e. a value indicating a header (e.g., kInHeader), a value indicating a footer (e.g., kInFooter), and a value indicating a detail (e.g., kInDetail).

When a data area 1033 or 1037 has a usage property of KInHeader, the results of the data area 1033, 1037 are to be available before the first row of data 1010 at a lower level is available. Only a single row of result data per unique combination of key-values at the current level 1032 will be made available to the client application 1002. When a data area 1033 or 1037 has a usage property of kInFooter, the results of the data area 1033, 1037 are to be available after the last row of data 1010 at a lower level is available. Only a single row of result data per unique combination of key-values at the current level 1032 will be made available to the client application 1002. When a measure data area 1037 has a usage property of KInDetail, a single or multiple rows of result data 1010 are expected per combination of unique key-values associated with the measure data area 1037. It may further allow for the additional value of kUnknown to be specified. If this value is encountered then the refiner 1021 will calculate the value on behalf of the application. For a dimension data area 1033 the value will be implicitly set to kInHeader. For a measure data area 1037 the value will be set to KInFooter if it can be determined that all the query items 1034 will yield a single row of result data per unique combination of key-values associated with the measure data area 1037; otherwise the value KInDetail will be assigned to the measure data area 1037.

Thus the usage property also has impact on the amount of data 1010 returned for the data area 1033 or 1037. The usage property of a dimension data area 1033 can only be set to kInHeader or kInFooter. The usage property of a measure data area 1037 can be set to any of the defined values. Accordingly, defining a measure data area 1037 and specifying only one level is similar to using the dimension data area 1033 that is defined for the level 1032 provided that the usage property of the measure data area 1033 is set to kInHeader.

The query engine 30 uses the information about the usage property of the data areas 1033, 1037 to interpret the number of rows that the client application 1002 expects. In addition, the information allows the query engine 30 to optimize the calculation of functions that return a single value that is calculated based on the value of multiple rows of data in the underlying data source 100. These types of functions are referred to as extended aggregate expressions or running aggregate expressions. Extended aggregate expressions compute a single value over a set of rows. The value for an extended aggregate expression is pre-computed by the query engine 30 and is made available for all the rows on which the value is based. It requires the query engine 30 to pre-scan a number of rows before making the first row available to the application. A running aggregate expression computes a value that is based on a previously processed set of rows. In contrast to extended aggregates, the query engine 30 does not need to pre-scan a set of rows, but can base it on the rows that have already been processed. Both extended and running aggregates can be given a scope, which determines the set of rows on which the value is based. Given the following set of records defined by columns c1 and c2, there is an extended sum and running sum calculated that reset at a change in the value of c1.

| C1 | C2 | Extended-sum(c2 for c1) | Running-sum(c2 for c1) |
|----|----|-------------------------|------------------------|
| 10 | 1  | 10                      | 1                      |
| 10 | 2  | 10                      | 3                      |
| 10 | 7  | 10                      | 10                     |
| 20 | 1  | 5                       | 1                      |
| 20 | 4  | 5                       | 5                      |

It can be noted that the value of the extended and running aggregate calculations yield the same result at the last row within a set defined by the scope of c1. This particular characteristic can be used by the query engine 30 when the results need to be available at the last row of a set of rows, i.e. when kInFooter is specified. Thus the running aggregate expressions can be used instead of extended aggregate expressions only for data areas 1033, 1037 where the usage property is set to kInFooter. The usage property for dimension data areas 1033 may be defaulted to kInHeader.

The dimension data areas 1033 associated with client application defined levels 1032 must contain at least one query item 1034. The query item 1034 contains an expression made up of query unit items, attributes and query items. It may be defaulted such that the level will be ignored and any measure data areas 1037 that reference such a level 1032 will be in error and it is likely that an exception will be thrown.

An expression containing references to objects may be restricted in that all the referenced objects are instances of the same or compatible types. In other words expressions are based on either all attributes/attribute proxies or columns. Expressions that contain both attributes and columns will cause an exception to be thrown.

The dimension data areas 1033 associated with client application defined levels 1032 identify one or more of its query items 1034 as a keys 1035. It may be defaulted such that the key will be the first query item of the dimension data area 1033. All dimension data areas 1033 associated with the automatically created 'overall' levels do not contain any key definition. The query engine 30 will ignore any key definition in these objects.

The query items 1034 associated with a dimension data area 1033 are usually called properties. It is suggested that join relationships between an entity of the key query item 1034 and entities of the other query items 1034 for a given dimension data area 1033 has a cardinality of {0,1}:{1,n} to {0,1}:1. This allows for left-side cardinalities to be 0:1, 0:n, 1:1, 1:n and a right-side cardinalities to be 0:1 or 1:1. If the cardinality does not match one of these values, then the generated data source query 1008 reduces the cardinality by using a cardinality reducing function, such as the FIRST or the MINIMUM set functions, which are Cognos SQL extensions. A left-outer-join may be used in the cases that the right-side cardinality has a minimum value of 0. A left-outer-join is a join which preserves the unmatched rows of the columns on the left of the join. Similarly, a right-outer-join preserves unmatched rows of the table on the right of the join.

The data areas 1033, 1037 that return more than one set of values contain sort items 1036 indicating a sort order. The dimension data areas 1033 associated with the automatically created 'overall' levels are usually single-valued and thus do not require a sort 1036. The sort items 1036 may be defaulted such that the query item 1034 identified as the key 1035 will be the sort item and the sort direction will be ascending.

If the collection of sort items specified for a dimension data area 1033 does not contain a reference to all the query items 1034 identified as the keys 1035, then the omitted query items 1034 that are referenced by the keys 1035 will be added to the end of the sort items 1036. These added items will have a sort direction of ascending.

The client application 1002 can request the generated data source queries 1008 for one of the following components: query specification 1004, edge 1031, level 1032, dimension data area 1033 and measure data area 1037. The client application 1002 uses the advanced request interface provided by the query engine 30 to obtain these generated data source queries 1008 for the various components. For data source 100 that are accessible using Cognos SQL, these generated data source queries 1008 will be in Cognos SQL. For those data sources 100, where this is not possible, a statement in the appropriate substitute language constructs will be provided. Requesting the SQL for a dimension data area 1033 is the same as requesting it for the level 1032.

Thus the generated data source queries 1008 may be in SQL. The reporting system 4 may enforce compliance with a standard for table name qualification, e.g., the SQL-92 standard's 4-level table name qualification. According to the SQL-92 standard's 4-level table name qualification a table is contained in a schema, a schema is contained in a catalogue, and a catalogue is contained in a database. The mapping of these 4 levels for a specific database may be performed by the Universal Data Access (UDA/DATABASE MANAGEMENT SYSTEM) component. For relational database management systems (RDBMSs) that do not support the catalogue and/or schema qualification the table references will be generated such that these levels are omitted. UDA/DATABASE MANAGEMENT SYSTEM will provide a feature such that this can be done dynamically.

Query Specification Data Access 1004b

As shown in FIG. 46, the query specification data access 1004b consists of five major classes: query unit 1041, query unit item 1042, model joins 1043, dynamic joins 1044 and filters 1045.

A specification 1004 contains one or more query units 1041. Each query unit 1041 contains one or more query unit item 1042 and may in turn also contain other query units 1041. Each query specification 1004 may have a default query unit 1041, which is used to contain all the query items 1034 that do not explicitly reference a query unit 1041. The object of a query unit item 1042 references a single attribute or a single filter from the business layer 104 of the metadata model 15. Objects of the query unit item 1042 do not contain an expression, but exist of merely a reference to another object. Query unit items 1042 are referenced in the expression in the query item 1034. All attributes that are used in expressions in the query item 1034 that do not relate to a query unit item 1042 may be assumed to belong to a query unit item 1042 that belongs to the default query unit 1041. If the same entity is used in multiple query units 1041, these query units 1041 are considered separate instances. This rule is carried forward to the data source queries 1008, which will contain multiple references to the same data sources 100 that are used by the query. The prudent use of this rule will allow client applications 1002 to create dynamic aliases or subtypes for entities.

Join resolution will first take place within a query unit 1041 and subsequently between query units 1041. Joins that are defined in the business layer 104 can be added to a query specification 1004 as model joins 1043 to give these joins a preference to be included in the join path when the join path for a query is calculated. This is not a guarantee that the join will be included.

When query units contain other query units 1041 then this resolution will take place from the deepest nested query units 1041 toward the least nested query units 1041.

Joins between entities can be explicitly specified. This is a completely dynamic join 1044 for which no information needs to be stored in the business layer 104. The expression of the dynamic join 104 may contain references to query unit items 1042.

Multiple filters 1045 may be specified in a query specification 1004. The filters 1045 are interpreted as narrowing the selections, i.e., the filters 1045 are added by AND operators.

A boolean expression containing aggregate operators may be specified as a 'summary' filter. A filter 1045 may be defaulted to be marked as a 'summary' filter if the expression contains an aggregate operator. A boolean expression that does not contain aggregate operators may be specified as either a 'detail' filter or as a 'summary' filter. A filter may be defaulted to be marked as a 'detail' filter if the expression is void of aggregate operators otherwise it will be marked as a 'summary' filter.

The query engine 30 may use the concept of pre-filter and post-filter calculations, such as that used in the Impromptu, for nested aggregate computations in the presence of summary filters. It may be defaulted such that post-filter results are calculated for aggregate computations, meaning that the aggregate operators applied to aggregates are calculated after the summary filters have been applied. The summary filters may contain any boolean expression.

Data Matrix 1012

Classes of the data matrix 1012 define an organization of the retrieved data 1010. The data matrix 1012 is well suited for client applications 1002 that require a multi-dimensional view of the data 1010. Various iterators are defined to access the individual components in the data matrix 1012.

Client applications 1002 are not restricted to the method of obtaining data 1010 using the data matrix 1012. The client applications may opt to obtain the generated data source queries 1008 and pass the data source queries 1008 directly on to data sources 100. The generated data source queries 1008 may contain four-part table references. In that case, the client application 1002 is required to have a multi-database connection with the reporting system 4. The multi-database connection can be obtained using either SQL calls sqlAttach or sqlMultiDbAttachDirect.

When using the data matrix 1012 to obtain data 1010, each data area 1033, 1037 requires a separate iterator.

Query Engine Main Components 1020

Refiner 1021

The refiner 1021 of the query engine 30 refines or completes a query to formulate data source queries 1008. The client application 1002 can execute the refiner 1021 for a given query specification 1004. The refiner 1021 applies various defaults and rules to the query specification 1004 to make it semantically precise. These default and rules have been explained in great detail in the previous sections that deal with the various components of the query specification 1004.

In formulating data source queries 1008 from query specifications 1004, the refiner 1021 of the query engine 30 uses joins, collapsed entities, foreign attributes, reusable calculations in the business layer 104. It may also uses subject items and query paths in the package layer 106.

Joins

The refiner 1021 of the query engine 30 may use cardinalities of joins to formulate data source queries 1008. The joins reflect business views of relationship between information.

The refiner 1021 adheres to the non-existence of data either on the left or on the right side of a join using the explicit specification of cardinalities in the business layer 104. By doing so, the refiner 1021 overrides what is in the data access layer 102. This allows the query engine 30 to generate data source queries 1008, which make reports more likely to what the user expects.

The refiner 1021 uses primarily a business view of the cardinalities in the business layer 104. FIG. 47 shows an example of cardinality between entity "Customer" 1060 and entity "Order" 1062. The cardinality is defined on the join 1064 on the "Customer" side as one-to-one cardinality, and on the "Order" side as one-to-many. During the construction of the business layer 104, the user may create a new subtype entity 1066 on the "Customer" entity 1060 and create a new relationship 1068 to the "Order" entity 1062 that has an optional cardinality in it on the "Order" side 1062, i.e., zero-to-many. When reporting on the "Customer" information, the refiner 1021 may use the "Customer" entity, i.e., supertype entity 1060 or the subtype entity 1066. When the refiner 1021 uses the "Customer" entity 1060, it can provide a report about only those customers who have orders. When the refiner 1021 uses the new subtype entity 1066, it calls in all the "Customers" including those who do not have orders. Thus, by using the subtype entity 1066, a different view of the relationship may be obtained. The user may select the supertype entity 1060 or the subtype entity 1066 through the client application 1002 or the user interface 25 of the reporting system 4.

Referring back to FIG. 44, the refiner 1021 may also use cardinalities of joins to simplify the expressions of query specifications 1004. If the relationship is a one-to-one relationship, rather than a many-to-many or a many-to-one relationship, the refiner 1021 specifies the relationship in simpler terms by using the cardinality information.

In order to formulate data source queries 1008, the refiner 1021 navigates the business layer 104 and the data access layer 102, and calculates the join path to pick up from entities information needed by applications 1002 to for example create reports 1014. Applications 1002 are not restricted to be reporting only applications, but may also use the data to make further calculations and store the calculated output in other data sources 100. The client application 1002 may provide the functionality to select a join path for those cases where the refiner 1021 determines that there are multiple join paths possible between the entities that are involved in the query. This selection may be defaulted such that the refiner 1021 determines the join path using a shortest path algorithm, which allows weights to be assigned to each join. The lightest path will be chosen. If multiple paths have the same lightest weight then the first one calculated by the refiner 1021 will be selected, which from an application perspective is a random select.

The calculation of the join path to use for a query depends on the relationships defined in the business layer and the join information defined in the query specification. Each path segment is assigned a value in the following order from light to heavy weight:
1. Joins referenced in the query specification
2. Joins defined in the query specification
3. Joins of type containment defined in the business layer
4. Joins of type association defined in the business layer
5. Joins inherited from the super type of an entity
6. Joins of type reference defined in the business layer
The weights may be further calibrated depending on the existence of the attributes referenced by the query unit items 1042 in join information.

These different types of joins are described below. The join path with the lowest overall weight is the considered to be the preferred path. The refiner 1021 chooses the join path with the lowest overall weight if multiple paths are possible. The client applications 1002 may override this selection method of the refiner 1021.

As stated previously join resolution will first take place within a query unit 1041 of a query specification 1004 and subsequently between query units 1041. Joins defined in the business layer 104 may be added to a query specification 1004 as model joins 1043 which gives these joins a preference to be included in the join path and thus override the weights that are derived based on the type of the join per definition in the model 15. Declaring the join explicitly is not a guarantee that the join will be included. When query units 1041 contain other query units 1041 then this join evaluation and resolution will take place from the deepest nested query units 1041 toward the least nested query units 1041.

The refiner 1021 replaces, depending on the relationship between entities in the business layer 104, weights of joins between tables in the data access layer 104 with a more logical concept of how closely entities are tied together. Accordingly, joins in the business layer 104 and the data access layer 102 are picked up or ignored during the join path calculation by the refiner 1021. Thus, the refiner 1021 enables use of the simplified business layer 104.

When a join in the business layer 104 represents a strong bond between two entities such that the one entity does not exist without the other, the join is considered to be of containment type and the join relationship is called a containment relationship. A containment relationship between entities influences by how tables are joined in the generated data source queries 1008 when the application 1002 requests information related to various tables in the data source 100. For example, an entity "Orders" has a containment relationship with an entity "Order Details", i.e., it is not possible or likely to view an Order Detail record without the existence of an Order record. The cardinality of a join of containment type is usually 1:1 to 1:n, but it may be relaxed to 1:1 to 0:n.

When the refiner 1021 calculates the join path, it gives a low weight to joins that are declared of containment type. By giving a low weight, the refiner 1021 favours these joins to be included in the resultant data source query 1008.

When a join is used to lookup a value in another entity then the join is considered to be of type reference. The application can specify the retrieval of multiple attributes from the referenced entity. For example, an entity "Customer-Address" may contain an attribute "Country Code", which is used as the key into an entity "Country". The relationship from the "Customer-Address" entity to the "Country" entity is a reference relationship because from the perspective of the "Customer-Address" information, it provides additional descriptive information, such as Country Name or Country's type of government. The cardinality of these types of relationships is usually 1:n to 1:1, but it may be relaxed to 0:n to 0:1. In this context the referenced entity is often called a reference entity.

When the refiner 1021 calculates the join path, it gives a high weight to joins that are declared of reference type. Giving a high weight makes that the query path does not navigate through an entity that is used as a reference entity. Thus, the refiner 1021 will include a join of this type, but does not favour multiple different reference joins to the same entity to be included in the resultant data source query 1008. Accordingly, the probability of a calculated join path to 'go through' a reference entity having all joins of reference type is very low.

If a join is neither of type reference nor of type containment, then it is of type association. When the refiner 1021 calculates the join path, it gives to joins that are declared of association type a weight heavier than that given to the containment type joins and lighter than that given to the reference type joins. Thus, the refiner 1021 favours these joins to be included in the resultant data source query 1008 after the joins of type containment.

When the query specification 1004 has redundant break clauses referring to redundant joins, the refiner 1021 may remove the redundant break clauses from aggregate expressions. FIG. 48 shows the model definitions to illustrate the removal of redundant break clauses.
The aggregate expression may be as follows:

total ([Order Detail.quantity] for [Customer.Customer Number], [Order.Order Number])

This can be reduced to the aggregate expression.

total ([Order Detail.quantity] for [Order.Order Number])

The reasons:
1. The join Customer-Order is 1:1 to 1:n
2. All the attributes of the key of the Order entity are present in the join expression In contrast the aggregate expression Total ([OrderDetail.qty] for [Customer.Customer Number],[Order.Customer PO number]

Can not be further reduced, because the join relationship does not contain the attributes of the entity Order. This reflects the real-life fact that multiple customers may be using the same Purchase Order Number, thus a Purchase Order Number does not belong uniquely to a single customer.

The break clauses in explicitly specified expressions will be evaluated to remove redundant levels.

Thus the rules for the removal of such redundant break clauses depends on the cardinality of the join relationships between the entities to which the attributes in the break clause belong and the keys of the entities. The left to right cardinality of 1:1 to 1:n allows the removal of the break clauses to the left if the attributes on the right entity are all present in the equi-join expression. In this example an OrderDetail record is uniquely identified by the OrderNumber and LineNumber, the Customer Number does not add any value in uniquely identifying an OrderDetail record. Using the same rules it follows that grouping at the Order.Order Number attribute does not require the inclusion of the Customer Number. This step simplifies the expression and allows for better query formulation.

When an entity in the business layer 104 has a filter, the refiner 1021 adds the filter property to the data source queries 108 using the AND operator. Thus, the data source queries 108 further restricts the result set of source data 1010. The refiner 1021 may use the where-clause in generated SQL queries to add filters of entities.

Collapsed Entities

The query engine 30 through its refiner 1021 component enforces a consistent view of an entity. The refiner 1021 does this by formulating queries to the underlying data sources in such a way that the number of rows of data that are returned for this entity is the same irrespective of the set of attributes that are selected of the entity for a particular query.

An entity is considered a collapsed entity if its attribute expressions directly reference more than one data source. In this case the data sources that are referenced by the entity must be related at the data access layer 102 of the Architect model.

In order for the refiner 1021 to view entities in a consistent manner as described before, it is necessary for the refiner 1021 to uniquely identify a single data source 100 from this set, which has the highest cardinality. The refiner 1021 does this by examining the join information that is defined in the data access layer 102. Each join contains a left and right cardinality, which is used to calculate, from a given set of data sources 100 referenced directly by an entity, the one data source that determines the number of rows returned for the entity. If the refiner 1021 is processing an entity for which it is not possible to identify such a data source, it considers that this entity is ill-defined, and rejects the query specification 1002 that uses such an entity.

A collapsed entity is equivalent to a view that is defined in the database, except that the join information is not stored as part of the definition, but rather is stored as separate object information in the data access layer of the model.

The one data source that determines the number of rows returned for the entity is often referred to as a driver data source. When the driver data source is a table in a database, it is called a driver table.

The driver data source is always included in the generated data source query 1008. Other data sources for a particular entity will only be included if these other data sources are referenced either directly or indirectly in the query specification 1004. This optimization allows for faster execution of the data source query 1008 by the underlying data provider, as it reduces the number of data sources that need to be accessed and joined.

Figure 42:
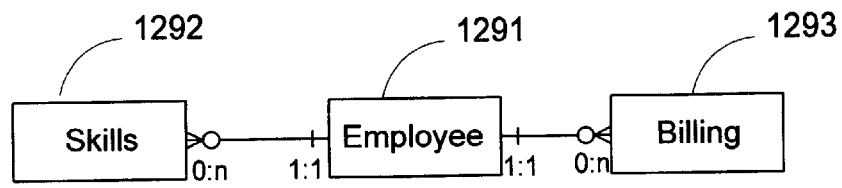
FIG. 42 is a diagram showing an example of the data access layer.

FIG. 42 shows an example of an entity for which it is not possible to identify such a driver data source. This example is modelling three tables: "employee" 1291, "skills" 1292 and "billings" 1293, in a single entity. The relationships between these tables reflect that an employee may have more than one skill record and more than one billing record. Thus the cardinality between the "employee" table 1291 and "skill" table 1292 is 1:1 to 0:n. The cardinality of the relationship between the "employee" table 1291 and "billing" table 1293 is also 1:1 to 0:n. This allows for some employees to be recorded without either skills or billing records. However every skill or billing record relates to one and only one employee. In this case the refiner 1021 can not determine the data source with the highest cardinality, it could be one of the three. Accordingly, it is an error to create an entity that defines attributes that use all three tables 1291–1293. In other words, the refiner 1021 can not calculate a driver table for this entity. Thus, the refiner 1021 rejects any query specifications 1002 that use this entity.

The refiner 1021 thus calculates which one data source of the set of data sources that are directly referenced by the entity is to be considered the driver source. When considering relational tables as data sources then the driver data source will be the table with the highest cardinality. This driver table is included in a generated data source query 1008, though it may only be used in it'the join conditions to ensure that the numbers of rows for the entity stays consistent. If no data is retrieved from the driver table, then that is immaterial to the generation of the data source query 1008 as the join that will b e generated into the SQL statement will make reference to this driver table. If, however, the only information that is retrieved comes from the driver table, the other tables are not presented in the generated data source query 1008. Thus, the refiner 1021 can simplify the data source query 1008. Thus the refiner 1021 in addition to using cardinality information of joins in the business layer 104 also takes advantage of the cardinality information that is stored in the data access layer 102.

Foreign Attributes

Some attributes in entities in the business layer 104 may be expressions that refer to an attribute of another entity. For example, the business layer 104 contains entities Product, Customer, Order and Status. The entity Status has a Name attribute. The entities Product, Customer and Order each have a Status attribute. The Status attributes of these entities are expressions that refer to the Name attribute of the entity Status. In this case, the entity Status functions as a look-up table. The Status attributes in these entities are called foreign attributes.

Reusable Calculations

The query specification 1005 and attributes in the business layer 104 allow for the retrieval of aggregate information in the presence of detailed information. The aggregate information is supplied as additional information in the generated data matrix 1012. The aggregate information can be considered as an additional column in the traditional queries expressed in SQL.

The aggregate information can be calculated for different grouping levels. The refiner 1021 of the query engine 30 reuses in the data source query 1008 the calculations of the aggregate information that are reusable in different grouping levels. This is more clearly illustrated in the following example, where grouping takes place at both the Customer number and Order number.

An example is described using the following four query items (QIs):

QI1: [Customer.Number]
QI2: [Order.Number]
QI3: total ([OrderDetail.Quantity] for [Customer.Number])
QI4: total ([OrderDetail.Quantity] for [Order.Number])

This is based on a model where a Customer has one or more Orders and an Order has one or more Order Detail records.

Thus, query item QI3 will result in a single number per "Customer Number" that is the sum of all the quantities ordered by that customer number. Query item QI4 will be the total quantities per order. In SQL terms, there are three sub-queries formulated, one for each grouping and one to get the overall results. A possible SQL query is as follows:
select D1.CustNo, D1.OrderNo, D1.sum1, D2.sum2
   from (select Customer.CustNo, Order.OrderNo, sum
     (OrderDetail.quantity)as sum1 from Customer, Order,
     OrderDetail where Customer.CustNo=Order.CustNo
     and Order.OrderNo=OrderDetail.OrderNo group by
     Customer.CustNo, Order.OrderNo ) D1,
   (select Customer.CustNo, sum(OrderDetail.quantity) as
     sum2 from Customer, Order, OrderDetail where
     Customer.CustNo=Order.CustNo and Order.OrderNo=
     OrderDetail.OrderNo group by Customer.CustNo ) D2
where D1.CustNo=D2.CustNo The query engine 30 uses Cognos SQL, which allows for processing data that is returned by the database. Thus the data source query in Cognos SQL terms can be stated as:
select distinct T1.CustNo, T2.OrderNo,
   xsum(T3.quantity for T1.CustNo, T2.OrderNo )as sum1,
   xsum(T3.quantity for T1.CustNo) as sum2 p0 from Customer T1, Order T2, OrderDetail T3
where Customer.CustNo=Order.CustNo
and Order.OrderNo=OrderDetail.OrderNo The DMS component of the query engine 30 will translate this or part of this into SQL that is acceptable by the underlying database. The SQL send to the database for this example will be similar to:
select Customer.CustNo, Order.OrderNo,
   sum(OrderDetail.quantity)as sum1
from Customer, Order, OrderDetail
where Customer.CustNo=Order.CustNo
and Order.OrderNo=OrderDetail.OrderNo
group by Customer.CustNo, Order.OrderNo The DMS component of the query engine 30 will then execute the following SQL equivalent query on the returned data:
select D1.CustNo,
   sum(D1.sum1) as sum2
from returned_data D1
   group by D1.CustNo The result of this processing by the DMS component is then merged by the DMS component with the result obtained from the query to the underlying database. A particular result set may look like:

| CustNo | OrderNo | Sum1 | Sum2 |
|--------|---------|------|------|
| 1 | 1 | 10 | 25 |
| 1 | 2 | 15 | 25 |
| 2 | 3 | 5 | 12 |
| 2 | 4 | 7 | 12 |

In a query specification the aggregate operations are commonly specified without break clauses. Break clauses show up in the generated Cognos SQL after the for keyword as can be seen in the preceding example. The break clauses can be derived from the level information for which the expression is specified. Thus specifying in a level that is keyed by Customer Number, the client application 1002 may define a query item as total(Order Detail.Quantity auto). This step of the refiner 1021 is often referred to as aggregate completion, and it will translate the previous expression into: XSUM(Order Detail.Quantity for Customer.Customer Number).

The aggregates defined in the refiner 1021 fall into two categories: those that return a single value for each row of the set of rows involved in the calculation, and those that return potentially different value for each row of the set of rows involved in the calculation.

The aggregates that return a single value for each row are closely related to standard aggregates. The non-exhaustive list functions in this category is as follows:

total (xsum or sum)
minimum(xmin or min)
maximum (xmax or max)
average (xavg or avg)
count (xcount or count)
count rows (xcount or count*)
XFirst(not exposed to user)

The aggregate operators that return potentially different value are also referred to as OLAP functions. There are no equivalents in SQL 92 for these functions, though some database vendors have started to support equivalent functions.

Rank (Xrank)
Percentile (Xpercentile)
Quantile (XNTILE)
Quartile (XNTILE with second argument=2)
Tertile (Xtertile)
Percentage (Xpercentage)
Standard-Deviation (XstdDev)
Variance (XVariance)
Running-total (Rsum)

Running-minimum (RMin)
Running-maximum (RMax)
Running-average (RAverage)
Running-count (RCount)
Running-difference (RDifference)
Moving-total (XMOVINGSUM)
Moving-average (XMOVINGAVG)

The interpretation of the "auto" option for these two groups is different. The notes here are only valid for zero and one-dimensional queries. The aggregates returning one value for a set of rows replace auto with a for-clause containing the key expressions of the levels for which the data area is defined, either the measure data area 1037 or dimension data area 1033 (FIG. 46). The aggregates returning a different value for each row in a set replace auto with a for-clause containing the key expressions of the next-higher level for which the data area 1033, 1037 is defined. If the expression containing the auto clause is belongs to the highest level of an edge 1031, then it will be used as the level 1032, i.e., it will result in an empty for clause.

The rules can also be described more specifically as follows:

The interpretation of the auto option for these two groups is as follows:
  first group of functions (aggregates returning one value for a set of rows): replace auto with a for-clause containing the key expressions of the levels for which the dataArea is defined (either the measureDataArea or dimensionDataArea)
  second group of functions (aggregates returning a different value for each row in a set)
1. dimensionDataArea
  replace auto with a for-clause containing the key expressions of the next-higher levels on the same edge for which the dataArea is defined. (If the operation is specified for a queryItem of the overall level of an edge then the value 1 will be returned.)
2. measureDataArea
  measureDataArea returns a multiple rows per dataMatrix-Cell
    replace auto with a for-clause containing the key expressions of the next-higher level for which the dataArea is defined.
  measureDataArea returns a single rows per dataMatrix-Cell
    replace auto with a for-clause containing the key expressions of the next-higher levels for each of the edges for which the dataArea is defined. If the level of a particular edge is the overall level then there are no higher level keys on that edge and no contribution to the for clause will be made for that edge.
Security/Access The refiner 1021 of the query engine 30 also provides security that limits access to particular data. A filter associated with the relationship between user class and entity or attribute will be added by the refiner 1021 to the query specification 1002 using an AND operator. This operation will be applied recursively to the supertype of the entity. The operation is also applied for all the ancestors of the user class.

Planner 1022

The planner 1022 of the query engine 30 generates data source queries 1008. The generated data source queries 1008 are semantically precise. The planner 1022 relies on the reporting system 4 to perform additional transformations on the generated data source queries 1008 to optimize the retrieval of data 1010 from the data sources 100 and the requested computations. For example, the query engine 30 relies on the reporting system translations that allows the conversion of queries containing standard aggregates, with having- and group by-clauses.

For example, a data source query 1008:
  select distinct PNO, XSUM(QTY for PNO) from SUPPLY
is transformed by the reporting system 4 to:
  select PNO, SUM(QTY) from SUPPLY group by PNO
Execution 1023

The execution 1023 of the query engine 30 executes the data source queries 1008 on the data sources 100. The execution 1023 also receives the results of the execution and stores the results in a data matrix 1012.

Logging

The results of initialization steps performed by the query engine 30 are logged to a file. The results of the execution of the query engine 30 components are logged to a file. The log file location, filename, and default log level, such as the amount of detail recorded in the log file, may be stipulated by the configuration settings.

EXAMPLES

Some examples are described below using SQL. The SQL listed here as being data source queries generated by the query engine 30 is for illustrative purpose only. The actual generated SQL may or may not match what is shown here. The uncertainty is in the many features that can be added to the planning of queries, including optimizations.

Example MODEL

Figure 43:
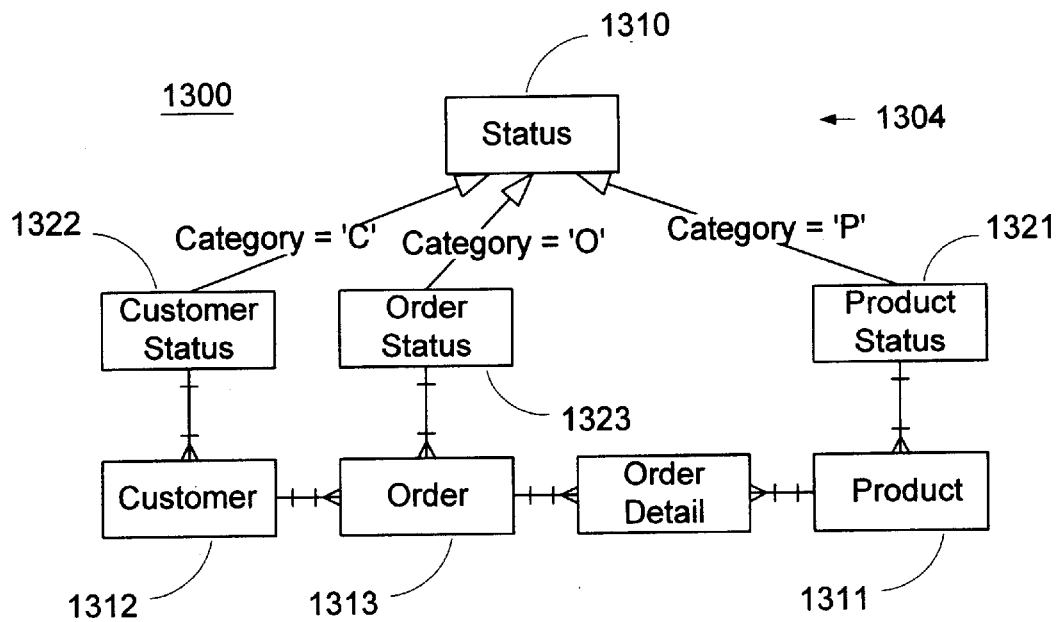
FIG. 43 is a diagram showing an example of the business layer.

A metadata model 1300 used in this example has the following set of entities and attributes in its business layer 1304. The entity relationship diagram for the business layer 1304 is displayed as shown in FIG. 43. In this example, none of the relationships have optional sides.

| Product | Customer | Order | Order Detail | Status |
|---|---|---|---|---|
| Product Id | Customer Number | Order Number | Order Number | Status Code |
| Product Name | Customer Name | Customer Number | Line Number | Category |
| Unit Price | Customer Status | Sale Status | Product Id | Name |
| Product Status | [Status Code] | Order Date | Quantity | Description |
| [Status Code] | | [Status Code] | Line Amount | |

For the purpose of this example, it is assumed that the attribute Status Code of the entity Status 1310 (Status.Status Code) is a one character field and the attribute Name of the entity Status 1310 (Status.Name) is a short name, e.g., 'A', 'Active'; 'C', 'Closed'. In the underlying database, both the Status Code and Name of the Status table could be defined as unique keys. The business layer 1304 reflects reality and defines the attributes for these columns as keys.

The Status attributes in the entities Product 1311, Customer 1312 and Order 1313, such as Product.Product Status, Customer.Customer Status and Order.Order Status, are expressions that refer to the Name attribute of the sub-entities of the Status entity 1310.

The bracketed attributes [Status Code] in the above table are present in the entities 1311–1313, but are not exposed through the subject in the package layer. Though this is not a requirement, it allows the modeler to eliminate attributes that are not useful to the package user. This means that the user can not select these attributes in the application, though they do exist in the model. These attributes are required in the model to define the join relationship to the Status entity and must not be removed from the entity. These attributes are used in the business layer 1304 to define the join relationship to the Status entity 1310 from the other entities 1311–1313.

The query engine 30 defines the following sub-entities 1321–1323 based on the status attributes:

| ProductStatus | OrderStatus | CustomerStatus |
| --- | --- | --- |
| Status Code | Status Code | Status Code |
| Category | Category | Category |
| Name | Name | Name |
| Description | Description | Description |

The joins in the business layer 1304 are defined as follows:

| Left Entity | Right Entity | Left Card | Right Card | Left Attribute | Right Attribute |
| --- | --- | --- | --- | --- | --- |
| Customer | Order | 1:1 | 1:n | Customer. Customer Number | Order Customer Number |
| Order | Order Detail | 1:1 | 1:n | Order. Order Number | Order Detail. Order Number |
| Order Detail | Product | 1:n | 1:1 | Order Detail. Product Id | Product. Product Id |
| Customer | Customer Status | 1:n | 1:1 | Customer. Status Code | CustomerStatus Status Code |
| Order | Order Status | 1:n | 1:1 | Order. Status Code | OrderStatus. Status Code |
| Product | Product Status | 1:n | 1:1 | Product. Status Code | ProductStatus. Status Code |

The business layer 1304 is based on an underlying database with the following layout:

| PRODUCT | CUSTOMER | ORDER | ORDER_DETAIL | STATUS |
| --- | --- | --- | --- | --- |
| PROD_ID | CUST_NO | ORDER_NO | ORDER_NO | STATUS_CODE |
| PROD_NAME | CUST_NAME | CUST_NO | LINE_NO | TABLE_ID |
| UNIT PRICE | STATUS_CODE | ORDER_DATE | PROD_ID | STATUS_NAME |
| STATUS_CODE | | STATUS_CODE | QTY AMOUNT | DESCR |

In most cases the attributes map one for one to the columns in the physical layer. The STATUS table contains the status information for the whole database and has a unique key based on the two columns STATUS CODE and TABLE_ID. These two columns are mapped to the attributes Status Code and Category with the following definitions:

Attribute [Status Code]=Column[STATUS.STATUS_CODE]

Attribute [Category]=Column[STATUS.TABLE_ID]

Note how there are filters applied using the category attribute in order to subtype the Status entity into a subtype entity specific to Customer, Product and Order.

Example 1

A Zero Dimensional Query

A querySpecification that does not contain any edges or dimensions is colloquially called a zero-dimensional query. This kind of querySpecification is comparable to a list-style report that does not contain any grouping.

```
QuerySpec [Customer Information]
MeasureDataArea [Customer Info]
    QueryItem [Number] → Attribute [Customers.Customer Number]
    QueryItem [Name] → Attribute [Customers.Customer Name]
    QueryItem [Status] → Attribute [Customers.Customer Status]
    Sort
        SortItem [ ] → QueryItem [Number] ASC
```

Note that the sort specification references a queryItem, the notation here uses strings, which matches the name given to the first queryItem. This is a notation convention only, the Common Query Engine API requires the application to specify the ACS_BaseId of the queryItem object that is being referenced.

The application can ask for the SQL statement for this query using the method:

| |
|---|
| AUT_String AQE_1_AdvancedRequest::GetSQL( ) |

The returned SQL will look like

| | |
|---|---|
| select | T1.CUST_NO, |
| | T1.CUST_NAME, |
| | T2.STATUS_NAME |
| from | GoDatabase...CUSTOMER T1, |
| | GoDatabase...STATUS T2 |
| where | T1.STATUS_CODE = T2.STATUS_CODE |
| | and T2.TABLE_ID = 'C' |
| order by | T1.CUST_NO |

Example 2

A Zero Dimensional Query with Filters

The following query is similar to the previous one, except that the resultset has fewer rows since there are filters specified.

```
QuerySpec [Old, Active Customer Information]
MeasureDataArea [Customer Info]
    QueryItem [Number]   → Attribute [Customers.Customer Number]
    QueryItem [Name]     → Attribute [Customers.Customer Name]
    QueryItem [Status]   → Attribute [Customers.Customer Status]
    Sort
        SortItem [ ]→ QueryItem [Number] ASC
    Filters
        FilterItem [Old Customers]
            → Attribute [Customers.Customer Number] <50,000
        FilterItem [Active Customers]
            → Attribute [Customers.Customer Status] = 'Active'
```

The returned SQL will look like

| | |
|---|---|
| select | T1.CUST_NO, |
| | T1.CUST_NAME, |
| | T2.STATUS_NAME |
| from | GoDatabase...CUSTOMER T1, |
| | GoDatabase...STATUS T2 |
| where | T1.STATUS_CODE = T2.STATUS_CODE |
| | and T2.TABLE_ID = 'C' |
| | and T1.CUST_NO < 50000 |
| | and T2.STATUS_NAME = 'Active' |
| order by | T1.CUST_NO |

The following query is similar to the previous one, except that the resultset has fewer rows since there are filters specified.

```
QuerySpec [Old, Active Customer Information]
MeasureDataArea [Customer Info]
    QueryItem [Number]   → Attribute [Customers.Customer Number]
    QueryItem [Name]     → Attribute [Customers.Customer Name]
    QueryItem [Status]   → Attribute [Customers.Customer Status]
    Sort
        SortItem [ ] → QueryItem [Number] ASC
    Filters
        FilterItem [Old Customers]
            → Attribute [Customers.Customer Number] < 50,000
        FilterItem [Active Customers]
            → Attribute [Customers.Customer Status] = 'Active'
```

The returned SQL will look like

| | |
|---|---|
| select | T1.CUST_NO, |
| | T1.CUST_NAME, |
| | T2.STATUS_NAME |
| from | GoDatabase...CUSTOMER T1, |
| | GoDatabase...STATUS T2 |
| where | T1.STATUS_CODE = T2.STATUS_CODE |
| | and T2.TABLE_ID = 'C' |
| | and T1.CUST_NO < 50000 |
| | and T2.STATUS_NAME = 'Active' |
| order by | T1.CUST_NO |

Example 3

A One Dimensional Query

Dimensional queries are used if grouping takes place. Grouping is specified using levels within an edge. A querySpecification that contains only one edge is also known as a one-dimensional query.

The grouping takes place based on the queryItems that are referenced in the keyCollection of a level. Technically speaking, the keyCollection and queryItems do not belong to the level, but to the dimensionDataArea that is defined for the level, however there is only one such dimensionDataArea, thus there should be no misunderstanding using this terminology.

In addition to the queryItems that are referenced in these keys, a level may have additional queryItems defined, which are usually called properties. The properties are commonly used to provide additional descriptive data of the key information of a level.

The keys in datamarts using star-schemas have often generated values that do not have any meaning for the user. Applications would specify these generated keys as keys in the levels, but not display their values. Instead the properties that have meaning for the user would be displayed. In the original data source on which the datamart is build these particular properties would in all likelihood be defined as keys.

Summary expressions are also good candidates for properties, see the queryItem["Total Ordered Quantity] in the Customer level.

```
QuerySpec [Old, Active Customer Information]
Edge [Customer]
    Level [Customer]
        QueryItem [Number]      → Attribute [Customers.Customer Number]
        QueryItem [Name]        → Attribute [Customers.Customer Name]
        QueryItem [Status]      → Attribute [Customers.Customer Status]
        QueryItem [Total Ordered Quantity]
            → total( Attribute [Order Detail.Quantity] auto)
        Key
            KeyItem [ ] → QueryItem [Number]
        Sort
            SortItem [ ]→ QueryItem [Number] ASC
MeasureDataArea [Order Info] for { Level [Customer.Customer]
    QueryItem [Order]           → Attribute [Orders.Order Number]
    QueryItem [Order Date]      → Attribute [Orders.Order Date]
    Sort
        SortItem [ ] → QueryItem [Number] ASC
```

The application has the option of retrieving the data as a single resultset or as multiple resultsets. The lowest granularity of resultsets is based on a dataArea. In this query there are two dataAreas. There are three different datasets that can be returned to the application.
Use the Id of the querySpecification
Use the Id of the level named "Customer"
Use the Id of the measureDataArea named "Order Info"
MeasureDataArea SQL
The SQL for the measureDataArea named "Order Info" will look like

```
select    T1.CUST_NO,
          T2.ORDER_NO,
          T2.ORDER_DATE
from      GoDatabase...CUSTOMER TI,
          GoDatabase...ORDER T2,
where     T1.CUST_NO = T2.CUST_NO
order by  T1.CUST_NO, T2.ORDER_NO
```

The attributes and entities have been mapped to the appropriate underlying tables
The filter that is on the subtype entity Customer Status shows up in the where clause
The tables have 4-part names
Level SQL
The SQL for the Level named "Customer" will look like:

```
select distinct
          T1.CUST_NO,
          xmin (T1.CUST_NAME for T1.CUST_NO),
          xmin (T2.STATUS_NAME for T1.CUST_NO),
          xsum (T4.AMOUNT for T1.CUST_NO) as c1
from      GoDatabase...CUSTOMER T1,
          GoDatabase...STATUS T2,
          GoDatabase...ORDER T3,
          GoDatabase...ORDER_DETAIL T4
where     T1.STATUS_CODE = T2.STATUS_CODE
          and T2.TABLE_ID = 'C'
          and T1.CUST_NO = T3.CUST_NO
          and T3.ORDER_NO = T4.ORDER_NO
order by  T1.CUST_NO
```

Note the distinct option on the select statement, this appears because it is a level related query.
The general purpose function total has been translated to an XSUM
Properties have been decorated with the XMIN function.

The Common Query Engine does an additional translation to communicate with the underlying database, since the XSUM and XMIN functions are DMS/UDA extensions. The database specific generated SQL will be more like:

```
select    T1.CUST_NO c1,
          min(T1.CUST_NAME) c2,
          min(T2.STATUS_NAME) c3,
          sum(T4.AMOUNT) c4
from      GoDatabase...CUSTOMER T1,
          GoDatabase...STATUS T2,
          GoDatabase...ORDER T3,
          GoDatabase...ORDER_DETAIL T4
where     T1.STATUS_CODE = T2.STATUS_CODE
          and T2.TABLE_ID = 'C'
          and T1.CUST_NO = T3.CUST_NO
          and T3.ORDER_NO = T4.ORDER_NO
group by  T1.CUST_NO
order by
          1 asc
```

QuerySpec SQL
The SQL for the whole querySpecification will as follows:

```
select distinct
          T1.CUST_NO,
          T1.CUST_NAME,
          T2.STATUS_NAME,
          xsum (T4.AMOUNT for T1.CUST_NO) as
          Total_Ordered_Quantity,
          T3.ORDER_NO,
          T3.ORDER_DATE
from      GoDatabase...CUSTOMER T1,
          GoDatabase...STATUS T2,
          GoDatabase...ORDER T3,
          GoDatabase...ORDER_DETAIL T4,
where     T1.STATUS_CODE = T2.STATUS_CODE
          and T2.TABLE_ID = 'C'
          and T1.CUST_NO = T3.CUST_NO
          and T3.ORDER_NO = T4.ORDER_NO
order by  T1.CUST_NO, T3.ORDER_NO
```

All the data for both dataAreas is returned in a single result set. The application will be responsible for organizing it correctly.
The sequence of the items in the order by clause is based on the sort specifications going from highest level to the lowest level within the first edge to the last edge. The general rules for the generation of the order by clause is:

within a dataArea go from the first edge within the querySpecification to the last edge within an edge go from the highest level to the lowest level that is specified for the dataArea after this add the sort information specified on the dataArea itself. This last step is only applicable for measureDataAreas.

The above embodiments were described using SQL. However, the present invention may use other equivalent language that supported by data source providers (e.g. PowerPlay cubes, which are accessible through MDX)

The query engine of the present invention may be implemented by any hardware, software or a combination of hardware and software having the above described functions. The entire or a part of software code may be stored in a computer readable memory. Also, a computer data signal representing the software code may be transmitted via a communication network. The computer data signal may be embedded in a carrier wave. Such a computer readable memory and a computer data signal are also within the scope of the present invention, as well as the hardware, software and the combination thereof.

While the present invention has been described in connection with what is presently considered to be the most practical and preferred embodiments, it is to be understood that the invention is not limited to the disclosed embodiments. To the contrary, the present invention is intended to cover various modifications, variations, adaptations and equivalent arrangements included within the spirit and the scope of the appended claims. The scope of the claims is to be accorded the broadest interpretation so as to encompass all such modifications and equivalent structures and functions.

What is claimed is:

1. A query engine for formulating a query to obtain data from one or more data sources using a client application receiving user inputs and a metadata model containing model objects that represent the data sources, the query engine comprising:

a query specification interface for allowing the client application to generate a query specification based on a user input, and receiving the generated query specification; and a query engine component for translating the query specification into a data source query which is applicable to the data sources, based on the metadata model which has a data access layer for containing data access layer model objects, and a business layer for containing business layer model objects; and wherein the query specification contains reference to the business layer model objects contained in the business layer in the metadata model, and the query engine component uses the business layer model objects based on the reference contained in the query specification to translate the query specification.

2. The query engine as claimed in claim 1, wherein the query engine component returns the requested data in a multi-dimensional manifold.

3. The query engine as claimed in claim 1, wherein the metadata model further has a package layer for containing package layer model objects.

4. The query engine as claimed in claim 3, wherein the query specification contains data access information and data layout information.

5. The query engine as claimed in claim 3, wherein the query engine component comprises a refiner for refining the query specification to formulate the data source query.

6. The query engine as claimed in claim 5, wherein the query engine component comprises a planner for generating the data source query based on the results of the refiner.

7. The query engine as claimed in claim 6, wherein the query engine component comprises an execution for executing the data source query generated by the planner on the data sources.

8. The query engine as claimed in claim 3, wherein the query specification contains a reference to the model objects in the business layer; and the query engine component uses the model objects in the business layer based on the reference contained in the query specification.

9. The query engine as claimed in claim 1, wherein the data source query is in data source supporting language that are accessible through Multi Dimensional expression (MDX).

10. The query engine as claimed in claim 9, wherein the data source query is in structured query language (SQL).

11. The query engine as claimed in claim 1 further comprising a data matrix interface for receiving the data retrieved from the data sources by applying the data source query to the data sources, and providing the retrieved data in a data matrix to the client application for presenting the data to the user.

12. The query engine as claimed in claim 11, wherein the data matrix has an iterator to access an individual component in the data matrix.

13. A query engine for formulating a query to obtain data from one or more data sources using a client application receiving user inputs and a metadata model containing model objects that represent the data sources, the query engine comprising:

a query specification interface for allowing the client application to generate a query specification based on a user input, and receiving the generated query specification; and a query engine component for translating the query specification into a data source query which is applicable to the data sources, based on the metadata model which has a data access layer for containing data access model objects, the data access model objects including table objects that describe definitions of the tables contained in the data sources, column objects that describe definitions of the columns of the tables contained in the data sources, and data access layer joins that describe relationships between the table objects;

a business layer for containing business model objects, the business model objects including entities that are constructed based on the table objects in the data access layer, attributes that are constructed based on the column objects in the data access layer, and business layer joins that are constructed based on the data access layer joins in the data access layer and relationships between the entities; and a package layer for containing package model objects, the package model objects including a package model object that defines a subset of the business model objects.

14. The query engine as claimed in claim 13, wherein the query specification contains a reference to the business model objects in the business layer; and the query engine component uses the business model objects based on the reference contained in the query specification.

15. The query engine as claimed in claim 13, wherein the query specification contains data access information and data layout information.

16. The query engine as claimed in claim 13, wherein the query engine component comprises a refiner for refining the query specification to formulate the data source query.

17. The query engine as claimed in claim 16, wherein the refiner uses the business joins defined in the business layer.

18. The query engine as claimed in claim 17, wherein the refiner uses an entity of subtype contained in the business layer to provide a business view of relationship having an optional cardinality of zero-to-many.

19. The query engine as claimed in claim 17, wherein the refiner simplifies expressions of the query specification by using a one-to-one join relationship.

20. The query engine as claimed in claim 17, wherein, when the refiner locates multiple joins between two entities, the refiner assigns a weight to each join between the two entities, and calculates a join with a lightest weight to include it in the data source query.

21. The query engine as claimed in claim 20, wherein the refiner assigns a light weight to a join of containment type.

22. The query engine as claimed in claim 20, wherein the refiner assigns a heavy weight to a join of reference type.

23. The query engine as claimed in claim 20, wherein the refiner assigns a medium weight to a join of association type.

24. The query engine as claimed in claim 17, wherein the refiner locates a redundant join using cardinalities of the joins defined in the business layer, and removes from the query specification a redundant break clause referring to the redundant join.

25. The query engine as claimed in claim 17, wherein the refiner locates a join which can be breaked using cardinalities of the joins defined in the business layer, and expands the join into a number of break levels.

26. The query engine as claimed in claim 17, wherein an entity in the business layer has a filter, and the refiner adds the property of the filter to the data source query.

27. The query engine as claimed in claim 16, wherein the query engine component comprises a planner for generating the data source query based on the results of the refiner.

28. The query engine as claimed in claim 27, wherein the query engine component comprises an execution for executing the data source query generated by the planner on the data sources.

29. The query engine as claimed in claim 13, wherein the refiner identifies a collapsed entity in the business layer, and rejects any query specification using an invalid collapsed entity.

30. The query engine as claimed in claim 29, wherein the refiner identifies an invalid collapsed entity when the entity lacks appropriate join information referring to a join in the data access layer that allows the refiner to specify a driver data source.

31. The query engine as claimed in claim 13, wherein the refiner locates a driver data source by examining join information in the data access layer, the refiner includes in the data source query the driver data source and other data sources referenced in the query specification.

32. The query engine as claimed in claim 13, wherein the refiner identifies in the business layer a foreign attribute that refers to an attribute of another entity, and prevents the non-foreign attribute, which contains little or no user understandable value from being viewed by the user in the package layer.

33. The query engine as claimed in claim 13, wherein the refiner identifies a reusable calculation defined in the business layer to obtain aggregate information, and reuses the reusable calculation in the data source query.

34. The query engine as claimed in claim 13, wherein
the query specification contains a reference to the package model objects in the package layer; and
the query engine component uses the package model objects based on the reference contained in the query specification.

35. The query engine as claimed in claim 34, wherein the application uses a subject item defined in the package layer to reference objects defined in the business layer as a basis to formulate multi-dimensional queries that are translatable to data source query.

36. The query engine as claimed in claim 34, wherein the application uses a query path defined in the package layer to select a join path in the business layer.

37. The query engine as claimed in claim 13, wherein the data source query is in data source supporting language that are accessible through Multi Dimensional expression (MDX).

38. The query engine as claimed in claim 37, wherein the data source query is in structured query language (SQL).

39. The query engine as claimed in claim 13 further comprising a data matrix interface for receiving the data retrieved from the data sources by applying the data source query to the data sources, and providing the retrieved data in a data matrix to the client application for presenting the data to the user.

40. The query engine as claimed in claim 39, wherein the data matrix defines an iterator to access an individual component in the data matrix.

41. A method for formulating a query to obtain data from one or more data sources using a client application receiving user inputs and a metadata model containing model objects that represent the data sources, the method comprising:
generating a query specification based on a user input using the client application;
receiving the generated query specification; and
translating the query specification into a data source query which is applicable to the data sources, based on the metadata model that has a data access layer for containing data access layer model objects and a business layer for containing business layer model objects; and
wherein the generating step comprises providing in the query specification a reference to the business layer model objects contained in the business layer; and
the translating step comprises using the business layer model objects based on the reference contained in the query specification to translate the query specification.

42. The method as claimed in claim 41, wherein
the metadata model has a data access layer for containing data access layer model objects, a business layer for containing business layer model objects and a package layer for containing package layer model objects.

43. The method as claimed in claim 42, wherein the translating step comprises refining the query specification to formulate the data source query.

44. The method as claimed in claim 43, wherein the translating step further comprises planning generation of the data source query based on the results of the refining step.

45. The method as claimed in claim 44, wherein the translating step further comprising executing the data source query generated by the planning step on the data sources.

46. The method as claimed in claim 42, wherein
the generating step comprises containing in the query specification a reference to the model objects in the package layer; and the translating step comprises using the model objects in the package layer based on the reference contained in the query specification.

47. The method as claimed in claim 41, wherein the generating step comprises including in the query specification data access information and data layout information.

48. The method as claimed in claim 41, wherein the translating step translates the query specification into the data source query in data source supporting language that are accessible through Multi Dimensional expression (MDX).

49. The method as claimed in claim 48, wherein the translating step translates the query specification into the data source query in structured query language (SQL).

50. The method as claimed in claim 41 further comprising:

applying the data source query to the data sources;

receiving the data retrieved from the data sources; and providing the retrieved data in a data matrix to the client application for presenting the data to the user.

51. The method as claimed in claim 50, wherein the step for providing the retrieved data comprising iterating access to an individual component in the data matrix.

52. A method for formulating a query to obtain data from one or more data sources using a client application receiving user inputs and a metadata model containing model objects that represent the data sources, the method comprising:

generating a query specification based on a user input using the client application;

receiving the generated query specification; and translating the query specification into a data source query which is applicable to the data sources, based on the metadata model which has a data access layer for containing data access model objects, the data access model objects including table objects that describe definitions of the tables contained in the data sources, column objects that describe definitions of the columns of the tables contained in the data sources, and data access layer joins that describe relationships between the table objects;

a business layer for containing business model objects, the business model objects including entities that are constructed based on the table objects in the data access layer, attributes that are constructed based on the column objects in the data access layer, and business layer joins that are constructed based on the data access layer joins in the data access layer and relationships between the entities; and a package layer for containing package model objects, the package model objects including a package model object that defines a subset of the business model objects defining subject items and query paths.

53. A computer readable medium containing code representing instructions for formulating a query to obtain data from one or more data sources using a client application receiving user inputs and a metadata model containing model objects that represent the data sources, the code comprising:

generating a query specification based on a user input using the client application;

receiving the generated query specification; and translating the query specification into a data source query which is applicable to the data sources, based on the metadata model that has a data access layer for containing data access layer model objects and a business layer for containing business layer model objects; and wherein the generating step comprises providing in the query specification a reference to the business layer model objects contained in the business layer; and the translating step comprises using the business layer model objects based on the reference contained in the query specification to translate the query specification.

54. A transmittable signal for transmitting code representing instructions for formulating a query to obtain data from one or more data sources using a client application receiving user inputs and a metadata model containing model objects that represent the data sources, the code comprising:

generating a query specification based on a user input using the client application;

receiving the generated query specification; and translating the query specification into a data source query which is applicable to the data sources, based on the metadata model that has a data access layer for containing data access layer model objects and a business layer for containing business layer model objects; and wherein the generating step comprises providing in the query specification a reference to the business layer model objects contained in the business layer; and the translating step comprises using the business layer model objects based on the reference contained in the query specification to translate the query specification.

* * * * *